(12) United States Patent
Klefenz et al.

(10) Patent No.: US 8,570,383 B2
(45) Date of Patent: Oct. 29, 2013

(54) APPARATUS, METHOD AND COMPUTER PROGRAM FOR RECOGNIZING A GESTURE IN A PICTURE, AND APPARATUS, METHOD AND COMPUTER PROGRAM FOR CONTROLLING A DEVICE

(75) Inventors: Frank Klefenz, Mannheim (DE); Valiantsin Hardzeyeu, Ilmenau (DE)

(73) Assignee: Fraunhofer-Gesellschaft zur Foerderung der Angewandten Forschun e.V., Munich (DE)

( * ) Notice: Subject to any disclaimer, the term of this patent is extended or adjusted under 35 U.S.C. 154(b) by 265 days.

(21) Appl. No.: 13/092,184

(22) Filed: Apr. 22, 2011

(65) Prior Publication Data
US 2011/0234840 A1 Sep. 29, 2011

Related U.S. Application Data

(63) Continuation of application No. PCT/EP2009/007547, filed on Oct. 21, 2009.

(30) Foreign Application Priority Data

Oct. 23, 2008 (DE) .......................... 10 2008 052 928

(51) Int. Cl.
*H04N 5/225* (2006.01)
*H04N 5/228* (2006.01)
*G06K 9/00* (2006.01)
*G06K 9/46* (2006.01)
*G06K 9/36* (2006.01)

(52) U.S. Cl.
USPC .............. 348/207.99; 348/222.1; 348/169; 348/208.14; 348/252; 382/181; 382/190; 382/281; 382/209; 345/427

(58) Field of Classification Search
USPC .......... 348/222.1, 208.14, 77, 169, 94, 26, 348/252, 246, 597; 382/194, 195, 190, 203, 382/209, 197, 199, 266, 269, 281, 224; 345/181, 427, 604, 645
See application file for complete search history.

(56) References Cited

U.S. PATENT DOCUMENTS 5,548,667 A * 8/1996 Tu ................................. 382/285
6,147,678 A * 11/2000 Kumar et al. .................. 345/158
(Continued)

FOREIGN PATENT DOCUMENTS

JP 2001-056861 A 2/2001

OTHER PUBLICATIONS

W. Freeman et al., "Orientation Histograms for Hand Gesture Recognition"—MIT Labs Publication TR94-03a / Cambridge/Massachusetts/ ( 1994).*

(Continued)

*Primary Examiner* — Nhan T Tran
*Assistant Examiner* — Marly Camargo
(74) *Attorney, Agent, or Firm* — Keating & Bennett, LLP

(57) ABSTRACT

An apparatus for recognizing gestures in a picture includes a Hough transformer configured to identify elements in the picture or in a pre-processed version of the picture as identified gesture elements and to obtain information about the identified gesture elements.

The apparatus further includes a gesture description creator configured to obtain a gesture description while using the information about the identified gesture elements.

Moreover, the apparatus includes a gesture classifier configured to compare the gesture description to a plurality of comparative gesture descriptions having gesture codes associated with them. The gesture classifier is configured to provide, as the result of the comparison, a gesture code of a recognized gesture.

42 Claims, 35 Drawing Sheets

(56) References Cited

U.S. PATENT DOCUMENTS

| | | | |
|---|---|---|---|
| 6,788,809 B1* | 9/2004 | Grzeszczuk et al. | 382/154 |
| 8,259,996 B2* | 9/2012 | Shamaie | 382/103 |
| 2005/0117781 A1 | 6/2005 | Aoyama | |
| 2006/0210116 A1 | 9/2006 | Azuma | |

OTHER PUBLICATIONS

V. Kulkarni et al., "Appearance based recognition of American Sign Language using gesture segmentation", Int. J. Comp. Sci. and Engineer., vol. 2, No. 3, pp. 560-565 (2010).*

B. Kaufmann et al., "Hand posture recognition using real-time artificial evolution", Lectures on Comp. Sci., vol. 6024, pp. 251-260, Spring-Verlag (2010).*

Lawson et al., "Using Deficits of Convexity to Recognize Hand Gestures from Silhouettes", VISAPP 2006—Image Understanding, 2006, pp. 123-128.

Serre et al., "Robust Object Recognition with Cortex-Like Mechanisms", IEEE Transactions on Pattern Analysis and Machine Intelligence, vol. 29, No. 3, Mar. 2007, pp. 411-426.

Sudderth et al., "Visual Hand Tracking Using Nonparametric Belief Propagation", MIT Laboratory for Information & Decision System Technical Report P-2603, IEEE CVPR Workshop on Generative Model Based Vision, May 2004, pp. 1-9.

Liu et al., "Hand Gesture Extraction by Active Shape Models", Proceedings of the Digital Imaging Computing: Techniques and Applications (DICTA) 2005, 6 pages.

Kappes et al., "MAP-Inference for Highly-Connected Graphs with DC-Programming", 30th Annual Symposium of the German Association for Pattern Recognition, Jun. 2008, pp. 1-10.

Gavrila et al., "Real-Time Object Detection for "Smart" Vehicles", IEEE International Conference on Advanced Video and Signal based Surveillance (AVSS), 2007, 7 pages.

Zajdel et al., "Cassandra: Audio-Video Sensor Fusion for Aggression Detection", IEEE Int. Conf. on Advanced Video and Signal based Surveillance (AVSS), London, UK, 2007, pp. 1-6.

Miletzki, "Schürmann-Polynomials—Roots and Offsprings", Proceedings of the Eighth International Workshop on Frontiers in Handwriting Recognition (IWFHR'02), 2002, pp. 1-7.

Ferrari et al., "Object Detection by Contour Segment Networks," 14 pages.

Bergtholdt et al., "Learning of Graphical Models and Efficient Inference for Object Class Recognition", 28th Annual Symposium of the German Association for Pattern Recognition, Sep. 2006, pp. 273-283.

Schmidt et al., "Spine Detection and Labeling Using a Parts-Based Graphical Model", Information Processing in Medical Imaging, 2007, pp. 122-133.

Wenzel et al., "Representing Directions for Hough Transforms," VISAPP, 1st International Conference on Computer Vision Theory and Application, Proceedings, 2006, pp. 116-122.

"Hand Gesture Recognition", Shared Reality Lab of Centre for Intelligent Machines, Montreal, Quebec, Canada, Jun. 15, 2009, 3 pages.

Munib et al., "American Sign Language (ASL) Recognition Based on Hough Transform and Neural Networks", Expert Systems with Applications, Oxford, Jan. 1, 2007, pp. 24-37.

Sun, "Conics-Enhanced Vision Approach for Easy and Low-Cost 3D Tracking", Pattern Recognition The Journal of the Pattern Recognition Society, Jul. 1, 2004, pp. 1441-1450.

Ukita et al., "Wearable Virtual Tablet: Fingertip Drawing on a Portable Plane-Object Using an Active-Infrared Camera", Transactions of the Information Processing Society of Japan Inf. Process. Soc. Japan, Japan, Mar. 2004, pp. 169-176.

Safaee-Rad et al., "Application of Moment and Fourier Descriptors to the Accurate Estimation of Elliptical Shape Parameters", IEEE International Conference on Acoustics, Speech & Signal Processing, Apr. 14, 1991, pp. 2465-2468.

Kierkegaard, "A Method for Detection of Circular Arcs Based on the Hough Transform", Machine Vision and Applications, 1992, pp. 249-263.

Iturbe et al., "VHDL Described Finger Tracking System for Real-Time Human-Machine Interaction", ICSES 2008 International Conference on Signals and Electronic Systems, Krakow, Sep. 14-17, 2008, pp. 171-176.

Charayaphan et al., "Image Processing System for Interpreting Motion in American Sign Language", J. Biomed. Eng. 1992, Sep. 1, 1992, vol. 14, pp. 419-425.

Official Communication issued in International Patent Application No. PCT/EP2009/007547, mailed on Dec. 30, 2009.

Kerdvibulvech et al., "Vision-Based Detection of Guitar Players' Fingertips Without Markers", IEEE Computer Graphics, Imaging and Visualisation (CGIV) 2007, 6 pages.

* cited by examiner $$m = \sum_{\substack{\text{all of the pixels i} \\ \text{belonging to the} \\ \text{gesture area}}} m = (x_i - x_m)^2 + (y_i - y_m)^2$$

$$m_x = \sum_{\substack{\text{all of the pixels i} \\ \text{belonging to the} \\ \text{gesture area}}} (x_i - x_m)^2$$

$$m_y = \sum_{\substack{\text{all of the pixels i} \\ \text{belonging to the} \\ \text{gesture area}}} (y_i - y_m)^2$$

FIGURE 6C

"2 fingers"

arc:
- direction (upward, downward,
           leftward, rightward)
- extremum (position x)
           (position y)
- radius of curvature (optional)

straight-line segment:
- direction (e.g. angle versus
           horizontal)
- initial point and end point or
  length and center

FIGURE 8 form the active shape model. If model parameters are adjusted continuously, different shape contours will be created for recognizing a match with hand edges that have been extracted from original pictures. Finally, a gesture is recognized.

APPARATUS, METHOD AND COMPUTER PROGRAM FOR RECOGNIZING A GESTURE IN A PICTURE, AND APPARATUS, METHOD AND COMPUTER PROGRAM FOR CONTROLLING A DEVICE

CROSS-REFERENCE TO RELATED APPLICATIONS

This application is a continuation of copending International Application No. PCT/EP2009/007547, filed Oct. 21, 2009, which is incorporated herein by reference in its entirety.

BACKGROUND OF THE INVENTION

Embodiments in accordance with the present invention relate to an apparatus, a method and a computer program for recognizing gestures in a picture.

Further embodiments in accordance with the invention relate to an apparatus, a method and a computer program for controlling a device on the basis of a gesture.

Some embodiments in accordance with the invention relate to a method and an apparatus for character and gesture recognition.

In many different technical applications it is desirable to control computers or other devices in a contactless manner, for example. Performing control by means of gestures has proven to be advantageous in many cases. Gestures are, e.g., symbolic movements of specific body parts, for example of the hand or of the head, for the purposes of non-verbal communication.

For example, it is possible for a person to place a hand and/or fingers into a multitude of various configurations (or arrangements).

The various configurations of a hand may be used, for example, for controlling a computer or a device. In this context, it should also be noted that gestures in many cases may even be used by handicapped persons for communication, even if there are no other possibilities available to them of expressing information. As an example, sign language of deaf and dumb people shall be mentioned here. Persons who are hindered—for whatever reasons—from using a keyboard, for example, may also pass on information to a computer by using a gesture.

Some conventional approaches and concepts regarding gesture recognition shall be described in the following.

The publication "Using deficits of convexity to recognize hand gestures from silhouettes" by E. Lawson and Z. Duric describes a method of recognizing hand gestures on the basis of hand silhouettes. The convex hull of a hand is calculated on the basis of its silhouette. Deficits regarding the convexity which describe differences between the hull and the silhouette are extracted. The deficits of the convexity are normalized in that they are rotated about the edges they share with the hull. To determine a gesture, the deficits of a plurality of examples are extracted and normalized. The deficits are grouped by similarity. Gestures are represented by strings of symbols that correspond to the nearest neighbor of the deficits. Different sequences of symbols that correspond to a given gesture are stored in a dictionary. For any given unknown gesture, its deficits of the convexity are extracted and associated with a corresponding sequence of symbols. Said sequence is compared to the dictionary of known gestures and associated with that class to which the best-matching string belongs.

The publication "Object detection by contour segment networks" by V. Ferrari and others describes a method of object detection in real pictures on the basis of a single hand-drawn example as the model. The picture edges are subdivided into contour segments and organized in an image representation that encodes its connections. The object detection problem is formulated as localization of paths on the part of the network that reproduces the outline of the model. A detection technique will be described.

The publication "Robust object recognition with cortex-like mechanisms" by T. Serre and others (published in: IEEE, Transactions on Pattern Analysis and Machine Intelligence, Vol. 29, No. 3, March 2007) describes a concept of recognizing complex visual scenes. The publication describes a hierarchic system that follows the organization of the visual cortex and that builds up increasingly complex and invariant feature representation by alternating between a template comparison and an operation of maximum abstraction.

The publication "Visual hand tracking using non-parametric belief propagation" by E. B. Sudderth and others (published in: MIT Laboratory for Information and Decision Systems Technical Report, P-2603, May 2004) describes probability-based methods of optically tracking a three-dimensional biometric hand model on the basis of a picture sequence. Use is made of a redundant representation wherein each model component is described by its position and orientation within a world-coordinate framework. Said document defines a model that forces the kinematic restrictions implied by the joints of the model. The redundant representation enables color-based and edge-based probability measures, such as the chamfer distance, for example, to be able to be broken down in a manner similar to cases where there is no self-overlay. On the basis of this graphic model of the kinematics of a hand, the movement of a hand is tracked by using an algorithm of non-parametric belief propagation. Non-parametric belief propagation assumes the future distribution over hand configurations as a collection of samples. Non-parametric belief propagation uses the graphic structure for reducing the dimensionality of said distributions.

The publication "Hand gesture extraction by active shape models" by N. Liu and B. C. Lovell (published in: Proceedings of the Digital Imaging Computing: Techniques and Applications, DICTA 2005) describes application of a statistic model for hand gesture extraction and recognition. Once the hand contours have been found by a system for real-time segmentation and tracking, a set of feature points is marked automatically or manually along the contour. A set of feature vectors is normalized and aligned. The set of feature vectors is then trained by using a main-component analysis. An average shape, eigenvalues and eigenvectors are calculated and The publication "MAP—Inference for highly-connected graphs with DC-programming" by J. Kappes and C. Schnörr describes a draft of conclusion algorithms for discrete-valued Markov random fields. The publication mentioned describes a class of mathematical algorithms that may be applied to the class of problems mentioned, a convergence toward a critical point of the target function being guaranteed. The resulting iterative algorithms may be interpreted as simple message transmission algorithms that converge because of their design.

The article "Real-time object detection for 'smart' vehicles" by D. M. Davrila and V. Philomin describes a shape-based object detection method based on distance transformations. The method uses a hierarchy of templates to detect the plurality of object shapes. Efficient hierarchies may be created for given shape distributions while using stochastic optimization techniques. A comparison includes a simultaneous coarse-to-fine approach via the shape hierarchy and via the transformation parameters.

The article "Cassandra: Audio-video sensor fusion for aggression detection" by W. Zajdel and others (published at the IEEE International Conference on Advanced Video and Signal based Surveillance (AVSS), London, 2007) describes an intelligent monitoring system called Cassandra which is directed to detect aggressive human behavior in public environments. In this context, the complementary nature of audio detection and video detection is utilized. At a low level, independent analysis of the audio stream and the video stream is performed. At a higher level, a dynamic Bayesian network is used as a combination mechanism in order to obtain an indication of aggression for a scene.

The publication "Schürmann-Polynomials—Roots and Offsprings" by U. Miletzki describes an influence of the so-called "Schürmann polynomials" on today's pattern recognition.

Further details regarding computer-based picture recognition may be found, for example, in the "Handbook of Mathematical Models in Computer Vision".

In view of what was said above, there is a need for a concept for recognizing gestures in a picture which enables particularly reliable recognition of gestures.

SUMMARY

According to an embodiment, an apparatus for recognizing gestures in a picture may have: a Hough transformer configured to identify arcs in the picture or in a pre-processed version of the picture as identified gesture elements so as to acquire information about the identified gesture elements; a gesture description creator configured to acquire a gesture description while using the information about the identified gesture elements; and a gesture classifier configured to compare the gesture description to a plurality of comparative gesture descriptions having gesture codes associated with them so as to provide, as the result of the comparison, a gesture code of a recognized gesture; wherein the Hough transformer is configured to identify a plurality of straight-line segments extending through the picture in various directions as identified gesture elements; wherein the Hough transformer is configured to provide information about a location, a length or a direction of an identified straight-line segment, and wherein the gesture description creator is configured to use the information, provided by the Hough transformer, about the identified straight-line segments for creating the gesture description; wherein the gesture description creator is configured to acquire as the gesture description a description of a gesture describing the gesture as an ordered listing of parameters of identified gesture elements.

According to another embodiment, a method for recognizing gestures in a picture may have the steps of: performing at least one Hough transform for identifying arcs in the picture or in a pre-processed version of the picture as identified gesture elements so as to acquire information about the identified gesture elements, and to identify a plurality of straight-line segments extending through the picture in various directions as identified gesture elements to provide information about a location, a length or a direction of an identified straight-line segment; creating a gesture description while using the information about the identified gesture elements, so that the gesture description describes the gesture as an ordered listing of parameters of identified gesture elements, the information about the identified straight-line segments that is provided by the Hough transform being used for creating the gesture description; and comparing the gesture description to a plurality of comparative gesture descriptions having gesture codes associated with them so as to provide a gesture code of a recognized gesture as the result of the comparison.

Another embodiment may have a computer program for performing a method for recognizing gestures in a picture, which method may have the steps of: performing at least one Hough transform for identifying arcs in the picture or in a pre-processed version of the picture as identified gesture elements so as to acquire information about the identified gesture elements, and to identify a plurality of straight-line segments extending through the picture in various directions as identified gesture elements to provide information about a location, a length or a direction of an identified straight-line segment; creating a gesture description while using the information about the identified gesture elements, so that the gesture description describes the gesture as an ordered listing of parameters of identified gesture elements, the information about the identified straight-line segments that is provided by the Hough transform being used for creating the gesture description; and comparing the gesture description to a plurality of comparative gesture descriptions having gesture codes associated with them so as to provide a gesture code of a recognized gesture as the result of the comparison, when the computer program is performed in a computer.

According to another embodiment, a camera system may have: a camera configured to provide a camera signal describing a camera picture taken by the camera; an apparatus for recognizing gestures in a picture in accordance with claim 1, the apparatus for recognizing gestures being configured to receive the camera picture and to acquire the gesture code on the basis thereof; and a camera controller configured to set an alignment, focussing or function of the camera in dependence on the gesture code of the gesture identified in the camera picture.

According to another embodiment, a device configuration may have: a device including a device controller; a camera configured to provide a camera signal describing a camera picture taken by the camera; and an apparatus for recognizing gestures in a picture in accordance with claim 1, the apparatus for recognizing gestures being configured to receive the camera picture and to acquire the gesture code on the basis thereof; the device controller being configured to control a function of the device in dependence on the gesture code.

According to another embodiment, an apparatus for recognizing gestures in a picture may have: Hough transformer configured to identify arcs in the picture or in a pre-processed version of the picture as identified gesture elements so as to acquire information about the identified gesture elements; a gesture description creator configured to acquire a gesture description while using the information about the identified gesture elements; and a gesture classifier configured to compare the gesture description to a plurality of comparative gesture descriptions having gesture codes associated with them so as to provide, as the result of the comparison, a gesture code of a recognized gesture; wherein the gesture description creator is configured to describe as the gesture description an ordered set of parameters describing contour sections of a gesture area, and wherein the gesture classifier is configured to compare the ordered set of parameters to a plurality of comparative parameter sets associated with comparative gestures, so as to acquire information about differences between the ordered set of parameters and the comparative parameter sets, and wherein the gesture classifier is configured to compare one or more cyclically rotated-through versions of the ordered set of parameters to the plurality of comparative parameter sets so as to acquire information about differences between one or more cyclically rotated-through versions of the ordered set of parameters and the comparative parameter sets, and wherein the gesture classifier is configured to determine, on the basis of the information about the differences, a gesture code belonging to the ordered set of parameters or belonging to a rotated-through version of the ordered set of parameters.

According to another embodiment, an apparatus for recognizing gestures in a picture may have: a Hough transformer configured to identify arcs in the picture or in a pre-processed version of the picture as identified gesture elements so as to acquire information about the identified gesture elements; a gesture description creator configured to acquire a gesture description while using the information about the identified gesture elements; and a gesture classifier configured to compare the gesture description to a plurality of comparative gesture descriptions having gesture codes associated with them so as to provide, as the result of the comparison, a gesture code of a recognized gesture; wherein the gesture description creator is configured to describe as the gesture description an ordered set of parameters describing contour sections of a gesture area, and wherein the gesture classifier is configured to compare the ordered set of parameters to a plurality of comparative parameter sets associated with comparative gestures, so as to acquire information about differences between the ordered set of parameters and the comparative parameter sets, and wherein the gesture classifier is configured to compare one or more scaled versions of the ordered set of parameters to the plurality of comparative parameter sets so as to acquire information about differences between the at least one scaled version of the ordered set of parameters and the comparative parameter sets, and wherein the gesture classifier is configured to determine, on the basis of the information about the differences, a gesture code belonging to the ordered set of parameters or belonging to a scaled version of the ordered set of parameters.

According to another embodiment, an apparatus for recognizing gestures in a picture may have: a Hough transformer configured to identify arcs in the picture or in a pre-processed version of the picture as identified gesture elements so as to acquire information about the identified gesture elements; a gesture description creator configured to acquire a gesture description while using the information about the identified gesture elements; and a gesture classifier configured to compare the gesture description to a plurality of comparative gesture descriptions having gesture codes associated with them so as to provide, as the result of the comparison, a gesture code of a recognized gesture; wherein the gesture description creator is configured to describe as the gesture description a set of parameters describing contour sections of a gesture area, and wherein the gesture classifier is configured to detect whether the set of parameter values violates a pre-defined physical location condition, and to suppress provision of the gesture code or to signal an error if the set of parameter values violates the predefined location condition.

According to another embodiment, an apparatus for recognizing gestures in a picture may have: a Hough transformer configured to identify arcs in the picture or in a pre-processed version of the picture as identified gesture elements so as to acquire information about the identified gesture elements; a gesture description creator configured to acquire a gesture description while using the information about the identified gesture elements; and a gesture classifier configured to compare the gesture description to a plurality of comparative gesture descriptions having gesture codes associated with them so as to provide, as the result of the comparison, a gesture code of a recognized gesture; wherein the gesture description creator is configured to provide as the gesture description a set of parameters describing contour sections of a gesture area, and wherein the gesture classifier is configured to determine a current gesture code describing a current gesture state in dependence on a previous gesture code that is determined on the basis of a previous picture and describes a previous gesture state.

Embodiments in accordance with the invention provide an apparatus for recognizing gestures in a picture. The apparatus includes a Hough transformer configured to identify any arcs in the picture or in a pre-processed version of the picture as identified gesture elements to obtain information about the identified gesture elements. The apparatus further includes a gesture description creator configured to obtain a gesture description while using the information about the identified gesture elements. The apparatus further includes a gesture classifier configured to compare the gesture description to a plurality of comparative gesture descriptions having gesture codes associated with therewith so as to provide a gesture code of an identified gesture as the result of the comparison.

The mentioned embodiment in accordance with the invention is based on the finding that by means of a Hough transformer, gesture elements, i.e. for example circular arcs or elliptical arcs (or, in some embodiments, also straight-line segments), may be identified in a particularly advantageous manner, and that the locations of the gesture elements thus identified represent a characteristic gesture description that may be efficiently used for identifying gestures.

In other words, it has been recognized that identification of individual gesture elements, i.e. of arcs or straight-line segments, enables efficient processing. By the identification of gesture elements that is performed in the Hough transformer, a gesture is broken down into a plurality of clearly defined individual elements, namely a plurality of individual arcs (e.g. circular arcs or elliptical arcs) (and, optionally, additionally straight-line segments). This offers the possibility of describing gestures by means of a small number of parameters, namely, for example, by the locations of the identified gesture elements. The identified gesture elements and/or their location parameters therefore represent a form of description that is suited for particularly efficient classification (for example while using a database comparison or while using any other classification concept).

If a gesture consists, for example, of many thousand pixels (for example one hundred pixels times one hundred pixels=10,000 pixels), the gesture description created in the inventive manner will include, e.g., only a comparatively small number of location parameters. For example, each of the fingertips of a gesture that is represented by a human hand may have a location parameter associated with it. Additionally, e.g., further location parameters may be used; in many cases, about 10 to 20 location parameters of characteristic points of the gesture are sufficient for identifying and/or classifying the gesture.

Thus, location parameters of the identified gesture elements are extremely suitable for efficient classification (for example while using a database comparison), and therefore represent characteristic information about a gesture. Specifically, various gestures differ from one another specifically in terms of the locations of the individual gesture elements (for example fingertips) that are represented in the picture by arcs (or details of arcs) for example.

For example, an outline of a hand includes precisely such gesture elements (for example sections of arcs, such as circular arcs or elliptical arcs, and straight lines) that may be detected by a Hough transformer. In addition, a contour line of a hand typically is composed of a plurality of successive arcs (possibly with approximately straight lines between them), so that a description of these various gesture elements (arcs and possibly straight lines) is particularly suitable for classifying the gesture.

In addition it shall be noted that, by using a Hough transform, recognition of gestures in pictures of poor quality (e.g. in pictures that were taken with low resolution or in difficult conditions, such as in darkness or in the rain) is possible with a high level of reliability. Specifically, a Hough transformer is capable of recognizing even linear courses exhibiting comparatively short interruptions (which may be due to image noise or other image interference) as a contiguous course. Thus, the inventive concept for recognizing gestures is not considerably affected even by the existence of pictures of comparatively poor quality.

Thus, two essential advantages are achieved by using a Hough transformer in recognizing gestures. Firstly, the information about recognized gesture elements that is provided by the Hough transformer is particularly reliable and meaningful information which enables efficient database comparison. Secondly, interference in the picture, for example interruptions of a contour of the gesture, is essentially balanced off by using a Hough transformer, so that reliable gesture recognition is possible even in the case of pictures of poor quality.

In one embodiment in accordance with the invention, the apparatus includes an area parameter determiner configured to determine an area parameter of a gesture area. The gesture description creator in this embodiment may be configured to obtain the gesture description while using the area parameter. Utilization of an area parameter in creating the gesture description enables determining a comprehensive gesture description that goes beyond merely taking into account a contour line of the gesture. For example, the location of the palm of the hand is an important constituent of a human gesture made by using the hand. However, due to its two-dimensional extension, the palm of a hand in many cases can be described far better by an area parameter than by a description of the corresponding contours.

By utilizing area information, a large amount of information may be condensed within in a single parameter of the gesture description, for example. In addition, utilization of an area parameter in some embodiments has the advantage that positions of gesture elements identified by the Hough transformer may be related to a position of an area and/or of a centroid of an area. In this manner, a particularly meaningful gesture description may be obtained which unifies both information regarding a contour line of a gesture area and information regarding the gesture area itself.

In addition, the area information may be used, e.g., for normalizing the gesture description, whereby a gesture description may be achieved, for example, which is independent of a size of a picture showing the gesture, and/or is independent of a size in which the gesture is depicted in the picture.

In one embodiment, the gesture description creator is configured to obtain, as the gesture description, a description of a gesture that describes the gesture as an ordered description of identified gesture elements. If the individual gesture elements are thus brought into a predetermined order in accordance with a predefined arrangement rule, classification (for example by using a database comparison) may be made in a particularly efficient manner.

In one embodiment in accordance with the invention, the gesture description creator is configured to put the gesture description into such an order that the ordered identified gesture elements describe a continuous contour line of a gesture area. In this case, the arrangement of the gesture description corresponds to a "natural" sequence of how the gesture, or its outline, would be traced by a person, for example. Typically, the corresponding description is unambiguous. Thus, the described implementation of the gesture description creator in turn results in a particularly efficient and typically unambiguous gesture description, whereby a database comparison performed, for example, in the classification, may be very efficient.

In one embodiment in accordance with the invention, the apparatus is configured to identify pixels whose color values are within a predefined range as pixels that belong to a gesture area. Such identification of the gesture area is expedient in many cases, since a gesture typically is represented by an approximately monochrome body part. However, a fine structure within the gesture area is not significant in many cases, so that an amount of information to be processed may be reduced in that fine gradations of the color within the gesture area are masked out.

In one embodiment in accordance with the invention, the apparatus includes a picture detail selector configured to identify, in the picture, a picture detail including a contiguous gesture area. In this case the Hough transformer may be configured to process a pre-processed version of the picture which corresponds to the picture detail. By implementing the inventive apparatus accordingly, efficiency in processing may be increased, for example. Specifically, if one finds that within a particular region of the picture there is no gesture area, said region which has no picture area contained therein may be masked out for further processing. Accordingly, the expenditure involved in performing the Hough transform will be reduced.

In one embodiment in accordance with the invention, the gesture classifier is configured to perform so-called "symbolic affine mapping". By performing such a symbolic affine mapping, classification of a gesture is made substantially easier. By performing the symbolic affine mapping, e.g. a rotation of the gesture (with regard to a comparative gesture) or a change in a size of a gesture area (with regard to the gesture area of a comparative gesture) may thus be taken into account, the expense involved in performing the classification remaining at an acceptable level.

In one embodiment in accordance with the invention, the gesture description creator is configured, for example, to provide, as the gesture description, an ordered set of parameters describing contour sections of a gesture area. In this case, the gesture classifier may be configured, for example, to compare the ordered set of parameters to a plurality of comparative parameter sets having comparative gestures associated therewith so as to obtain information about differences between the ordered set of parameters and the comparative parameter sets.

The gesture classifier may further be configured to compare one or more cyclically through-rotated versions of the ordered set of parameters to the plurality of comparative parameter sets so as to obtain information about differences between the one or more versions, that are cyclically rotated through, of the ordered set of parameters and the comparative parameter sets. The gesture classifier may further be configured to obtain a gesture code on the basis of the information about the differences. By said rotating-through of ordered parameter sets of gesture elements identified by the Hough transformer, a rotation of the gesture may thus be represented, or established, within the context of symbolic affine mapping. From that point of view, a gesture may be recognized even when, e.g., a camera taking the picture is slightly turned out of position relative to the gesture, or vice versa. In addition, gestures may also be detected and differentiated in different directions in the above-mentioned manner without there being, e.g., comparative parameter sets for all of the possible alignments of the gesture (e.g. in a database). For example, it is possible to determine how often a set of gesture element parameters, which sufficiently matches a comparative parameter set, has been rotated through. An orientation of the gesture may then be determined in a highly efficient manner by means of the corresponding information (e.g. in the form of a simple numerical value).

By using symbolic affine mapping, it is also possible to refrain from repeatedly rotating and repeatedly analyzing a picture showing a gesture. Thus, by performing the symbolic affine mapping while using the gesture elements identified by the Hough transformer, efficiency in recognizing gestures is increased considerably.

In one embodiment, the gesture description creator may be configured to provide, as the gesture description, an ordered set of parameters describing the contour sections of a gesture area. The gesture classifier may be configured, for example, to compare the ordered set of parameters to a plurality of comparative parameter sets associated with comparative gestures in order to obtain information about differences between the ordered set of parameters and the comparative parameter sets. The gesture classifier may further be configured to compare one or more scaled versions of the ordered set of parameters to a plurality of the comparative parameter sets so as to obtain information about differences between the one or more scaled versions of the ordered set of parameters and the comparative parameter sets. The gesture classifier may also be configured to determine, on the basis of the information about the differences, a gesture code belonging to the ordered set of parameters or belonging to a scaled version of the ordered set of parameters.

Within the context of symbolic affine mapping, size scaling of the gesture area may also be taken into account in addition to a rotation. This may be effected such that the individual gesture elements identified by the Hough transformer and described in the gesture description are scaled with regard to their sizes. In this manner, dependence of the classification on a size of the gesture area may thus be reduced.

In one embodiment, the gesture classifier is configured to obtain the one or more scaled versions of the ordered set of parameters in such a manner that the one or more scaled versions describe an outline of a scaled gesture area that is enlarged or reduced in size as compared to a gesture area that is actually contained in the picture.

In one embodiment in accordance with the invention, the gesture description creator may be configured to provide, as the gesture description, a set of parameters describing contour sections of a gesture area. The gesture classifier may be configured, for example, to determine—by means of a physical model of a part of the body that forms the gesture—a probability with which the position, described by the set of parameters, of individual elements of the part of the body is assumed. The gesture classifier may further be configured to take into account the probability for determining the gesture code.

Thus, it is possible to take into account, when classifying the gestures, information about a physical model of a part of the body by which the gesture is formed. For example, one may take into account that some positions of individual elements of a body part are comparatively unlikely. For example, it is unlikely for two fingers to form an angle larger than about 60°. In addition, there are obviously a series of further geometric limitations with regard to a body part forming a gesture. By taking into account such physical framework conditions, accuracy in recognizing a gesture may be improved.

In one embodiment, the gesture description creator may be configured to provide, as the gesture description, a set of parameters describing contour sections of a gesture area. The gesture classifier may be configured to recognize whether the set of parameter values violates a predefined condition, and to suppress provision of the gesture code if the set of parameter values violates the predefined condition. In this manner, a violation of physical limitations with regard to a body part which forms the gesture may also be taken into account, for example.

In accordance with a further embodiment, the gesture description creator may be configured to provide, as the gesture description, a set of parameters describing contour sections of a gesture area. The gesture classifier may be configured to determine the current gesture code, which describes a current gesture state, in dependence on a gesture code that was previously determined on the basis of a previous picture and that describes a previous gesture state. Thus, the classifier may take into account the dynamics of the gesture. For example, the gesture classifier may ascertain that a specific follow-up gesture following a preceding gesture is particularly likely or particularly unlikely. For example, one may assume that a body part, or an individual part of the body part, moves only at a specific maximum speed. From that point of view, it may be assumed that an abrupt transition between two clearly different gestures is very unlikely, whereas a transition between two quite similar gestures is comparatively likely. The corresponding transition probability between two successive gesture states taken into account by the classifier is, e.g., highly useful in cases where the gesture description cannot be unambiguously associated with a specific gesture (or comparative gesture). If, for example, two different gestures result in similar gesture descriptions, it is possible to determine, on the basis of a previously assumed gesture, which of several gestures that basically come into question due to the identified gesture elements is actually present (or is most likely to be present).

In one embodiment, the gesture classifier may be configured to evaluate, when determining a current gesture code, state transition admissibility information describing which current gesture states may be assumed on the basis of a previous gesture state. Thus, a current gesture state and/or an associated gesture code may be determined, for example, on the basis of a hard decision (e.g. "transition state admissible" or "state transition inadmissible").

Alternatively or additionally, the gesture classifier may be configured to evaluate, when determining a current gesture code, state transition probability information describing the level of likelihood of a transition from a previous gesture state to various current gesture states. Thus, the current gesture state and/or the associated gesture code may be determined by using a soft decision.

The present invention provides a corresponding method and a corresponding computer program for recognizing gestures in a picture.

In addition, the present invention provides an apparatus and a method for controlling a device, as well as a corresponding computer program.

BRIEF DESCRIPTION OF THE DRAWINGS

Embodiments in accordance with the present invention will be explained below in more detail with reference to the accompanying figures, wherein:

FIG. 6c shows a representation of formulae for calculating an overall angular momentum m of a gesture area in a picture and for calculating an angular momentum $m_x$ in an x direction and an angular momentum $m_y$ in a y direction;

FIG. 8 shows a schematic representation of parameters for describing arcs or straight-line segments;

DETAILED DESCRIPTION OF THE INVENTION

Figure 1:
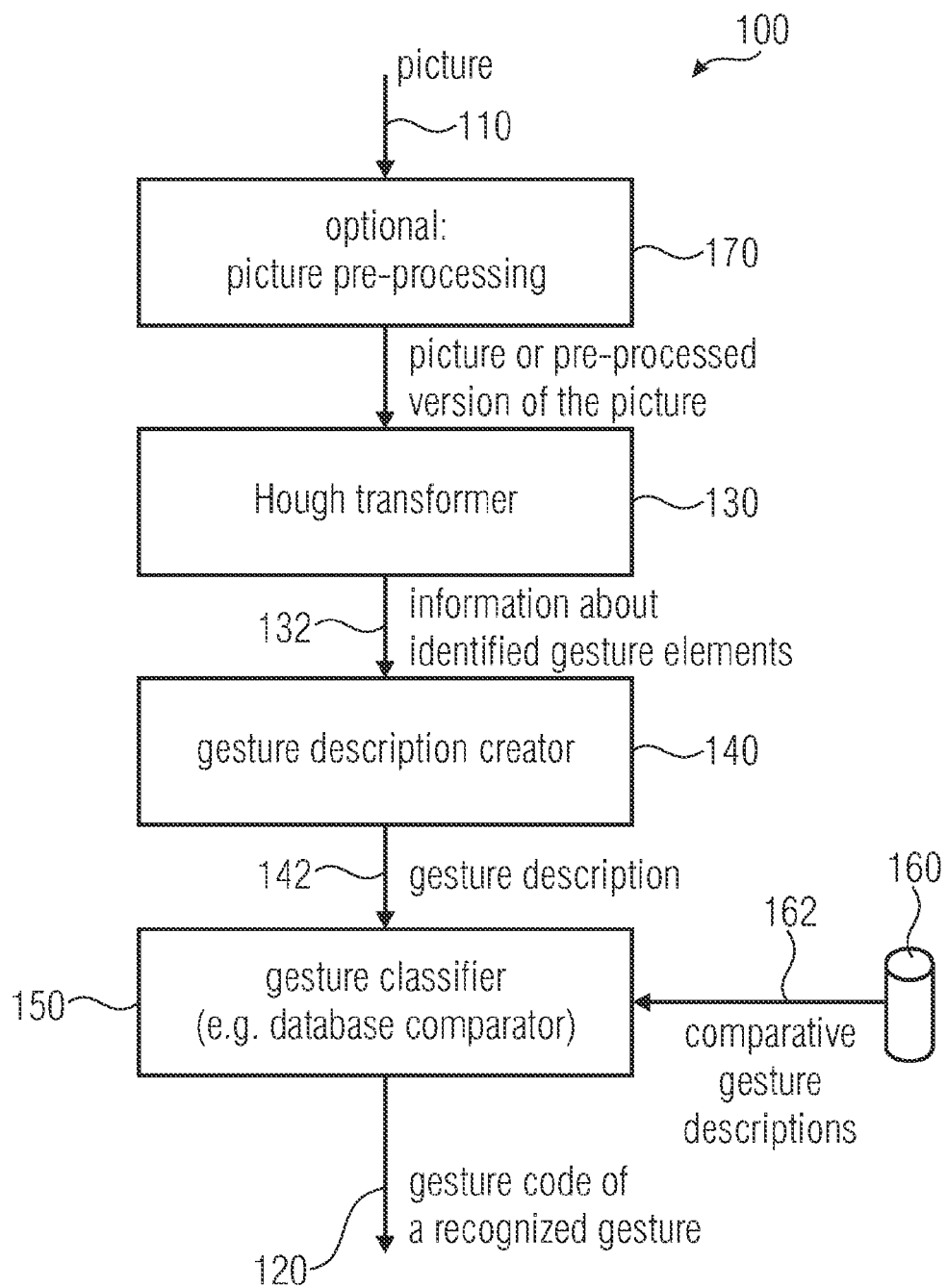
FIG. 1 shows a block diagram of an apparatus for recognizing a gesture in a picture, in accordance with an embodiment of the invention.

Apparatus in Accordance with FIG. 1

FIG. 1 shows a block diagram of an apparatus for recognizing characters in a picture. The apparatus in accordance with FIG. 1 is designated by 100 in its entirety. The apparatus 100 is configured to receive a picture 110 and to provide, on the basis of the picture 110, a gesture code 120 of a gesture recognized in the picture 110. The apparatus 100 comprises a Hough transformer 130 configured to receive the picture 110 or a pre-processed version of the picture, and to provide information 132 about identified gesture elements. The apparatus 100 further comprises a gesture description creator 140 configured to receive the information 132 about identified gesture elements from the Hough transformer 130 and to provide a gesture description 142 on the basis of the information 132 about the identified gesture elements. The apparatus 100 further includes a gesture classifier 150 configured to receive the gesture description 142 from the gesture description creator 140 and to provide, on the basis thereof, the gesture code 120 of a recognized gesture.

The apparatus 100 may optionally include a database 160 configured to provide a plurality of comparative gesture descriptions to the gesture classifier.

The apparatus 100 may further optionally comprise picture pre-processing 170, which may be configured to receive the picture 110 and to make a pre-processed version of the picture available to the Hough transformer 130.

On the basis of the above structural description, the function of the present apparatus 100 for recognizing gestures in a picture will be described in the following. For gesture recognition, the apparatus 100 receives the picture 110. The Hough transformer 130 may be configured, for example, to identify arcs (e.g. circular arcs and/or elliptical arcs, or details of such arcs) in the picture or in a pre-processed version of the picture as identified gesture elements. The Hough transformer 130 may thus obtain the gesture information 132 about the identified gesture elements and may make it available the gesture description creator 140. The gesture description creator 140 may be configured, for example, to obtain the gesture description 142 while using the information 132 about the identified gesture elements. Thus, the gesture description 142 may describe, e.g., a set of identified gesture elements.

The gesture classifier may be configured, for example, to compare the gesture description 142 to a plurality of comparative gesture descriptions (for example from the optional database 160) having gesture codes associated with them, and to provide, as the result of the comparison, the gesture code of a recognized gesture.

It may thus be stated that the apparatus 100 enables identifying a gesture in the picture 110 in an efficient and reliable manner. By means of the Hough transformer 130, particularly characteristic gesture elements, such as arcs (e.g. circular arcs and elliptical arcs, or details of such arcs) in the picture (or in a pre-processed version of the picture), may be identified. Identification of gesture elements by the Hough transformer is possible in a particularly reliable and fast manner, since the Hough transformer may recognize such gesture elements even in a disturbed picture. Additionally, the Hough transformer is able to determine, e.g., arcs having different radii of curvature in a highly reliable and efficient manner. Thus, information about identified gesture elements may be obtained in a reliable and efficient manner, it being possible for the particularly important elements of a gesture to be described by parameters.

Thus, the gesture description creator 140 is able to produce, on the basis of the information 132 provided by the Hough transformer, a meaningful and reliable gesture description 142 that may summarize, for example, the information about several gesture elements identified by the Hough transformer. The gesture description creator 140 thus receives compact information (e.g. parameters of identified gesture elements) from the Hough transformer 130, and only needs to combine it into a gesture description.

Finally, the gesture classifier 150 may determine the gesture code 120 in an efficient and reliable manner on the basis of the gesture description 142. The gesture classifier benefits from the fact that the particularly characteristic elements of a gesture, such as arcs (e.g. details of full arcs), may be extracted by the Hough transformer in an isolated, or discrete, manner. Thus, the gesture description may end up being very compact, artefacts in the picture being suppressed by the Hough transformer and thus not unnecessarily inflating the gesture description 142. From this point of view, the gesture classification within the gesture classifier 150 may also be performed in a highly efficient manner.

In addition it is to be stated that, precisely by using the Hough transformer, a high level of fault tolerance and precision may be achieved. Contour lines of a gesture area which have, e.g., minor interruptions (e.g. due to image interferences) may nevertheless be reliably processed by the Hough transformer 130, so that quite precise information about a location of the corresponding gesture elements may be provided by the Hough transformer. Accordingly, the gesture code may also be determined with high precision in the gesture classifier 150.

In summary, it is to be stated, therefore, that utilization of the Hough transformer 130 in gesture recognition entails considerable advantages, so that utilization of the Hough transformer 130 enables setting up efficient gesture recognition at moderate expenditure in terms of resources and with high reliability.

Figure 2:
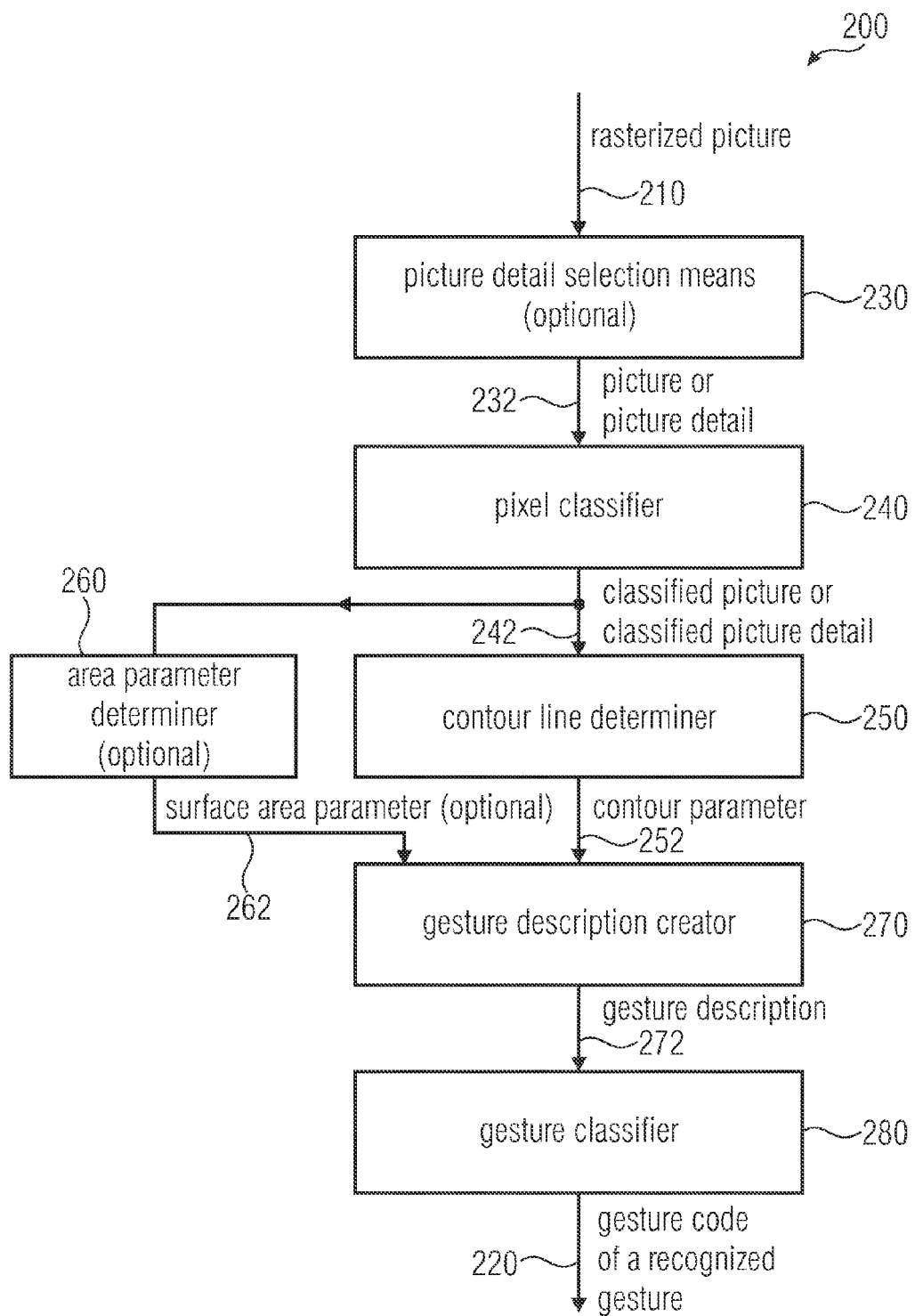
FIG. 2 shows a block diagram of an apparatus for recognizing a gesture in a picture, in accordance with a further embodiment of the invention.

Apparatus in Accordance with FIG. 2

FIG. 2 shows a block diagram of an apparatus for recognizing gestures in a picture. The apparatus in accordance with FIG. 2 is designated by 200 in its entirety. The apparatus 200 is configured to receive a rasterized picture 210 and to provide, on the basis of the rasterized picture 210, a gesture code 220 of a gesture recognized in the rasterized picture. The apparatus 200 optionally includes a picture detail selection means 230 configured to receive the rasterized picture 210 and to provide, on the basis thereof, a selected picture detail 232 or information about a picture detail to be selected. The apparatus 200 further includes a pixel classifier 240 configured to receive the rasterized picture 210 or a picture detail provided by the optional picture detail selection means 230, and to classify the pixels contained in the picture 210 or picture detail 232. The pixel classifier 240 is further configured to provide a classified picture 242 (or a classified picture detail 242) on the basis of the rasterized picture 210 or the rasterized picture detail 232. The apparatus 200 further includes a contour line determiner 250 configured to receive the classified picture 242 (or the classified picture detail) and to provide contour parameters 252 on the basis of the classified picture (or the classified picture detail). Optionally, the apparatus 200 further includes an area parameter determiner 260 which may be configured, for example, to receive the classified picture (or the classified picture detail) and to provide at least one area parameter 262 on the basis of the classified picture (or the classified picture detail). The apparatus 200 further includes a gesture description creator 270 configured to receive the contour parameter 252 (or a plurality of contour parameters). The gesture description creator may optionally further be configured to receive the optional area parameter 262 (or a plurality of area parameters). The gesture description creator 272 is configured to provide a gesture description 272 on the basis of the contour parameter 252 (or a plurality of contour parameters 252). The gesture description creator 272 may optionally be configured to also take into account the area parameter 262 (or a plurality of area parameters 262) when creating the gesture description 272, as will be described in the following.

The apparatus 260 further includes a gesture classifier 280 configured to receive the gesture description 272 and to provide the gesture code 220 of a recognized gesture on the basis of the gesture description 272.

The function of the apparatus 200 will be described in detail below on the basis of the above structural description.

The apparatus 200 may be configured, for example, to generate the classified picture 242 on the basis of a rasterized picture. In this context, a decision may be made on the basis of the rasterized picture 210 as to which pixels of the rasterized picture 210 belong to a gesture area. Thus, a decision may be made—on the basis of the rasterized picture, for example by means of the color values—as to which pixels are classified as belonging to a gesture, and which pixels are classified as not belonging to a gesture. With corresponding processing it may be recognized, for example by the picture detail selection means 230, that a specific region of the rasterized input picture 210 has no pixels located therein which belong to a gesture. For example, if it is found that a specific sub-region of the rasterized picture 210 has no pixels located therein which have a color of skin (or any other predefined color), and/or that a specific sub-region of the rasterized picture 210 has no contiguous area of a predefined minimum size located therein, the picture detail selection means may decide that for further processing only one or more picture details are used wherein a corresponding gesture area (i.e. an area having a specific identified color, or an approximately monochromatic area having a predefined minimum extension) is located.

In the following description, reference will be made, for simplification purposes, to processing of a picture, it being possible for further processing of a picture detail to be effected in the same manner.

On the basis of the classified picture 242 provided by the pixel classifier 240, a description of properties of a contour line of a gesture area may be determined. To this end, the contour line determiner 250 may determine, for example on the basis of the classified picture 242, contour parameters 252 which describe individual sections of a contour line of a gesture area and which may be regarded as information about identified gesture elements. For example, the contour parameters 252 may describe where a contour line of a gesture area comprises local extremes in a predefined direction. For example, the contour parameters 252 may describe a location of arcs (e.g. of circular arcs or elliptical arcs) which approximate a contour line of a gesture area, as will be described in detail below. Optionally, the contour parameters 252 may also describe a location of straight-line segments that are part of the contour line of the gesture area (or which approximate the contour line of the gesture area), as will also be described in detail below. All in all, the contour line determiner thus serves to provide, on the basis of the classified picture 242, a set of contour parameters 252 which represent a meaningful description with regard to a gesture contained in the rasterized picture. The gesture description creator 270 is configured to create the gesture description 272 while using the set of contour parameters 252. In this context, the gesture description creator may use different strategies, as will be described in detail below. For example, the gesture description creator may take over a plurality of the contour parameters in a changed or unchanged form into the gesture description 272, as will be described in detail below. Moreover, the gesture description creator may optionally change the contour parameters 252, for example re-order, rearrange, scale them or transform them to a different coordinate system so as to obtain the gesture description 272. When creating the gesture description 272, the gesture description creator 270 may (optionally) also take into account, e.g., one or more of the optional area parameters 262 while using the contour parameters 252, as will be detailed below. The gesture description creator 270 may also create the gesture description 272, for example on the basis of a predefined rule, in such a manner that the gesture description 272 includes an ordered set of parameters describing contour sections of a gesture area. In other words, on the basis of the individual contour parameters 252, which e.g. describe properties of individual contour sections of the gesture area, the gesture description creator may create a combined gesture description 272 describing a plurality of contour sections of the gesture area. The combined gesture description 272 may describe the plurality of contour sections of the gesture area, e.g. in a sorted manner. For example, the parameters of the individual contour line sections may be sorted in accordance with the sequence in which the various sections occur along the contour line. Alternatively, sorting may also be effected on the basis of the parameters of the gesture elements, so that, for example, the gesture description initially describes all of the arcs and, subsequently, all of the straight-line segments by means of corresponding parameters. Details on this will be explained in depth in the following.

The gesture classifier 280 may associate a gesture code of a recognized gesture with the gesture description 272, which is obtained by the gesture description creator 272. In this context, the gesture classifier may decide, e.g. on the basis of a plurality of comparative gestures (or associated parameter sets of the comparative gestures), as to which of the comparative gestures is most similar to the gesture described by the current gesture description 272 (or which of the comparative gestures is sufficiently similar to the gesture described by the current gesture). Thus, the gesture classifier may decide, optionally while employing more far-reaching knowledge, which gesture type of a plurality of predetermined gesture types (described and/or represented by the comparative gestures) is contained in the rasterized picture.

It shall also be noted that the apparatus 200 in accordance with FIG. 2 essentially performs the same function as the apparatus 100 in accordance with FIG. 1. For example, the picture pre-processing 170 may take over the function of the picture detail selection means 230 and/or the function of the pixel classifier 240, for example. The Hough transformer 130 may be part of the contour line determiner 250 or form the contour line determiner 250, as will be explained in detail below. The gesture description creator 140 may have, e.g., the functionality of the gesture description creator 270, and the gesture classifier 150 may have the functionality of the gesture classifier 280, for example.

Details of the means described using FIGS. 1 and 2 will be described below in order to illustrate possible implementations of the apparatuses 100, 200. However, it is to be stated that the functionalities described in the following are to be regarded as examples only.

Picture Pre-Processing

Figure 3:
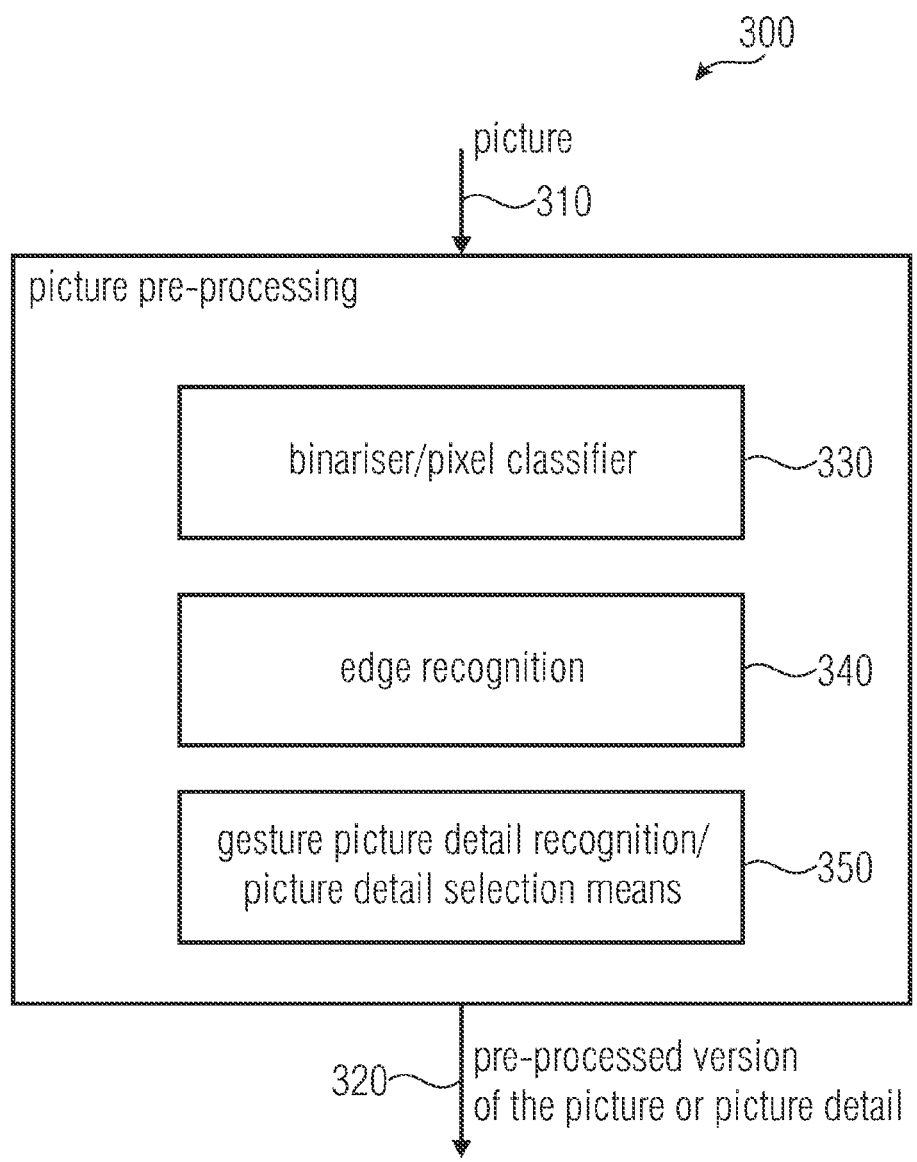
FIG. 3 shows a block diagram of a picture processing means in accordance with an embodiment of the invention.

FIG. 3 shows a block diagram of picture pre-processing in accordance with an embodiment of the present invention. The picture pre-processing in accordance with FIG. 3 is designated by 300 in its entirety. The picture pre-processing 300 may either replace picture pre-processing 170 or may take over the functionality of the picture detail selection means 230 and/or the functionality of the pixel classifier 240. For example, the picture pre-processing 300 is configured to receive a picture 310 and to provide a pre-processed version 320 of the picture or a picture detail of the picture 310 or a pre-processed version of a picture detail of the picture 310.

The picture pre-processing 300 may comprise, e.g., a binarizer, or pixel classifier. The binarizer, or pixel classifier, 330 may be configured, for example, to classify the pixels of the picture 310 into several classes. For example, the binarizer may be configured to decide whether or not a pixel of the picture belongs to the gesture. Thus, the binarizer, or pixel classifier, 330 may produce a pre-processed version of the picture, for example, wherein pixels belonging to the gesture or gesture area have a first value (for example color value "black") associated with them, and wherein pixels not belonging to the gesture area have a second value (e.g. color value "white") associated with them.

For example, the binarizer 330 may be configured to distinguish pixels having the color of skin from pixels not having the color of skin. The distinction may be made, for example, by comparing a color value (which may be described by several individual parameters) of a pixel to a comparative color value (which again may be described by several individual parameters).

For example, if the color value deviates from the comparative color value by no more than a predefined admissible deviation, the corresponding pixel may be classified as a pixel belonging to the gesture or gesture area. Otherwise, the corresponding pixel may be classified as a pixel not belonging to the gesture or gesture area. Corresponding recognition of pixels belonging to the gesture area may be effected in various color description systems (e.g. red/green/blue or cyan/magenta/yellow, or chrominance/luminance).

Moreover, it is not absolutely necessary, of course, to recognize a skin color by means of the binarizer 330. Rather, any other predefined color may also be recognized when, e.g., the gestures are created while using a human hand as well as a colored glove.

Edge Recognition:

In addition, the picture pre-processing 300 may include edge recognition 340, for example. The edge recognition 340 may be configured, for example, to recognize edges in the picture 310 or in a version of the picture, said version being provided by the binarizer 330. E.g., the edge recognizer 340 may be configured to recognize transitions between a bright region and a dark region and/or between regions of different colors as being edges. Since edge recognition is known from the field of picture processing, details of edge recognition will not be addressed here in any more depth.

Gesture Picture Detail Recognition/Picture Detail Selection Means

The picture pre-processing 300 may optionally further comprise gesture picture detail recognition and/or a picture detail selection means, which together are designated by 350. The gesture picture detail recognition may be configured, for example, to recognize a picture detail of the picture 310 or of a corresponding processed version of the picture 310 which contains a gesture (or wherein the existence of a gesture is assumed).

For example, the gesture picture detail recognizer 350 may be configured to identify, in the picture 310 (or in a pre-processed version of same) a picture detail which includes a contiguous gesture area. For example, the gesture picture detail recognizer may recognize such a picture detail of the picture 310—and select it for further processing—which contains a contiguous area which (within a predefined tolerance range) has an approximately constant color value and whose extension reaches or exceeds a predefined minimum extension. Thus, e.g. only such picture details are recognized as being (potential) gesture picture details which have a sufficiently large color area and which therefore give cause for expecting the existence of a gesture. Depending on the case of application, the color may or may not be predefined in this context. For example, the gesture picture detail recognizer may be configured to select, as potential gesture picture details, such picture details which have a contiguous, approximately monochromatic area of minimum extension contained therein anyway.

Thus, the gesture picture detail recognizer may overall provide information about possible picture details which basically may contain a sufficiently large image of a gesture. However, other picture details which do not contain any contiguous approximately monochromatic area in the first place may be suppressed by the gesture picture detail recognizer. In this manner, it is possible to prevent that areas which do not contain any gesture at all but only a background that is non-uniform in terms of color be processed further.

Thus, such a picture detail may be selected, by the picture detail selection means 350, for further processing of which one may expect with some likelihood that it actually includes an image of a gesture area of sufficient size. Other regions of the picture 310 are thus not even subjected to any further processing in the first place, for example. If several potential gesture areas are recognized in a picture, it is naturally possible for several picture details to be selected for further processing by the picture detail selection means 350.

Cooperation of Binarization, Edge Recognition and Gesture Picture Detail Recognition Additionally it is to be stated that the various work steps of binarization, edge recognition, gesture picture detail recognition, and picture detail selection may be performed in any order desired so as to obtain the pre-processed version of the picture 310, a pre-processed picture detail of the picture 310, or a selected picture detail of the picture 310. The Hough transformer, which performs further processing of the pre-processed version of the picture, of the pre-processed version of the picture detail, or of the selected picture detail, may thus be configured to process a pre-processed version of the picture which corresponds to the selected picture detail.

Details Regarding the Binarizer

Figure 4:
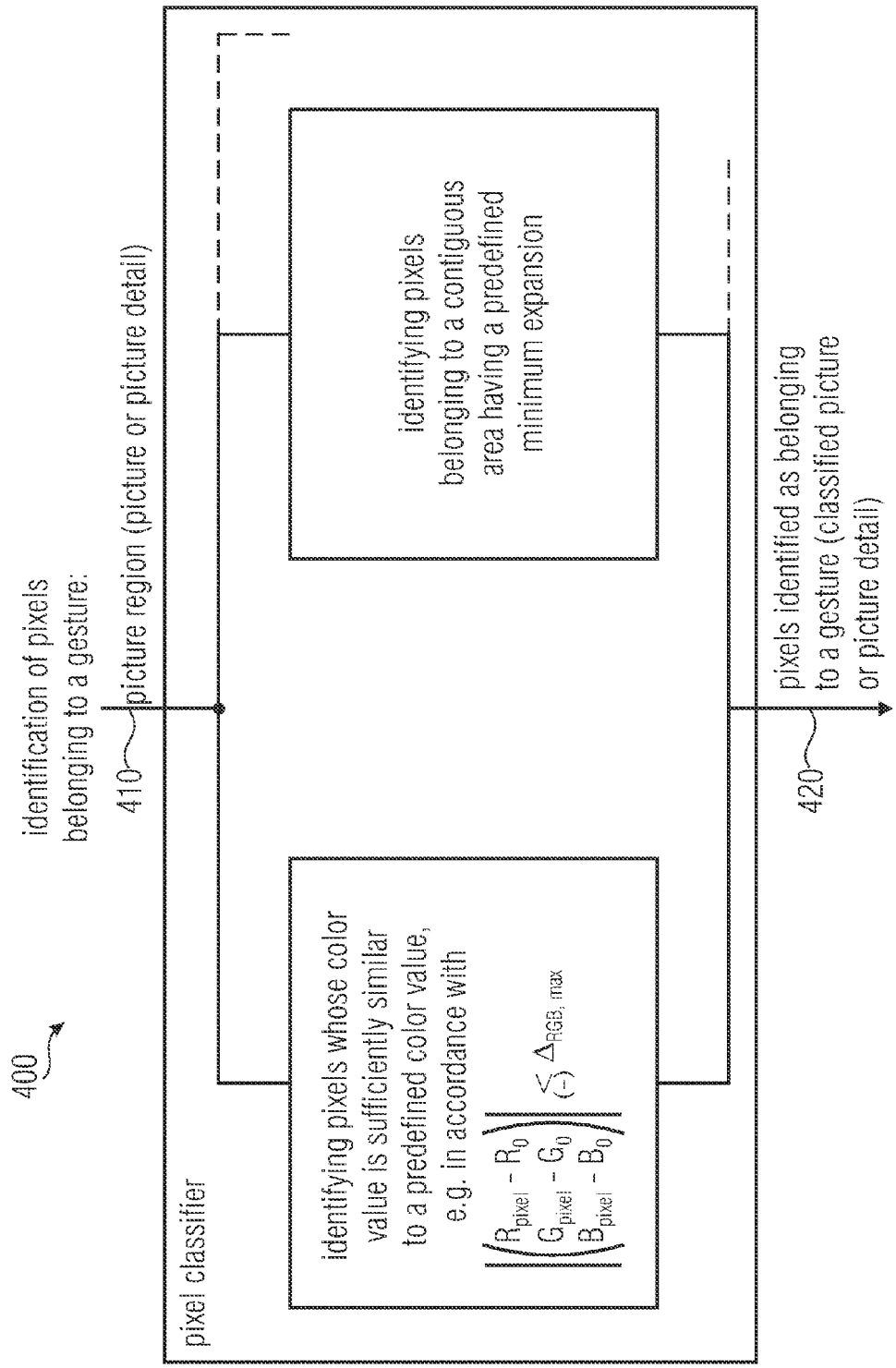
FIG. 4 shows a block diagram of a pixel classifier in accordance with an embodiment of the invention.

Details regarding the binarizer 330 will be explained by means of FIG. 4 in the following. FIG. 4 shows a block diagram of a pixel classifier, or binarizer, in accordance with an embodiment of the invention. The pixel classifier in accordance with FIG. 4 is designated by 400 in its entirety. The pixel classifier 400 is configured to identify pixels that belong to a gesture.

To this end, the pixel classifier 400 is configured to receive a picture region 410. The picture region may be the picture 310 or a selected picture detail of the picture 310, for example. Thus, the pixel classifier 400 is configured to provide information, on the basis of the picture region 410, which describes pixels that are identified as belonging to a gesture (and distinguishes them from pixels identified as not belonging to a gesture). The information 420 may thus be regarded as a description of a classified picture or of a classified picture detail. For example, the information 420 may associate the first value (or color value) with such pixels of the picture region 410 that are identified as belonging to a gesture, and may associate a second value (e.g. color value), which is different from the first value, with pixels identified as not belonging to a gesture.

This distinction between pixels belonging to a gesture or gesture area, and pixels not belonging to a gesture or gesture area, may be achieved in different ways. For example, the pixel classifier 400 may be configured to identify, in the picture region 410, such pixels whose color values are sufficiently similar to a predefined color value. For example, if the red/green/blue color values of a pixel are designated by $R_{pixel}$, $G_{pixel}$ and $B_{pixel}$, and if, for example, the predefined color value is designated by $R_0$, $G_0$ and $B_0$, for example in a red/green/blue color system, a determination may be made, e.g., by using the formula shown in FIG. 4, as to whether the color value of a pixel deviates from the predefined color value to a lesser or higher degree than does a predefined threshold value $\Delta_{RGB,max}$. Pixels whose color values differ from the comparative color value by less than the predefined deviation (threshold value) may be identified as belonging to the gesture area, whereas pixels whose color values differ from the predefined color value by more than the predefined threshold value may be identified as not belonging to the gesture area.

Alternatively or additionally, the pixel classifier 400 may be configured to identify such pixels in the picture region 410 which belong to a contiguous (approximately monochromatic) area having a predefined minimum extension. Pixels identified in such a manner may be identified as pixels belonging to a gesture and may be described by the information 420, whereas other pixels (i.e. which do not belong to a contiguous area having a predefined minimum extension) may be identified as pixels not belonging to a gesture or gesture area. Thus, a gesture may be recognized, e.g., even if the color of the associated gesture area is not exactly known (for example if gloves of different colors or the bare hand may be used).

Detailed Description of Contour Line Determination

Figure 5:
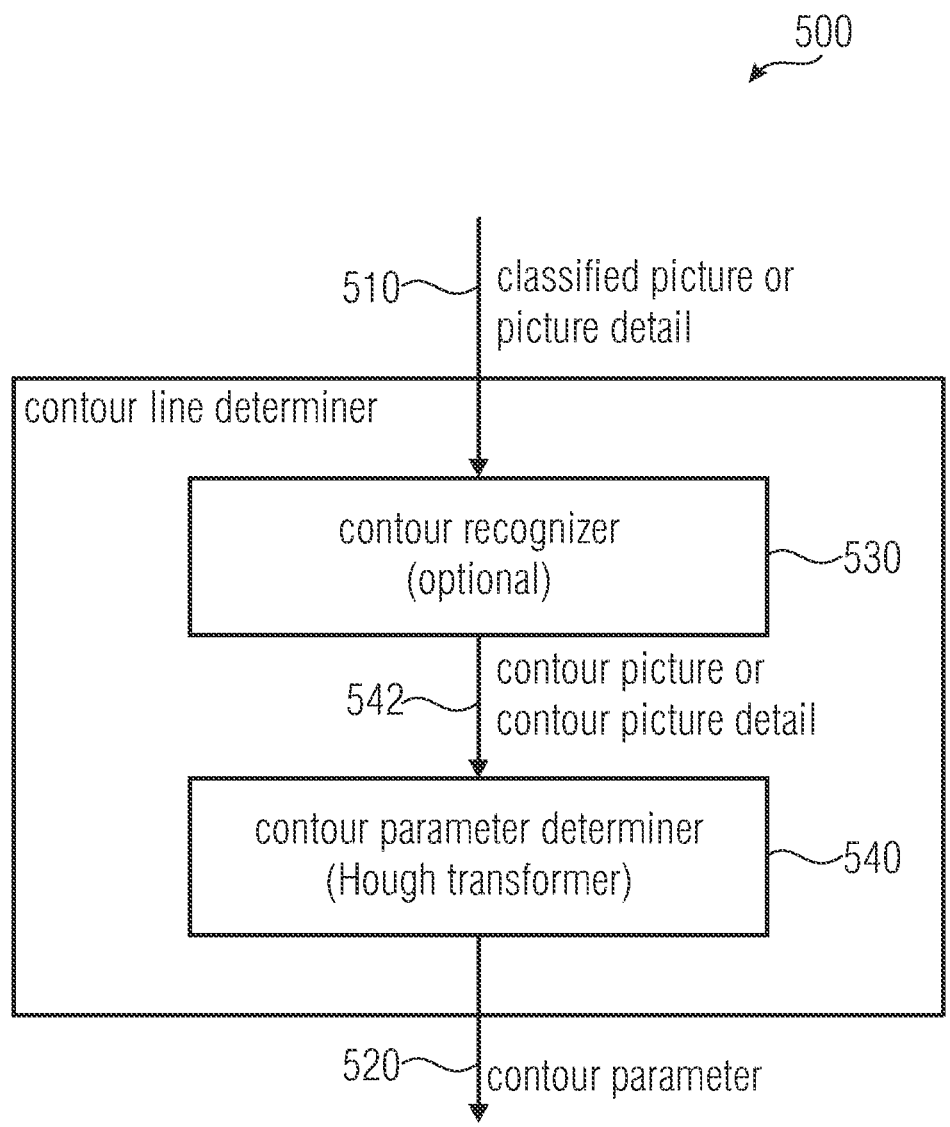
FIG. 5 shows a block diagram of a contour line determiner in accordance with an embodiment of the invention.

A detailed description will be given below by means of FIG. 5 of how contour parameters may be determined on the basis of a classified picture or a classified picture detail. To this end, FIG. 5 shows a block diagram of a contour line determiner in accordance with an embodiment of the invention. The contour line determiner in accordance with FIG. 5 is designated by 500 in its entirety.

The contour line determiner 500 may be configured, for example, to receive a classified picture or picture detail 510 and to provide contour parameters 520 on the basis thereof. The classified picture or picture detail may be, e.g., the classified picture or picture detail 242 in accordance with FIG. 2, the pre-processed version 320 of the picture or picture detail, or information 420. Depending on whether the classified picture 510 or the classified picture detail 510 was pre-processed for edge recognition, the contour line determiner 500 may optionally comprise a contour recognizer 530. The contour recognizer 530 may be part of the contour line determiner 500, for example, when the classified picture or picture detail 510 has not yet been processed by a contour recognizer. Otherwise, the contour recognizer 530 may be omitted, of course.

Additionally, the contour line determiner 500 includes a contour parameter determiner 540 configured to receive a contour picture 542 or a contour picture detail 542 and to provide the contour parameters 520 on the basis thereof. The contour picture 542 or the contour picture detail 542 may thus describe, e.g., an area of a gesture by means of a contour or contour line. The contour picture 542 or contour picture detail 542 may in some cases also contain, in addition to the contour line of the gesture area, other parasitic lines or line fragments, depending on the quality of the pre-processing. However, such parasitic lines or line fragments generally are not particularly detrimental because of the very utilization of the contour parameter determiner 540 that will be described in detail in the following.

In the advantageous embodiment, the contour line determiner 540 includes a Hough transformer configured to receive the contour picture 542 or the contour picture detail 542 and to provide, on the basis thereof, information about the identified gesture elements in the form of the contour parameters 520. Details regarding the Hough transformer will be explained in the following.

Area Parameter Determiner

Figure 6A:
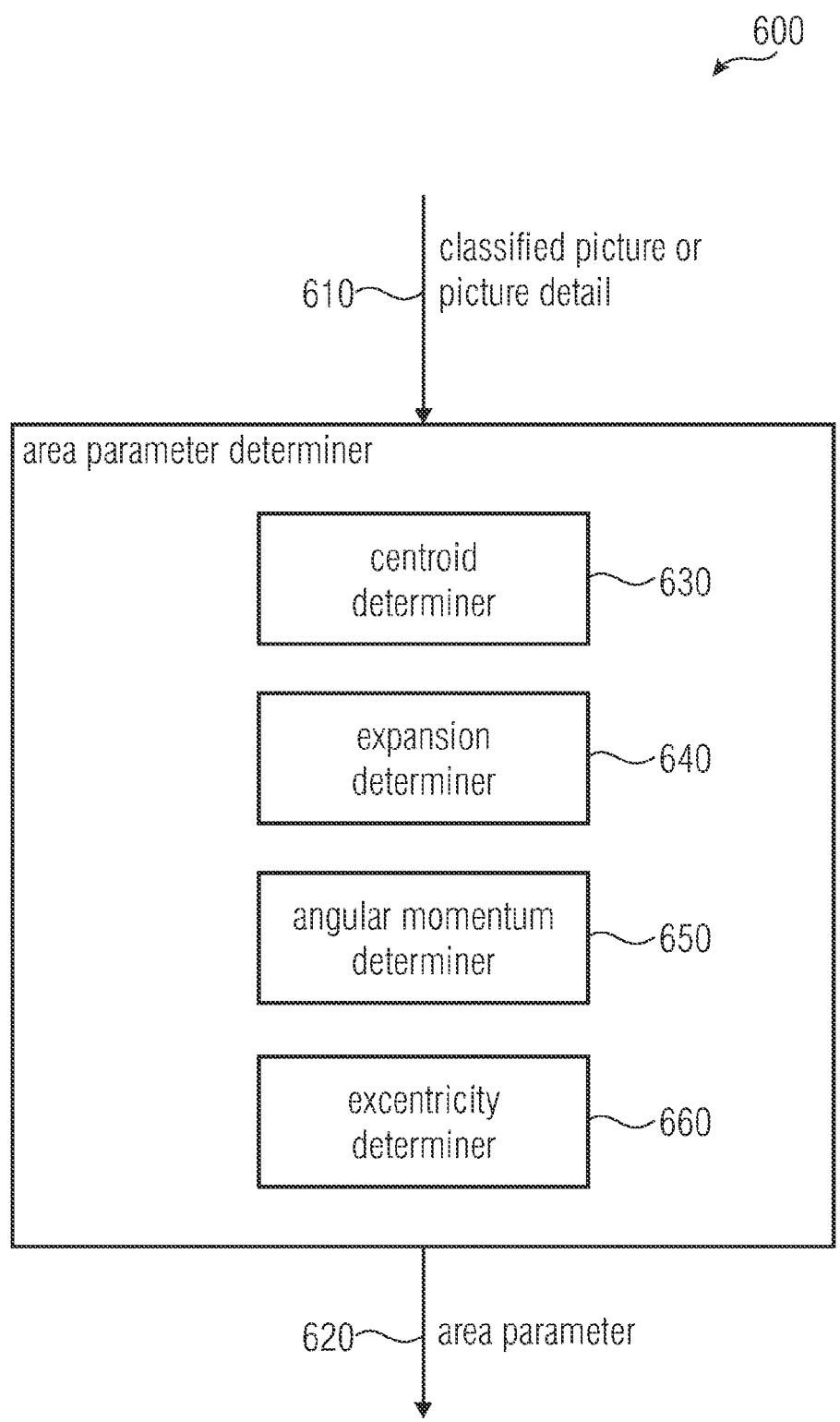
FIG. 6a shows a block diagram of an area parameter determiner in accordance with an embodiment of the invention.

Some details regarding the optional area parameter determiner 260 in accordance with FIG. 2 will be described by means of FIG. 6a in the following. To this end, FIG. 6a shows a block diagram of an area parameter determiner in accordance with an embodiment of the invention. The area parameter determiner shown in FIG. 6a is designated by 600 in its entirety and may replace the area parameter determiner 360.

The area parameter determiner 600 is configured to receive a classified picture 610 or a classified picture detail 610. The classified picture or picture detail 610 may be the classified picture or picture detail 242 in accordance with FIG. 2, for example. Alternatively, the classified picture or picture detail 610 may be the pre-processed version of the picture or picture detail 320 or the information 420. Also, the area parameter determiner 600 may receive input information 610, for example, which corresponds to the input information 510 of the contour line determiner 500.

The area parameter determiner 600 may be configured, for example, to determine one or more area parameters of a gesture area contained in the classified picture or picture detail 610. Thus, the area parameter determiner 600 is configured to provide one or more area parameters 620 describing a gesture area contained in the classified picture or picture detail 610.

For example, the area parameter determiner 600 may be configured to provide, as the area parameter 620, information about a centroid of an area or gesture area contained in the classified picture or picture detail 610. Alternatively or additionally, the area parameter determiner 600 may be configured to provide information about an extension of the area or gesture area as the area parameter 620, or to provide information about a momentum of the area or gesture area as the area parameter 620, or to provide information about an eccentricity of the area or gesture area as the area parameter 620.

The area parameter determiner may naturally also provide any combinations of the mentioned information as the area parameter 620. In some embodiments, the area parameter determiner 600 even provides all of the known area parameters (information about the centroid of area, information about the extension of the gesture area, information about the momentum of the gesture area, and information about the eccentricity of the gesture area).

Thus, the area parameter determiner 600 may contain one or more of the following functional blocks, for example: centroid-of-area determiner 630; area extension determiner 640; area angular momentum determiner 650, and area eccentricity determiner 660.

The area parameters 620 (or at least some of the area parameters 620) may be determined using one or more histograms, for example. For example, one may use histograms as are shown in FIG. 6b.

Figure 6B:
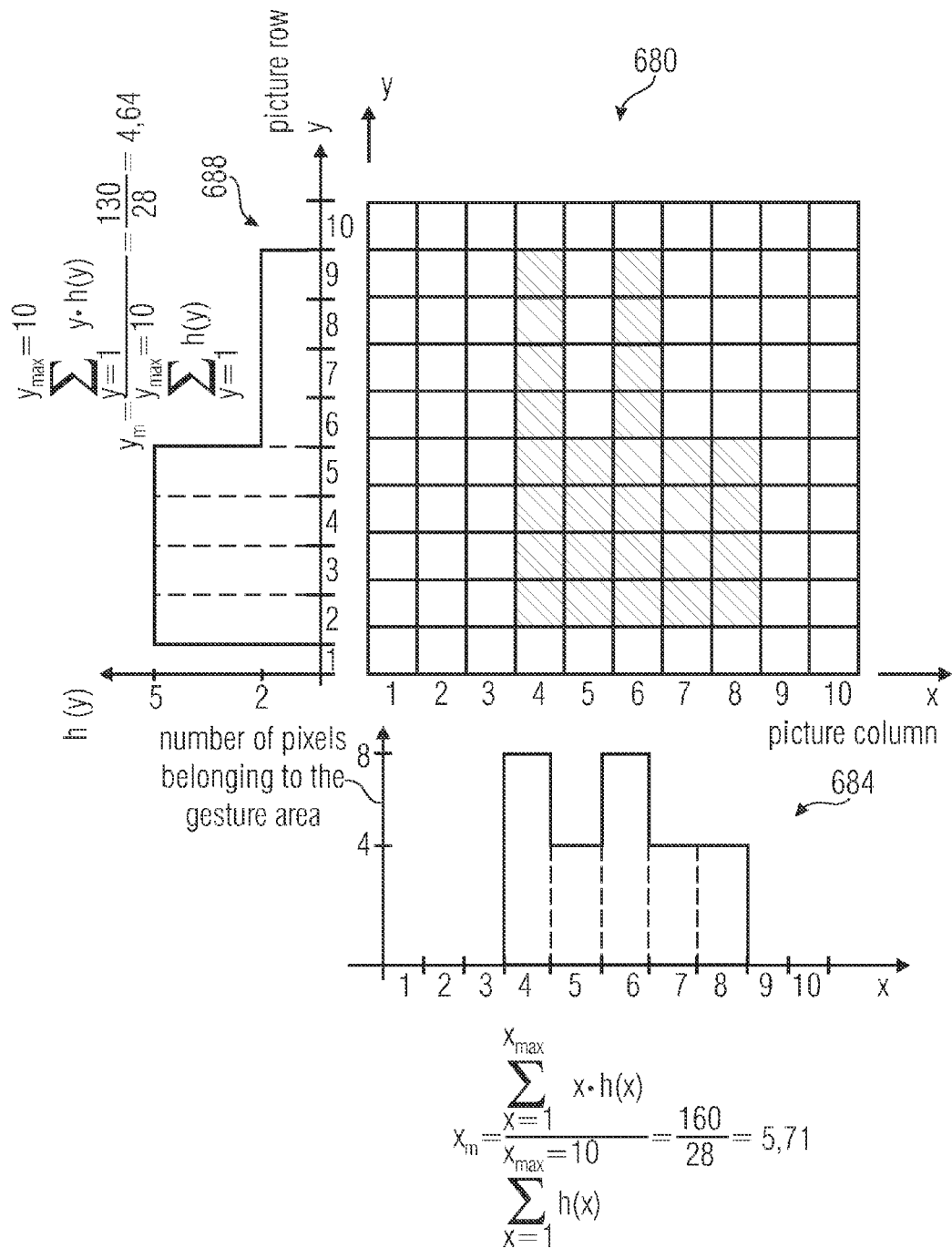
FIG. 6b shows a schematic representation of a picture or a picture detail in connection with associated histograms.

FIG. 6b shows a schematic representation of a picture or picture detail along with an associated x frequency histogram and an associated y frequency histogram. The picture shown in FIG. 6b is designated by 680 in its entirety. For example, the picture 680 includes a plurality of pixels arranged in picture rows and picture columns. The picture rows extend along an x direction, for example, and the picture columns extend along a y direction. The picture rows are given consecutive numbers from 1 to 10, for example. The picture columns are also given consecutive numbers from 1 to 10. The picture 680 includes pixels belonging to a gesture area (depicted to be hatched) and pixels not belonging to a gesture area (depicted without hatching). A column histogram 684 describes, e.g., a number of pixels belonging to the gesture area for different columns. As may be seen from the column histogram 684, columns 1, 2 and 3, for example, do not include any pixels belonging to the gesture area. For example, the fourth column includes eight pixels belonging to the gesture area, as does the sixth column. The fifth, seventh and eighth columns each include four pixels belonging to the gesture area. Picture columns 9 and 10 do not include any pixels belonging to the gesture area. The corresponding frequency distribution in dependence on the column number (1 to 10) is shown in the column histogram 684. FIG. 6 further shows a row histogram wherein the number of pixels belonging to the gesture area is plotted for the various rows of the picture 680. For example, the first picture row does not contain any pixels belonging to a gesture area. The second, third, fourth and fifth rows each include, e.g., five pixels belonging to a gesture area. Rows 6, 7, 8 and 9 each include two pixels belonging to the gesture area. Row 10 does not include any pixel belonging to the gesture area.

A centroid-of-area of the picture 860 (or of the pixels belonging to the gesture area) may be calculated, e.g., using the histograms 684, 688 (or in a different manner). Formulae for calculating the area centroid of the gesture area in the x direction and in the y direction are depicted in FIG. 6b. A centroid of area in the x direction is designated by $x_m$, for example. A picture column is designated by x. A maximum column index is designated by $x_{max}$. A number of pixels of the picture column x that belong to the gesture area are designated by h (x). Corresponding definitions also apply to the picture rows y.

By using the formulae shown in FIG. 6b, e.g. the centroid of the picture 680 or of the gesture area represented therein may be determined in the x direction, or picture-column direction, and in the y direction, or picture-row direction. Corresponding determinations may be made by the centroid determiner 630, for example.

Alternatively or additionally, an extension of the picture 680, for example in the picture-column direction and/or in the picture-row direction, may also be determined. In the exemplary picture in accordance with FIG. 6b, the gesture area includes, e.g., five picture columns (picture columns 4-8) and eight picture rows (picture rows 2-9). The corresponding extension may be readily determined by the extension determiner 640.

FIG. 6c shows formulae for determining an overall angular momentum m, an angular momentum $m_x$ in the x direction, and an angular momentum $m_y$ in the y direction.

The overall angular momentum may be calculated as a sum, over all of the pixels belonging to the gesture area and have an index i, of the squared distance of the pixels from the centroid of the gesture area with coordinates $x_m$ and $y_m$. Accordingly, an angular momentum $m_x$ may be determined in the x direction, and an angular momentum $m_y$ may be determined in the y direction, as is shown in FIG. 6c.

Example

Gestures

Various gestures and gesture elements identifiable therein will be described in the following with reference to FIGS. 7a, 7b, 7c, and 7d.

Figure 7A:
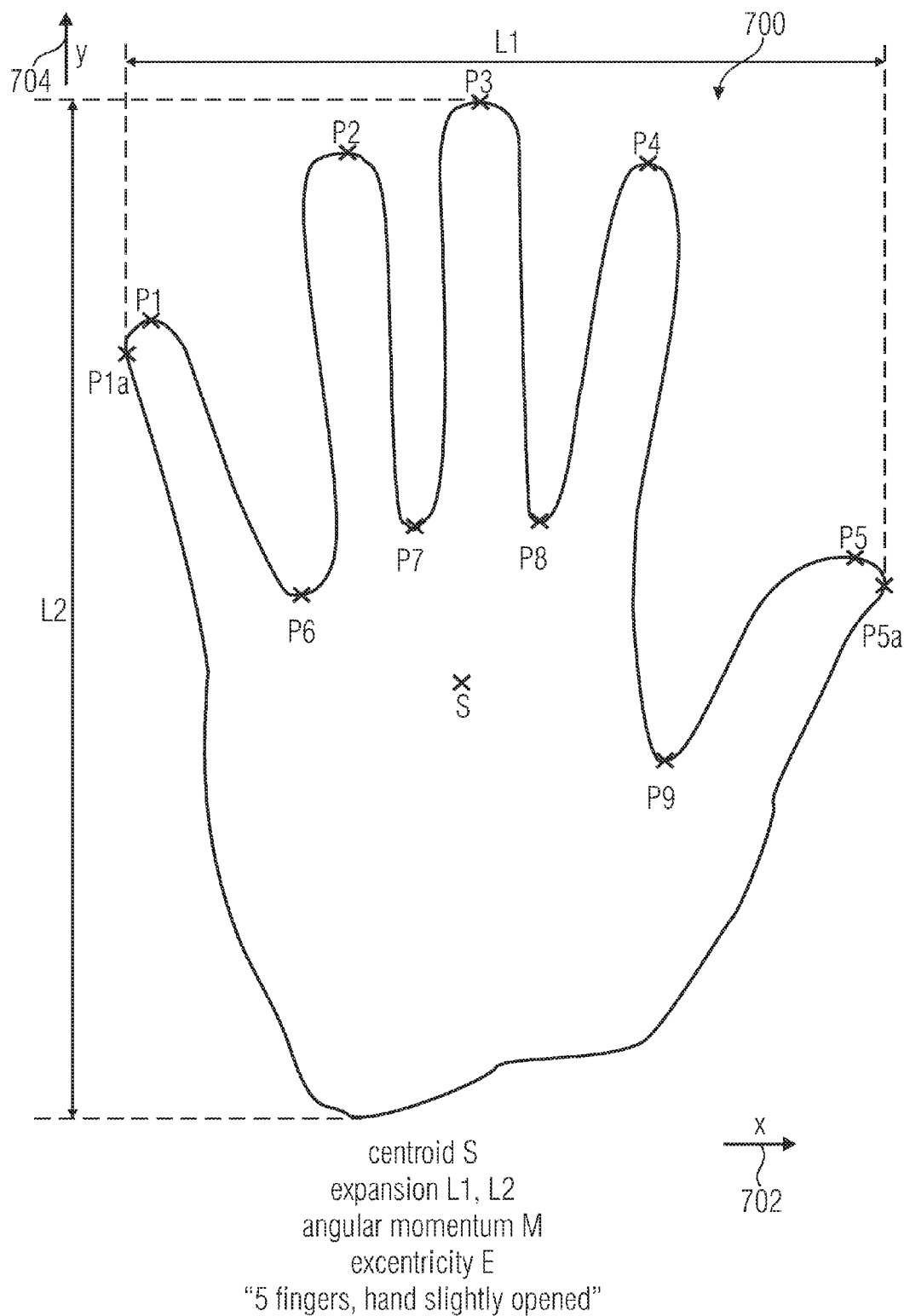
FIG. 7a shows a schematic representation of a first gesture.

FIG. 7a shows a schematic representation of a first gesture, which is also referred to as "five fingers, hand slightly opened". The representation in accordance with FIG. 7a is designated by 700. The picture of the gesture shown in FIG. 7a includes a plurality of characteristic gesture elements. If one assumes that the picture is defined with regard to an x direction 702 and a y direction 704 approximately orthogonal thereto, the picture of the gesture comprises a plurality of at least local extreme points P1, P2, P3, P4, P5, P6, P7, P8, P9 in the y direction. A contour line of the gesture area (palm of the hand) is approximated, for example in the surroundings of the local extremum P1, by a detail of a circular arc and/or an elliptical arc, said detail being opened downward. Similarly, the contour line of the gesture areas is approximated, at the extreme points P2, P3, P4, P5, by circular arcs or elliptical arcs opened downward (for example by details of full arcs or of full circles or ellipses). Similarly, the contour line of the gesture area is approximated, at the extreme points P6, P7, P8, P9, by arcs opened upward (e.g. details of circular arcs and/or elliptical arcs).

In addition, extreme points may naturally also be evaluated in the x direction. For example, the contour line of the gesture area is approximated, at the extreme point P1a, by an arc (e.g. a detail of a circular arc and/or elliptical arc) that is opened toward the left. The contour line of the gesture area is approximated, e.g. at the extreme point P5a, by an arc (e.g. by a detail of a circular arc or elliptical arc) that is opened toward the left. Further extreme points, for example in the x direction or in the y direction, may naturally also be taken into account, but have been omitted here for reasons of clarity.

Moreover, the gesture area (palm of the hand) has a centroid S, for example, that may be determined as was described above. Furthermore, the gesture area (palm of the hand) has, e.g., an extension L1 in the x direction and an extension L2 in the y direction, it being possible for the extensions L1 and L2 to be determined in the above-described manner, for example. In addition, the gesture area (here: palm of the hand) has an angular momentum M that may be calculated in the manner indicated above. Also, the gesture area (palm of the hand) may also have an eccentricity E.

The gesture "5 fingers, hand slightly opened" shown in FIG. 7a may thus be described by the locations of the extreme points P1, P2, P3, P4, P5, P6, P7, P8, P9, P1a, P5a and by the area parameters "position of the centroid S", "extension L1 in the x direction", "extension L2 in the y direction", "angular momenta M" and "eccentricity E". Of course, it is also possible to use only a subset of the parameters mentioned for describing the gesture shown in FIG. 7a.

Figure 7B:
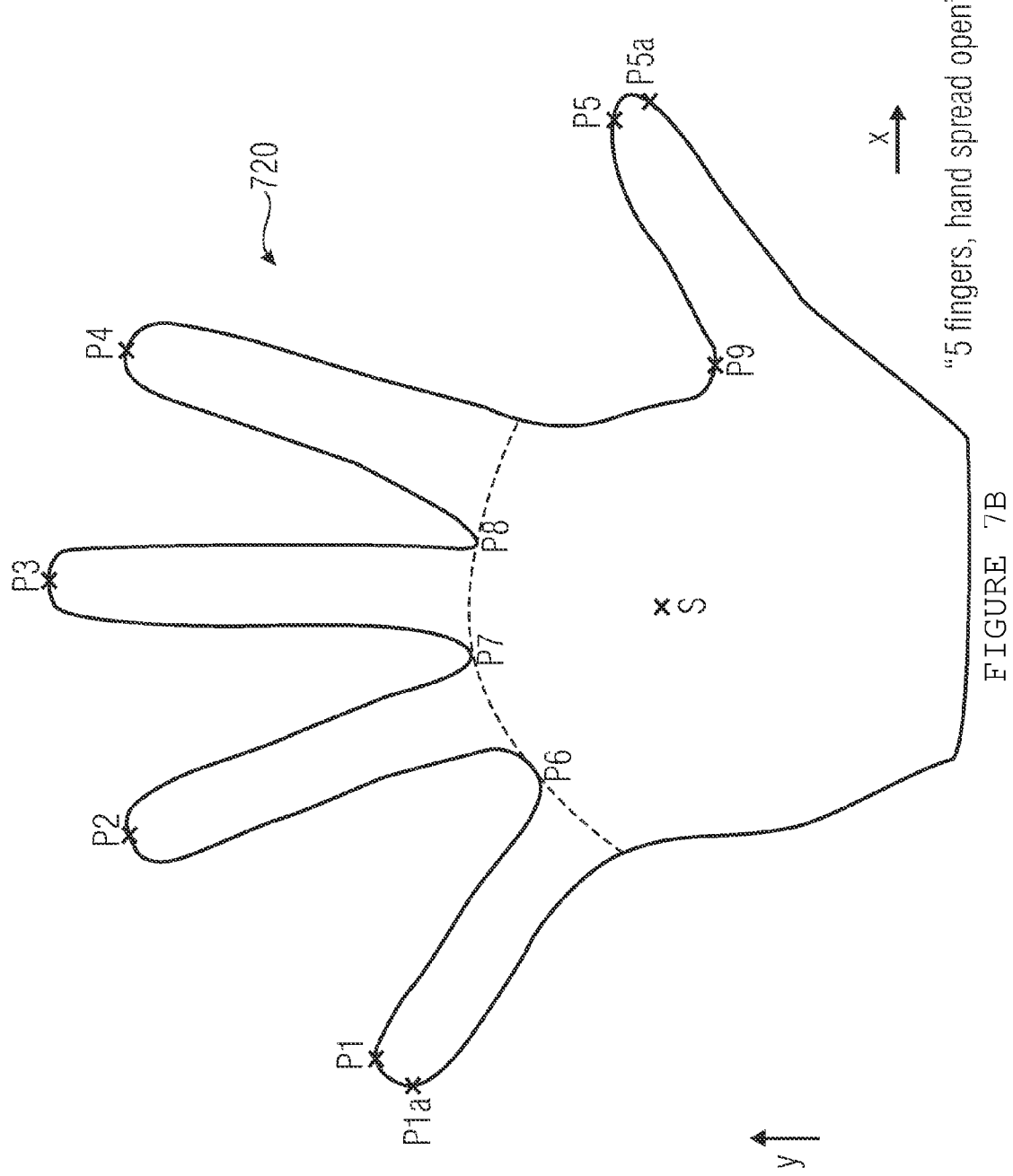
FIG. 7b shows a schematic representation of a second gesture.

FIG. 7b shows a schematic representation of a second gesture, also referred to as "5 fingers, hand spread open". The representation of the gesture in accordance with FIG. 7b is designated by 720. The gesture shown in FIG. 7 may also be described, for example, by the extreme points P1, P2, P3, P4, P5, P6, P7, P8, P9, P1a, P5a. Similarly, also for the gesture in accordance with FIG. 7b, the area parameters mentioned in connection with the gesture in accordance with FIG. 7a may be determined.

As is readily apparent from a comparison of FIG. 7a to FIG. 7b, the relative locations of the extreme points P1 to P9, e.g., differ in the gestures in accordance with FIGS. 7a and 7b, which enables distinction of the gestures, for example.

Figure 7C:
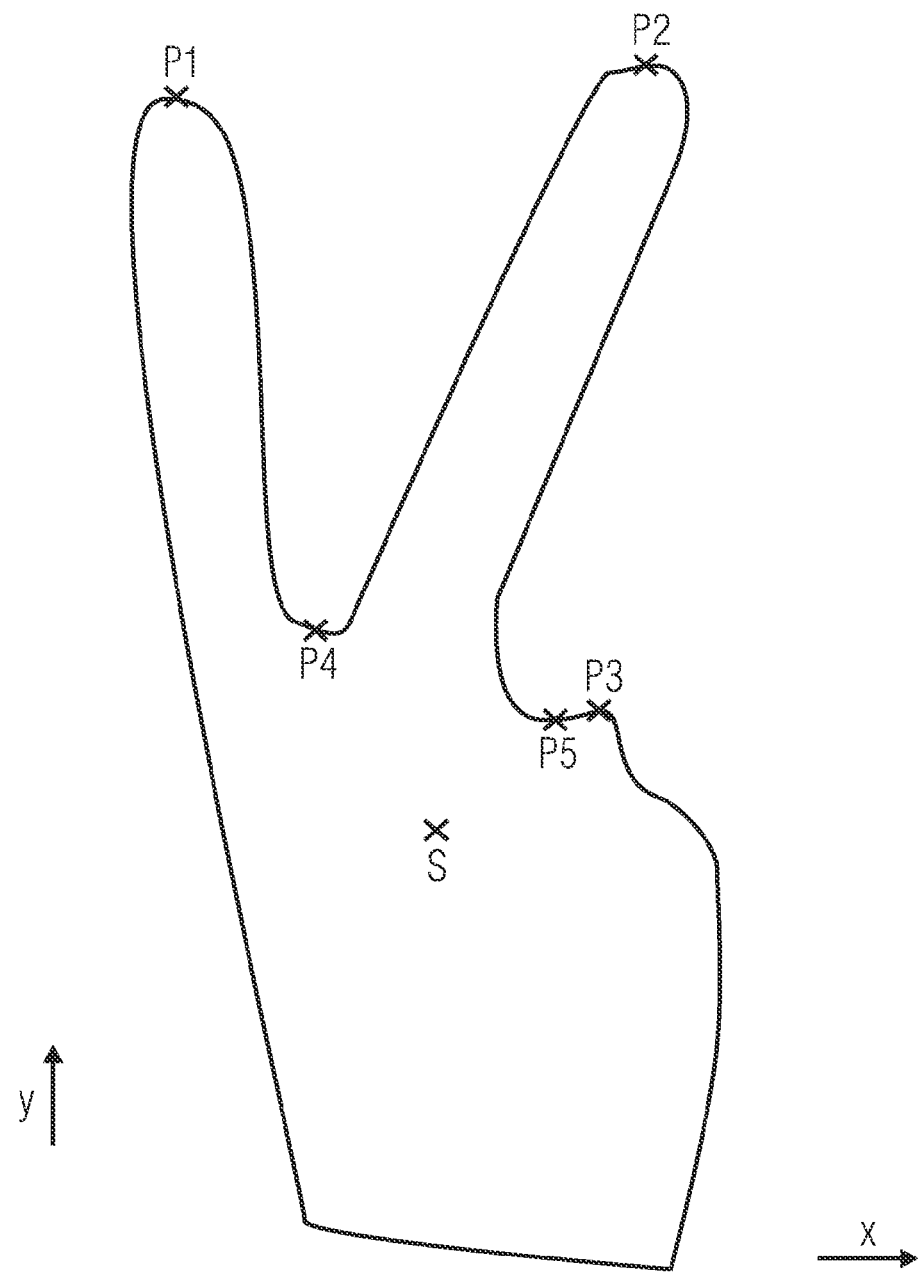
FIG. 7c shows a schematic representation of a third gesture.

FIG. 7c shows a schematic representation of a further gesture, also referred to as "2 fingers". In the gesture shown in FIG. 7c, for example, fewer local extreme points may be seen than in the gestures shown in FIGS. 7a and 7b, namely, e.g., only the extreme points P1, P2, P3, P4, and P5.

Figure 7D:
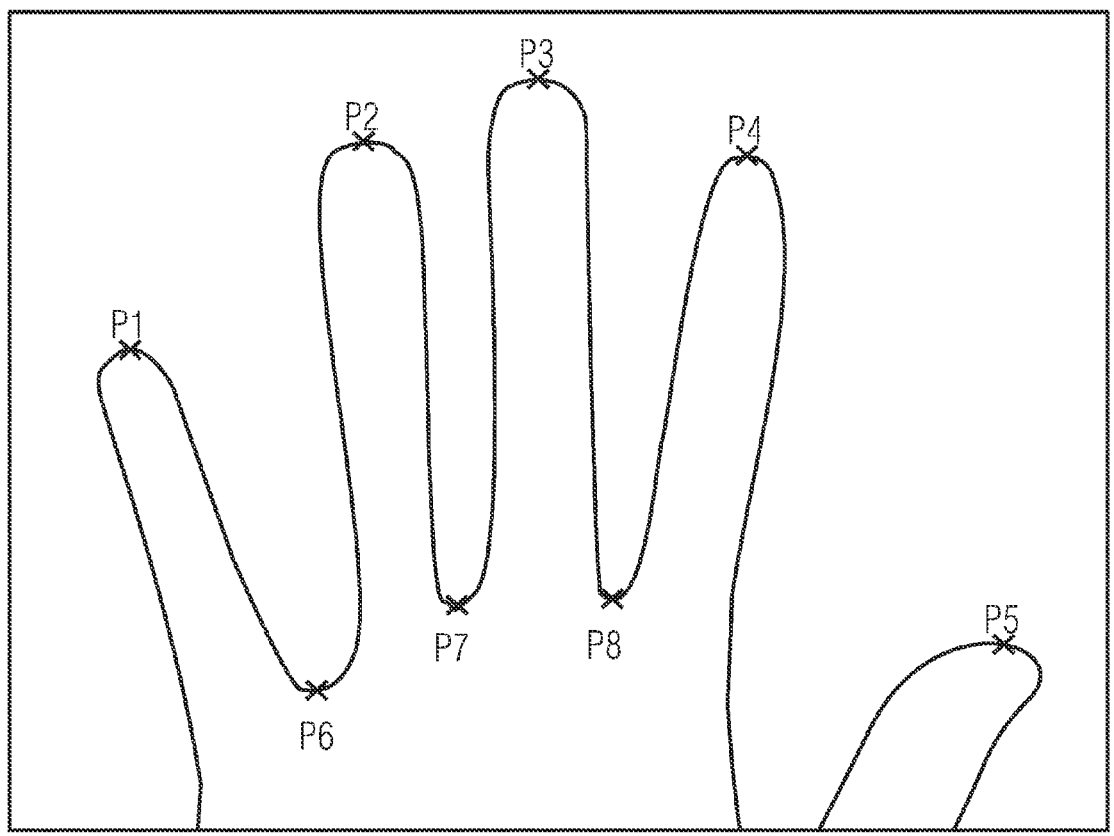
FIG. 7d shows a schematic representation of a detail of the first gesture.

FIG. 7d shows a schematic representation of a detail of the first gesture as is shown in FIG. 7a. The detail, shown in FIG. 7d, of the first gesture "5 fingers, hand slightly opened" indicates that it is not always necessary for all of the extreme points belonging to a gesture to be recognizable in the respective picture detail.

Creating a Gesture Description

What follows is an explanation of how a gesture description may be created by using information about identified gesture elements. Information about the identified gesture elements may describe, e.g., locations of circular arcs, elliptical arcs, of details of circular arcs, of details of elliptical arcs, or of approximately straight lines. The information about the identified gesture elements may be provided, e.g., by a Hough transformer, for example by the Hough transformer 130 or by the contour line determiner 250. The information about the identified gesture elements may be provided, e.g., in the form of contour parameters, such as in the form of contour parameters 252 and/or 520. For example, the Hough transformer, which will be explained in detail below, may be configured to identify arcs, e.g. details of circular arcs or elliptical arcs, in a picture of a gesture (or in an edge picture resulting therefrom). The Hough transformer 130 may be configured, for example, to recognize details of a circular arc or of an elliptical arc that are opened toward the left or to the right or downward or upward. The Hough transformer may be configured to distinguish details of a circular arc that are opened toward the left from details of a circular arc that are opened toward the right. Similarly, the Hough transformer may be configured to distinguish details of a circular arc that are opened upward from details of a circular arc that are opened downward. In summary, it may thus be stated that, all in all, the Hough transformer may be capable of distinguishing arcs (details of circular arcs and/or elliptical arcs) that are opened toward different directions.

Thus, the Hough transformer 130 may provide information 132 about identified gesture elements in the form of contour parameters.

For example, the Hough transformer may provide, for identified circular arcs or elliptical arcs, information about a direction or orientation of the circular arcs or elliptical arcs (oriented upward, downward, toward the left, toward the right; opened upward, downward, toward the left, toward the right). For example, the Hough transformer may be configured to distinguish at least two different orientations of the circular arcs or elliptical arcs (e.g. oriented in the first direction and oriented counter to the first direction; or open in the first direction and open counter to the first direction). In some embodiments, the Hough transformer may be configured to distinguish more than two different orientations of circular arcs or elliptical arcs, as was explained above.

The Hough transformer may further provide, for identified details of circular arcs or elliptical arcs, information about an extremum. For example, the Hough transformer may be configured to provide information about a point of an identified detail of a circular arc and an elliptical arc, said point being located furthest in a first direction (e.g. x direction), or information about a point of an identified detail of a circular arc and an elliptical arc, said point being located furthest in a second direction (e.g. y direction). With regard to the identified sections of the circular arcs or elliptical arcs, the Hough transformer may provide coordinates of such an extreme point, for example. For example, the Hough transformer may describe an extreme point (for example in a first direction or x direction, or in a second direction or y direction, or in a direction counter to the second direction, or in a direction counter to the second direction) by means of two coordinates. Alternatively, it may be sufficient for the Hough transformer to only describe, e.g., a center of the respective circle or of the respective ellipse by means of coordinates, if a detail of a circle concerned or an ellipse concerned is identified in the picture.

In addition, the Hough transformer may optionally provide information about a radius of curvature of an identified detail of a circular arc or elliptical arc.

A set of contour parameters describing an identified arc (detail of a circular arc or elliptical arc) may thus contain, e.g., information about the following parameters of the circular arc or elliptical arc:
  direction (open upward, downward, toward the left, toward the right);
  position of the extremum (x coordinate and y coordinate); and
  radius of curvature (optional).

Optionally, the Hough transformer may also provide information about identified straight-line segments that belong to the contour of the gesture area. For example, the Hough transformer may be configured to provide information about a direction of an identified straight-line segment. Additionally, the Hough transformer may provide additional information regarding the location of an identified straight-line segment. For example, the Hough transformer may provide, for a straight-line segment, an x axis section and a direction. In this manner, e.g. a curve of a straight line is already unambiguously specified. In some embodiments, the Hough transformer may provide additional information about the location of a straight-line segment, such as information about an initial point and an end point of the straight-line segment, or information about a length and a center of the straight-line segment. However, it shall be noted that it is not absolutely necessary to use information about straight-line segments. If information about straight-line segments is used, said information may comprise one or more of the following parameters, for example:
  direction (e.g. angle versus a horizontal); and
  initial point and end point, or length and center.

FIG. 8 shows a schematic representation of parameters for describing arcs or straight-line segments, which may be provided by a Hough transformer, for example.

Example

Gesture Descriptions

Various gesture descriptions of gesture 1 ("5 fingers, hand slightly opened") will be described below with reference to FIGS. 9a and 9b.

Figure 9A:
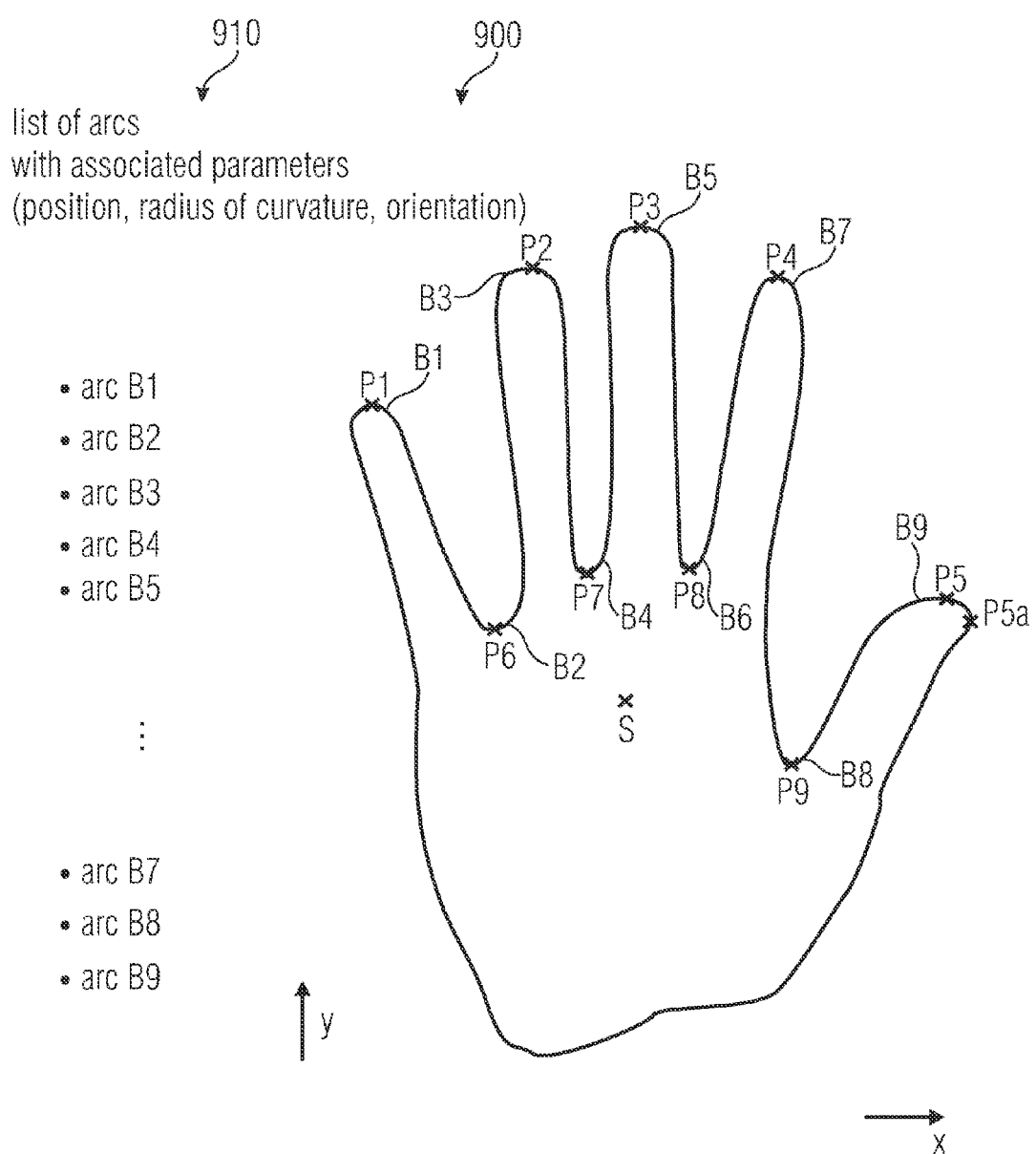
FIG. 9a shows a schematic representation of the first gesture in connection with an exemplary associated gesture description.
Figure 9B:
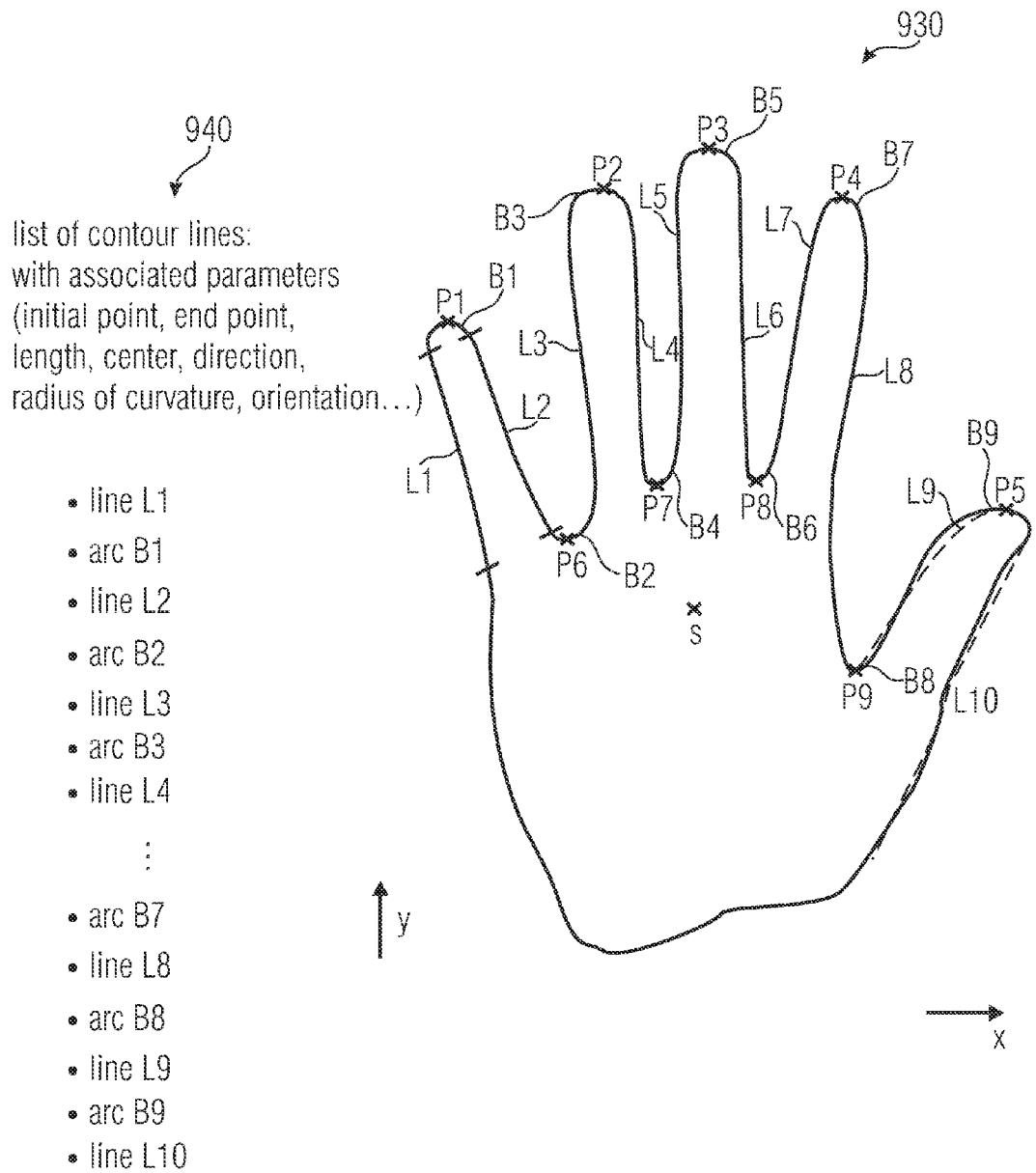
FIG. 9b shows a schematic representation of the first gesture in connection with a further exemplary associated gesture description.

FIG. 9a shows a schematic representation of the first gesture in connection with an exemplary associated gesture description. The schematic representation in accordance with FIG. 9a is designated by 900 in its entirety. The schematic representation 900 shows a list 910 of arcs with associated parameters. In this context it shall be assumed that the first gesture is approximated, in surroundings of the extreme point P1, by a detail of a circular arc or elliptical arc B1 open downward (e.g. in the negative y direction). This detail of the circular arc or elliptical arc may be recognized in the Hough transformer and be described by associated parameters (e.g. position, radius of curvature and orientation). Similarly, the first gesture is approximated, in surroundings of the extreme point P2, by an arc B3, is approximated by an arc B5 in surroundings of the extreme point P3, is approximated by an arc B7 in surroundings of the extreme point P4, and is approximated by an arc B9 in surroundings of the extreme point P5. In addition, the contour line of the gesture area of the first gesture is approximated by an arc B2 in surroundings of the extreme point P6, by an arc B4 in surroundings of the extreme point P7, by an arc B6 in surroundings of the extreme point P8, and by an arc B8 in surroundings of the extreme point P9.

The list 910 of arcs may thus describe, e.g., the arcs B1 to B9 by associated parameters, such as position, orientation and—optionally—radius of curvature. The contour line of the gesture area of the first gesture is thus described, e.g., by a list of parameters of arcs and/or of details of full arcs (e.g. circular arcs or elliptical arcs).

The list 910 may be ordered in accordance with a predefined rule, for example. For example, the arcs described by their parameters may be sorted, in accordance with one arrangement, along a first direction (e.g. x direction). For example, the arcs B1, B2, B3, B4, B5, B6, B7, B8, B9 are arranged in an ascending x direction. The list 910 may also be ordered accordingly. Alternatively or additionally, the sorting criterion that may be used may also be, for example, that an arc opened downward and an arc (or arc detail) opened upward be alternatingly contained in the list 910, it being possible to additionally also use the arrangement along a specific direction, e.g. along the x direction.

Therefore it is to be stated that, on the basis of the arcs (or arc details) identified along a contour line of a gesture area, a list of arcs described by parameters may be created, as is shown in FIG. 9a. The list 910 of arcs described by parameters may be regarded, e.g., as the gesture description 142 and/or as the gesture description 271.

A further gesture description will be explained in the following by means of FIG. 9b. To this end, FIG. 9b shows a schematic representation of the first gesture along with a further exemplary associated gesture description. A contour line of the first gesture as is depicted in FIG. 9b may be represented, e.g., at least approximately as a sequence of straight-line segments and arc sections (e.g. in the form of details of circular arcs or elliptical arcs). If one looks at the finger section of the first gesture as is shown in FIG. 9b, the contour line of this finger section may be represented, e.g. approximately by a sequence of the straight-line segments L1 to L10 and of the arc sections B1 to B9. For example, the contour line of the finger section may be approximated by the straight-line segments and arc sections L1, B1, L2, B2, L3, B3, L4, B4, L5, B5, L6, B6, L7, B7, L8, B8, L9, B9, L10. For example, a straight-line segment section and an arc section may occur in an alternating manner in each case. However, there are also other embodiments wherein several straight-line segment sections may occur without any intermediate arc section.

The schematic representation 930 shows a list 940 of contour line sections that may be described, e.g., by associated parameters. Arc sections may be described, e.g., by their positions, their orientations and possibly their radii of curvature. Straight-line segments may be described, e.g., by their lengths and directions or by other parameters (e.g. by the initial points and end points or centers).

The list 940 may be sorted, e.g., in accordance with a predefined criterion. For example, the list may be sorted in accordance with a "natural" order of the arc details and straight-line segments so that the list describes the individual sections of the contour line of the gesture area in a "natural" order.

Sorting may be effected on the basis of various criteria. For example, it may be predefined that there is a straight-line segment between a local maximum (e.g. an arc detail open downward) and a local minimum (e.g. an arc detail open upward) in each case. For example, the straight-line segment L2 is located between the first arc detail B1 and the second arc detail B2. Adjacent arc details may be identified, e.g., on the basis of their distances and their orientations. A line may be identified, e.g., as extending between two arc details in that the distance of the line from the two extreme points belonging to the arc details (e.g. P1 and P6) is determined. For example, if one looks at points P1 and P6, it may be stated that the line L2 is that straight-line segment in the picture which comes closest to P1 and P6. Thus, this location relation may be evaluated, for example, for ordering the individual arc details and straight-line segments.

However, other arrangement schemes are also possible. For example, the list may also be ordered such that initially all of the arc details (as well as the associated parameters) are contained in the list, and that subsequently the straight-line segments (and their parameters) are listed. Naturally, a reverse order in the list 940 is also possible.

Figure 9C:
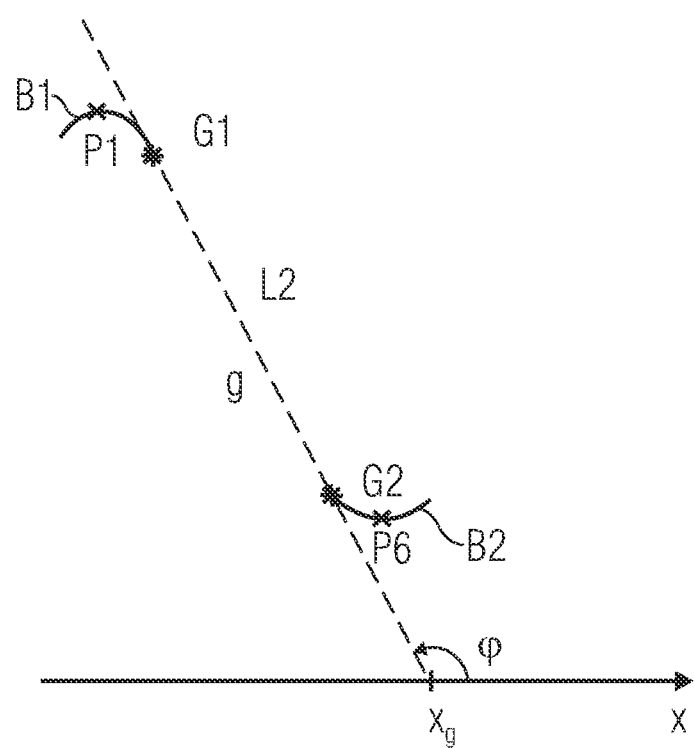
FIG. 9c shows a graphical representation of how the location details may be determined with regard to a straight-line segment that connects two arc details.

A brief explanation shall be given below with reference to FIG. 9c of how the location details may be determined with regard to a straight-line segment that connects two arc details. For example, information may be obtained, by means of a Hough transform, which describes the location and the radius of curvature of the first arc detail B1 and the location and the radius of curvature of the second arc detail B2, and which additionally describes the orientations (open downward and open upward, respectively) of the arc details B1, B2. In addition, by means of a Hough transform, it is possible in a relatively simple manner to obtain information describing a straight line in a picture by means of two location parameters. For example, a straight line may be described by two parameters, namely, e.g., by a coordinate at which it intersects the x axis (here designated by $x_g$), and by an indication of the direction (e.g. an angular value $\phi$). This is depicted in FIG. 9c. Thus, if a straight line is defined, e.g., by the point of intersection with the x axis and by a directional indication $\phi$, and if, additionally, the known location parameters of the arcs B1 and B2 are known, one may determine, for example by means of simple geometric considerations, at which points G1, G2 the straight line g is tangent to, or intersects, the arcs B1 and B2. Thus, the initial point G1 and the end point G2 of a straight-line segment L2 connecting the first arc B1 to the second arc B2 is known.

In other words, if information is obtained, by means of a Hough transform, which describes a location of a straight line in the picture (or in a pre-processed version of same), information about the initial point G1 and the end point G2 of a straight-line segment connecting the arcs may be obtained, for example, if the arcs B1, B2 are known. Alternatively, it is also possible to obtain information about the length of the corresponding straight-line segment, depending on which information is desired. Of course, it may also be sufficient in some embodiments to use one item of information about the straight line.

Gesture Description Creator

Various details of a gesture description creator will be explained below with reference to FIGS. 10, 11 and 12.

Gesture Description Creator

First Embodiment

Figure 10:
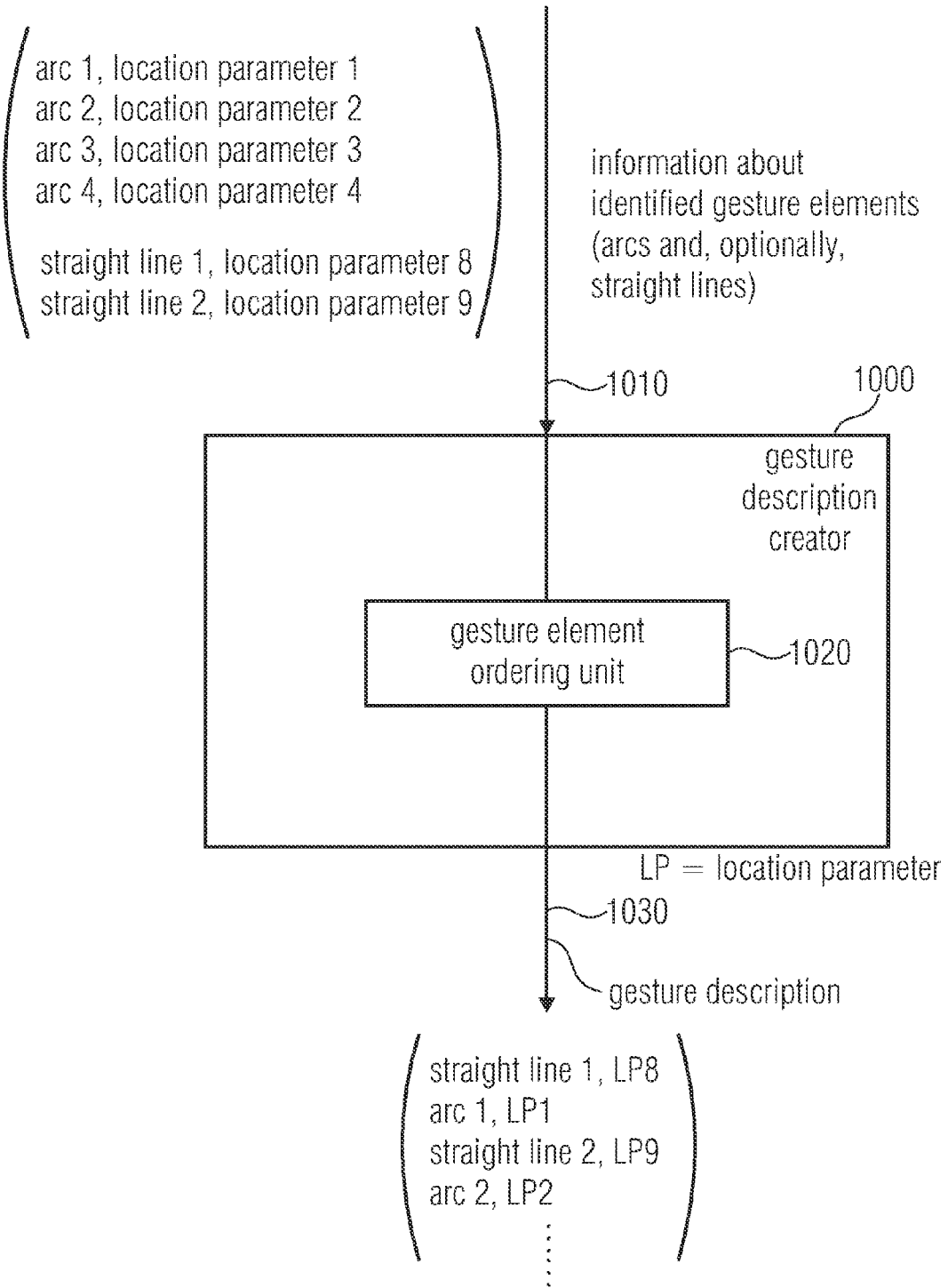
FIG. 10 shows a block diagram of a gesture description creator in accordance with an embodiment of the invention.

FIG. 10 shows a block diagram of a gesture description creator in accordance with an embodiment of the invention. The gesture description creator in accordance with FIG. 10 is designated by 1000 in its entirety. The gesture description creator 1000 is configured to receive information about identified gesture elements, said information being designated by 1010. The information 1010 may include, e.g., an unordered listing of parameters of various arcs (e.g. circular arcs or elliptical arcs) identified in the picture or in a pre-processed version of the picture. The information about the parameters of the identified circular arcs or elliptical arcs may be obtained by means of the Hough transformer, for example.

Optionally, the information 1010 may further include a listing (which is unordered, for example) of parameters of one or more straight lines identified in the picture or in a pre-processed version of the picture. Arcs may be described, e.g., by corresponding location parameters and (optionally) size parameters as were explained above (e.g. orientation and/or extreme-point coordinates and/or center-point coordinates and/or radius of curvature and/or other parameters). Straight lines may also be described by various parameters (e.g. direction and/or point of intersection with an axis of coordinates and/or distance from an origin and/or length and/or initial point and/or end point and/or center).

The gesture description creator 1000 may comprise, e.g., a gesture element ordering unit 1020 configured to obtain, as the gesture description 1030, an ordered description of the identified gesture elements. For example, the gesture element ordering unit 1020 may be configured to order the individual gesture elements (i.e., for example, arcs and intermediate straight lines) in the gesture description 1030 such that the ordered identified gesture elements in the gesture description 1030 describe a continuous contour line of a gesture area.

In other words, the gesture element ordering unit 1020 may arrange the gesture elements described by the information 1010 on the basis of an arrangement rule, as was explained above by means of FIG. 9, inter alia, in order to obtain the gesture description 1030 such that the gesture description describes consecutive sections of the contour line in a corresponding (consecutive) order. In other words, the gesture description 1030 may be created such that the individual gesture elements (e.g. arcs and straight-line segments) in the gesture description 1030 are ordered in accordance with their actual sequence along the contour line of the gesture area.

This results in a particularly meaningful gesture description 1030 well suited for further processing. The gesture description 1030 may thus be processed particularly easily with regard to rotations, as will be explained in the following.

In addition, the gesture description creator 1000 may optionally be configured to create the gesture description 1030 such that the gesture description 1030 includes a description of the relative location of gesture elements (e.g. arcs and optionally also straight-line segments) belonging to a contour line of a gesture area. In other words, the location of a subsequent gesture element may be described, for example, with reference to the location of the preceding gesture element. For example, if a straight-line segment follows, starting from an arc, the straight-line segment may be defined, e.g., in that it extends in a specific direction and in a specific length, starting from the arc. Thus, the straight-line segment will be sufficiently defined in relation to the location of the preceding arc.

However, a relative description may also be achieved when, e.g., the information about the identified gesture elements describes various arcs and/or arc details. For example, information describing a distance of centers of arcs and/or arc details succeeding one another along the contour line of the gesture area may be added in the gesture description 1030 by the gesture description creator 1000. Alternatively, the gesture description creator 1000 may naturally also add information about a distance between extreme points succeeding one another along the contour line to the gesture description 1030.

Thus, the gesture description 1030 may be created such that the gesture description 1030 describes a relative location of identified gesture elements that succeed one another along the contour line.

Gesture Description Creator

Second Embodiment

Figure 11:
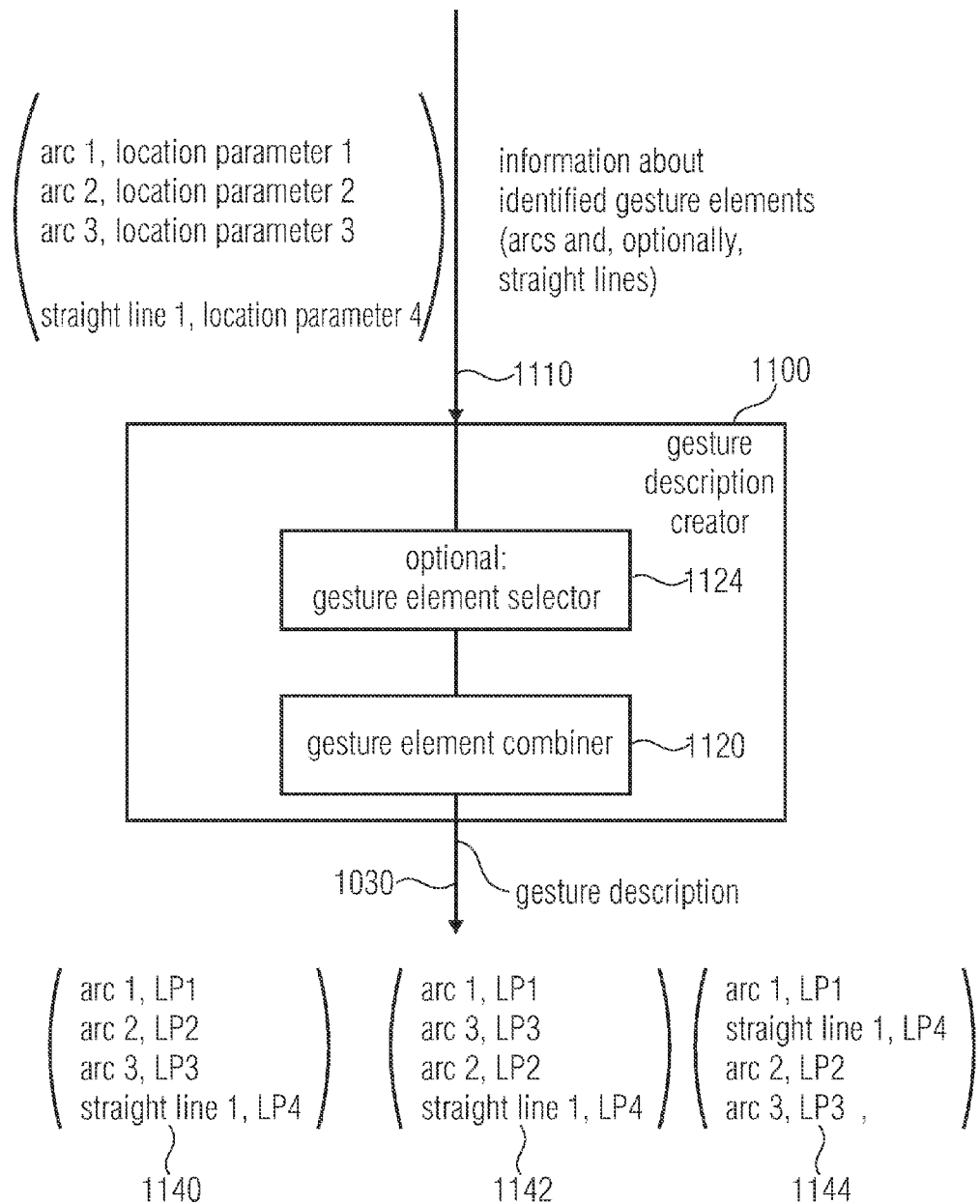
FIG. 11 shows a block diagram of a gesture description creator in accordance with a further embodiment of the invention.

FIG. 11 shows a block diagram of a gesture description creator in accordance with a further embodiment of the invention. The gesture description creator in accordance with FIG. 11 is designated by 1100 in its entirety. The gesture description creator 1100 is configured to receive information 1110 about the identified gesture elements (arcs and optional straight lines), which information 1110 corresponds to the information 1010.

For example, the gesture description creator 1100 may comprise a gesture element combiner 1120 configured to provide, as the gesture description 1130, a plurality of various combinations of the gesture elements described by the information 1110. If the information 1110 about the identified gesture elements includes, e.g., information about three identified arcs ("arc 1", "arc 2", "arc 3") with associated location parameters, and, additionally, information about an identified straight line ("straight line 1") with associated location parameters, the gesture element combiner 1120 may create the gesture description 1130, for example, in such a manner that the latter comprises various combinations of the gesture elements. Three possible combinations are designated by 1140, 1142 and 1144 in FIG. 11. In the various combinations 1140, 1142, 1144, the individual gesture elements may take on various orders, as may be readily seen in FIG. 11. The gesture element combinations 1140, 1142, 1144 described by the gesture description 1130 may be selected, e.g., in accordance with a predefined rule. However, it is not absolutely necessary in this context to select the arrangement precisely in such a manner that the various gesture elements be arranged along the contour line in accordance with their order. To be precise, it may be quite difficult in some cases to determine such an arrangement in advance. In this case it may be more efficient in terms of computing power to create—without employing the knowledge of the order of the gesture elements along the contour line—various combinations of the gesture elements (in different arrangements and/or orders) and not to perform a determination as to which of the combinations corresponds to an actually possible gesture until subsequent classification of the various combinations 1140, 1142, 1144.

The gesture description creator 1100 may optionally also comprise a gesture element selector 1124 which may be configured, for example, to select a subset of the gesture elements described by the information 1110. This is expedient, in particular, when the information 1110 describes "wrong" gesture elements that are erroneously identified as belonging to a gesture.

In summary it is to be stated that the gesture description creator 1110 may provide, as a gesture description 1130, e.g. a plurality of various (real) subsets of the gesture elements described by the information 1110, it being possible for the gesture elements of a given (real) subset to occur in different orders in different ones of the combinations.

Gesture Description Creator

Third Embodiment

Figure 12:
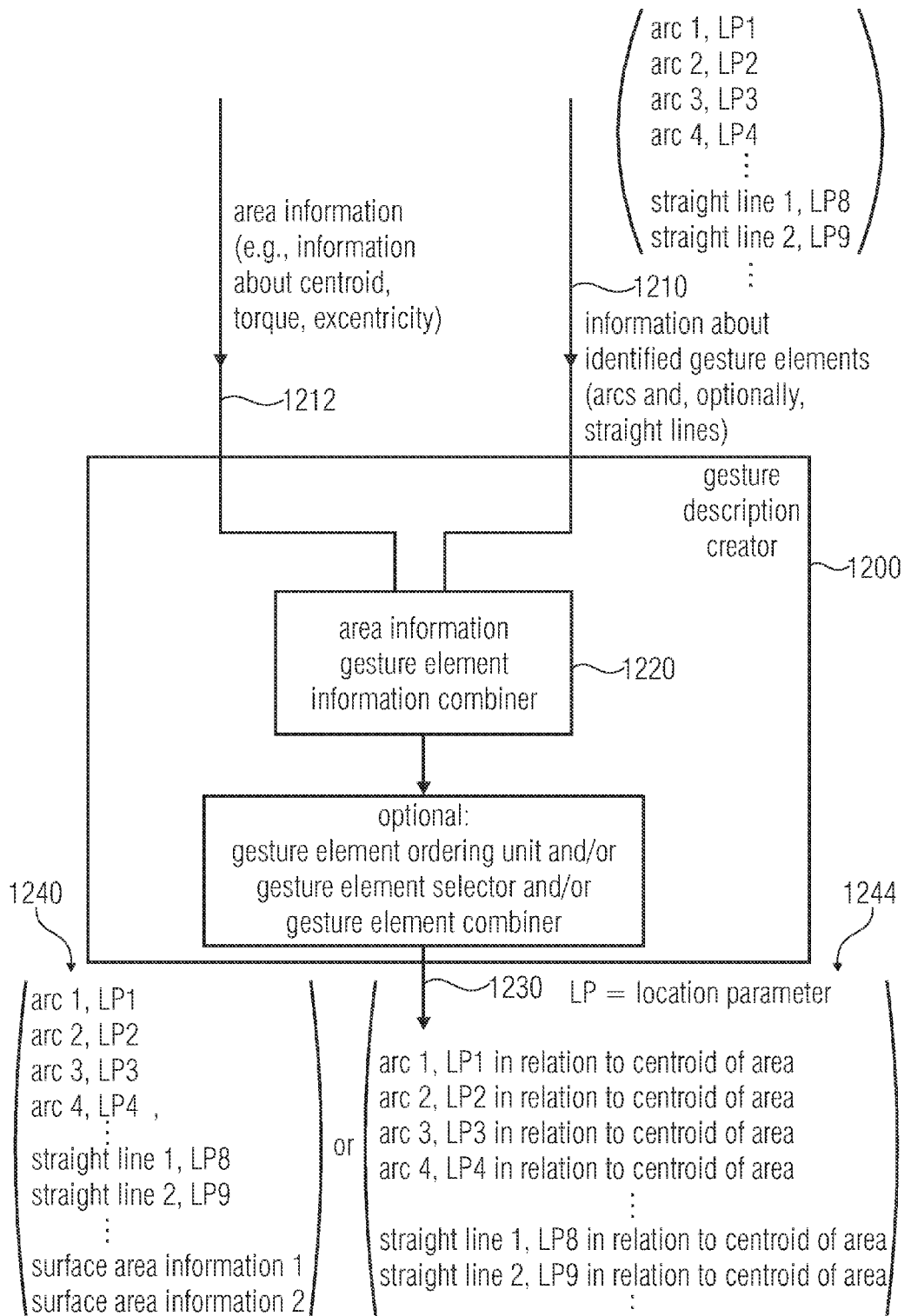
FIG. 12 shows a block diagram of a gesture description creator in accordance with a further embodiment of the invention.

FIG. 12 shows a block diagram of a gesture description creator in accordance with a further embodiment of the invention. The gesture description creator in accordance with FIG. 12 is designated by 1200 in its entirety.

The gesture description creator 1200 is configured to receive information 1210 about identified gesture elements, and area information 1212. The information 1210 about identified gesture elements may correspond, e.g., to the information 1110 or to the information 1010 or to the information 132, or to the information 252. The information 1212 may correspond, e.g., to the information 262 or to the information 620. The information 1212 may thus describe a gesture area contained in a picture (or in a version of the picture that is derived from same). For example, the information 1212 may comprise information about a centroid of the gesture area, information about a spatial expansion of the gesture area, information about an angular momentum of the gesture area, and/or information about an eccentricity of the gesture area.

The gesture description creator 1200 may further comprise an area information gesture element information combiner 1220 configured to receive the information 1210 and the area information 1212 and to create a combined gesture description 1230 on the basis thereof. Optionally, the gesture description creator 1200 may also comprise a gesture element ordering unit (e.g. corresponding to the gesture element ordering unit 1020) and/or a gesture element selector (e.g. corresponding to the gesture element selector 1124) and/or a gesture element combiner (e.g. corresponding to the gesture element combiner 1120). Therefore, the gesture description 1230 is provided by the gesture description creator 1200, e.g. on the basis of the area information 1212 and the information 1210 about identified gesture elements, in such a manner that the area information is also taken into account.

In one embodiment, the gesture description creator 1200 is configured to provide a set of parameters as the gesture description 1230 so that the gesture description 1230 comprises a set of parameters describing contour sections of the gesture area, as well as at least one area parameter describing a property of the gesture area as a whole.

In other words, in some embodiments the gesture description 1230 may describe, separately from one another, first parameters describing contour sections of the gesture area (location parameters LP1 to LP9) and second parameters describing properties of the gesture area ("area information1", "area information2"). An example of such a gesture description is designated by 1240 in FIG. 12.

Alternatively, the gesture description creator 1200 may be configured to link the information 1210 about identified gesture elements to the area information 1212 and to obtain a gesture description 1230 wherein parameters of the identified gesture elements are linked to one or more area parameters. For example, the gesture description creator 1200 may be configured to provide, as the gesture description 1230, a set of parameters describing contour sections of the gesture area. In this context, the gesture description creator 1200 may be configured to normalize the gesture description 1230 while using at least one area parameter. For example, the gesture description creator 1200 may be configured to normalize a radius of curvature of circular arcs and/or a length of straight-line segments while using information about an overall expansion of the gesture area. Of course, other normalizations are also applicable.

In a further embodiment, the gesture description creator 1200 may be configured to obtain from the area parameter an area parameter determiner that describes information about a location of an area centroid of the gesture area. The gesture description creator 1200 may further be configured to provide the gesture description 1230 such that location parameters of the contour sections of the gesture area are related to the location of the area centroid of the gesture area. Thus, the locations of the contour sections may be described, in the gesture description 1230, in relation to the area centroid of the gesture area, which results in standardization of the gesture description. Such a gesture description is designated by 1244 in FIG. 12.

In a further embodiment, the gesture description creator 1200 may be configured to obtain information about a dimension of the gesture area from the area parameter determiner. The gesture description creator 1200 may further be configured to provide the gesture description such that location parameters or dimension parameters of the contour sections are defined and/or normalized, in terms of size, on the basis of the information about what the dimensions of the gesture area.

In some embodiments, several different area parameters may be taken into account. For example, the gesture description 1230 may be created such that the locations of the individual gesture elements are related to a characteristic point of the gesture area (e.g. a centroid of area, or a bottom-left point of the gesture area or of an inclusive rectangle of same). In addition, the gesture description 1230 may simultaneously be created such that dimensions of the gesture elements are normalized in relation to dimensions of the entire gesture area. The corresponding approach may achieve that a gesture may be recognized irrespective of the size of the representation of the gesture in a specific picture, as long as the gesture is sufficiently large. In addition, one may thereby achieve that a gesture is recognized irrespective of the precise location of the gesture in the picture. Thus, a gesture description 1230 is obtained that is essentially independent of where the gesture is reproduced with regard to a camera taking the input picture.

In summary, it may thus be stated that, with regard to FIGS. 10, 11 and 12, various possibilities have been described of obtaining a gesture description on the basis of the information about the identified gesture elements. In this context, a gesture description may comprise, e.g., a list of gesture elements that is ordered in accordance with a predefined fixed rule.

Alternatively, however, a gesture description may also comprise several different combinations of gesture elements (e.g. in different orders). Optionally, area parameters may be taken into account when creating the gesture descriptions, for example regarding normalization—in terms of size—of the individual elements of the gesture description, or for positional normalization of the positions of the gesture elements. However, the area parameters may also serve as independent parameters.

Gesture Classification

In the following, a description shall be given of how a gesture code may be obtained on the basis of a gesture description. Obtaining a gesture code on the basis of a gesture description may be understood as a classification.

Gesture Classifier

First Embodiment

Figure 13:
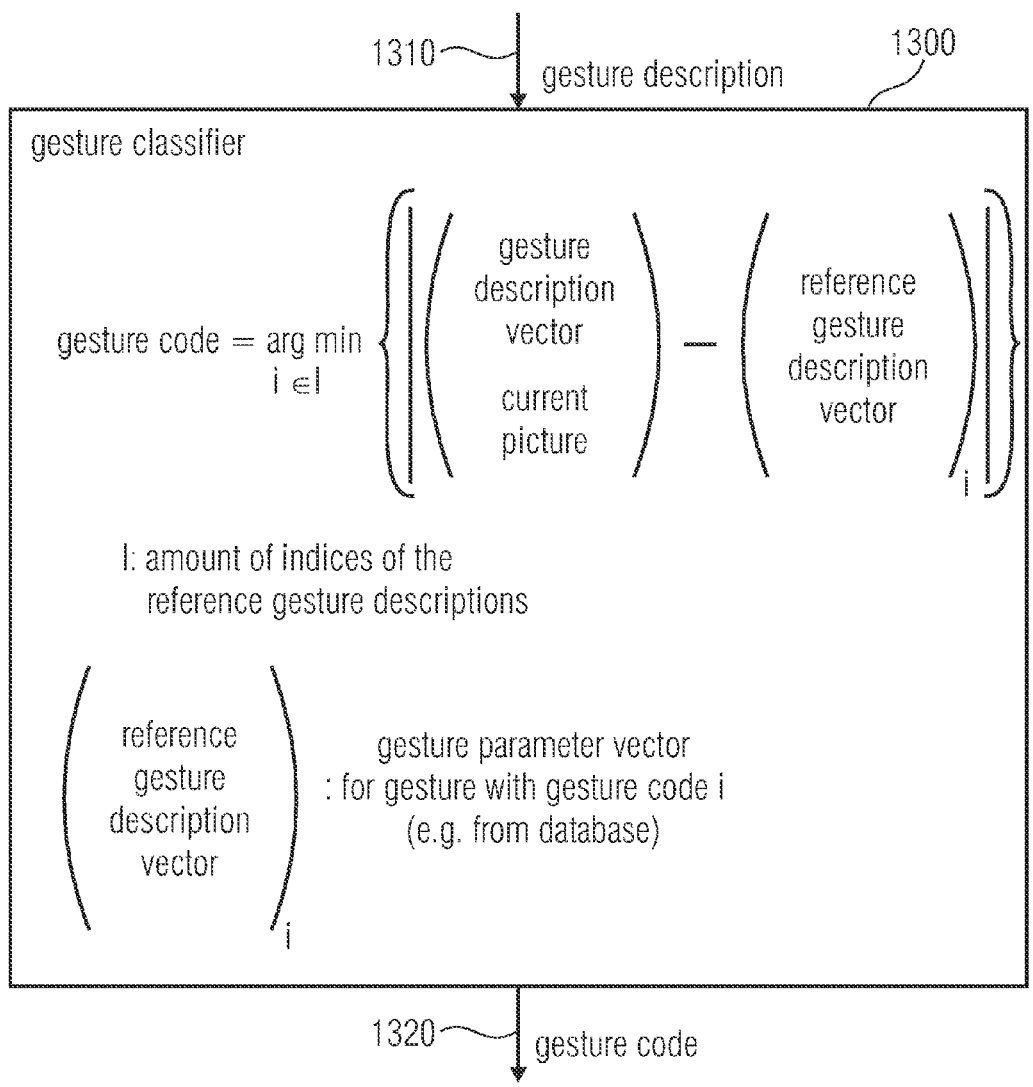
FIG. 13 shows a block diagram of a gesture classifier in accordance with an embodiment of the invention.

FIG. 13 shows a block diagram of a gesture classifier in accordance with an embodiment of the invention. The gesture classifier in accordance with FIG. 13 is designated by 1300 in its entirety. The gesture classifier 1300 is configured to receive a gesture description 1310 and to provide a gesture code 1320 on the basis of the gesture description 1310. The gesture classifier 1300 may regard the gesture description 1310 as a vector of parameters of different gesture elements, for example. The gesture classifier may further be configured, for example, to access a database including parameter sets of gesture elements of comparative gestures. For example, the gesture classifier may be configured to determine the degree of similarity between a parameter set describing gesture elements described by the gesture description 1310 and a parameter set describing gesture elements belonging to a comparative gesture. For example, the gesture classifier 1300 may compare the parameter set of the gesture elements described by the gesture description 1310 to parameter sets belonging to different comparative gestures in order to decide for which of the comparative gestures there is maximum similarity, or match. In this context, a difference between a set of parameters of gesture elements that belongs to the gesture description 1310 and a set of parameters that belongs to gesture elements of a comparative gesture may be determined, e.g., while using a mathematical distance dimension. For example, to this end the various parameter sets may be interpreted as vectors whose difference is evaluated with a vector norm. In this context, an index may be determined of that comparative gesture whose associated parameter set differs least from the parameter set described by the gesture description. A possible formula for determining the gesture code may be seen from FIG. 13. In accordance with the formula indicated there, a distance dimension, for example in the form of a vector norm, is calculated, a difference being determined between the parameter vector of the gesture description of a current picture and parameter vectors of different comparative gestures (having comparative gesture codes i), the comparative gestures being differentiated by different indices or comparative gesture codes i. Thus, e.g. the comparative gesture index i of that comparative gesture is determined which is most similar (with regard to the parameter vector) to the gesture described by the gesture description 1310. The corresponding gesture index i of the comparative gesture may serve as a gesture code 1320, for example.

It may thus be stated in summary that the gesture classifier 1300 may provide, as the gesture code 1320, information about which comparative gesture from a plurality of different comparative gestures is most similar to the gesture described by the gesture description 1310. In this context, e.g. the parameters of the individual gesture elements together may be interpreted as one vector of parameters. A difference between vectors of gesture parameters may be determined and/or indicated in a quantitative manner while using a mathematical vector norm.

Of course, other gesture classification methods may also be employed.

Various developments will be described in the following with regard to gesture classification.

Gesture Classifier

Second Embodiment

Figure 14:
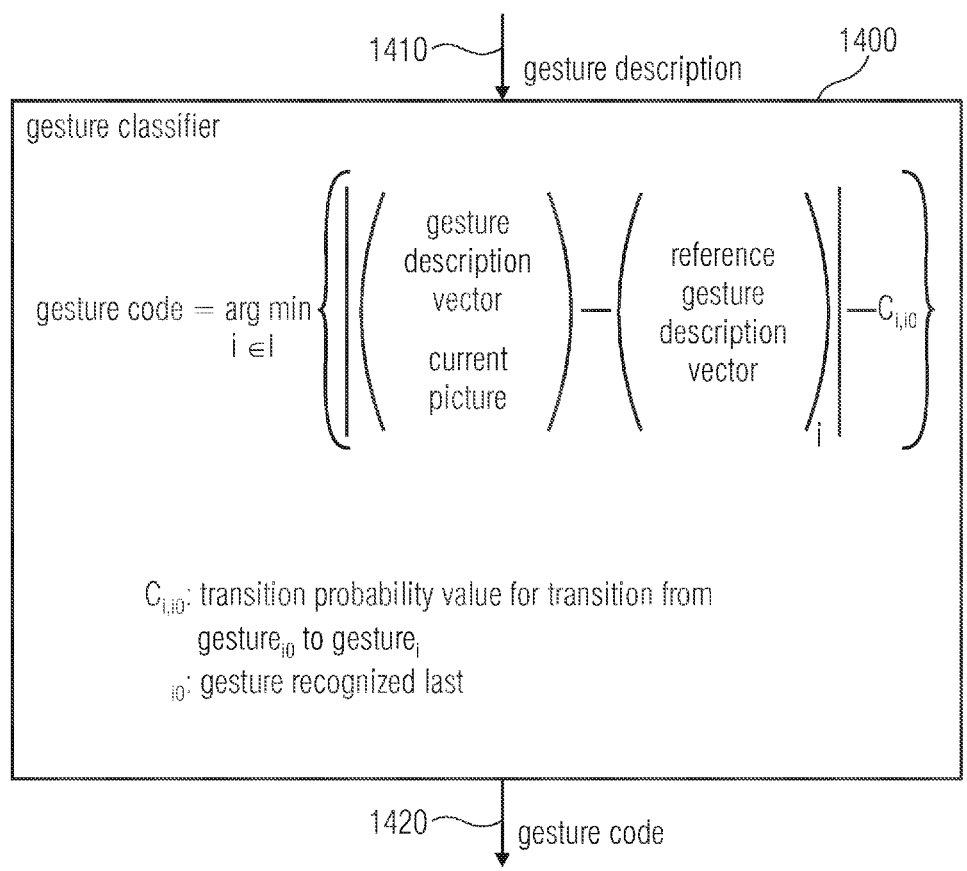
FIG. 14 shows a block diagram of a gesture classifier in accordance with a further embodiment of the invention.

FIG. 14 describes a block diagram of a gesture classifier in accordance with a further embodiment of the invention. The gesture classifier in accordance with FIG. 14 is designated by 1400 in its entirety.

The gesture classifier 1400 may be very similar to the gesture classifier 1300, for example. The gesture classifier 1400 may be configured, e.g., to receive a gesture description 1410, which may correspond to the gesture description 1310. The gesture classifier 1400 is configured to provide a gesture code 1420 on the basis of the gesture description 1410, which may correspond to the gesture code 1320. For example, the gesture classifier 1400 may be configured—by analogy with the gesture classifier 1300—to determine a difference between a feature vector (or parameter vector) of the gesture elements described by the gesture description 1410 and a feature vector (or parameter vector) of comparative gestures and to evaluate same in terms of size, for example by using a mathematical vector norm. However, the gesture classifier 1400 may additionally be configured to take into account a transition probability of a transition from a previously determined gesture to a current gesture. The transition probability is designated by $C_{i,i0}$, for example, in FIG. 14. i0 designates the most recently recognized gesture.

The transition probability may be formed on the basis of various criteria. As far as different consecutive gestures represent different instructions or "words", for example, there may be different probabilities for different sequences of instructions and/or words. If the gestures represent different control commands of a machine, for example, the succession of different commands may comprise different probabilities, for example. For example, the likelihood that a command "B" follows a command "A" may be 25%. In addition, a likelihood that a command "C" follows the command "A" may amount to only about 10%. If the first command "A" is represented by a first gesture, the command "B" is represented by a second gesture, and the command "C" is represented by a third gesture, the likelihood that the first gesture is followed by the second gesture will amount to about 25%, for example. By contrast, the likelihood that the first gesture will be followed by the third gesture amounts to only about 10%. The corresponding transition probabilities may be represented by the quantity $C_{i,i0}$, for example.

In addition, a physical model may be used for determining the transition probabilities $C_{i,i0}$. If it is, for example, assumed that the gestures are created by a human hand, a physical model of a human hand may be employed, for example. If it is assumed that pictures are taken at a specific time interval selected to be sufficiently small, one may assume that a gesture formed by the hand will typically not vary indefinitely between the taking of two successive pictures if one takes into account that a person typically does not perform absolutely jerky movements. Thus, if one assumes that successive pictures are taken with sufficient frequency, and/or that no absolutely jerky movements are performed, one may assume that only "similar" gestures will occur in two successive pictures. In addition, one may assume that the occurrence of totally different gestures in successive pictures is very unlikely or maybe even impossible. The transition probability $C_{i,i0}$ therefore describes the probability of the occurrence of the gesture having the gesture index i if the gesture having the gesture index i0 was recognized in a previous picture.

The corresponding transition probability may be taken into account in various ways. For example, gestures whose transition probability (starting from the current gesture) is below a predefined threshold value may be completely neglected when determining the gesture code. In other words, for determining a current gesture code of a current gesture, only such gestures may be used, for example, whose transition probabilities (starting from the current gesture) are sufficiently high (e.g. higher than a predetermined value).

Alternatively, all of the comparative gestures may be used for determining the gesture code of a current gesture; however, it is possible to also consider the different transition probabilities.

Thus, it is possible to take into account, for gesture classification, both a semantic probability of the succession of two different gestures and, alternatively or additionally, a probability within the framework of a physical model.

Gesture Description Verification

Figure 15:
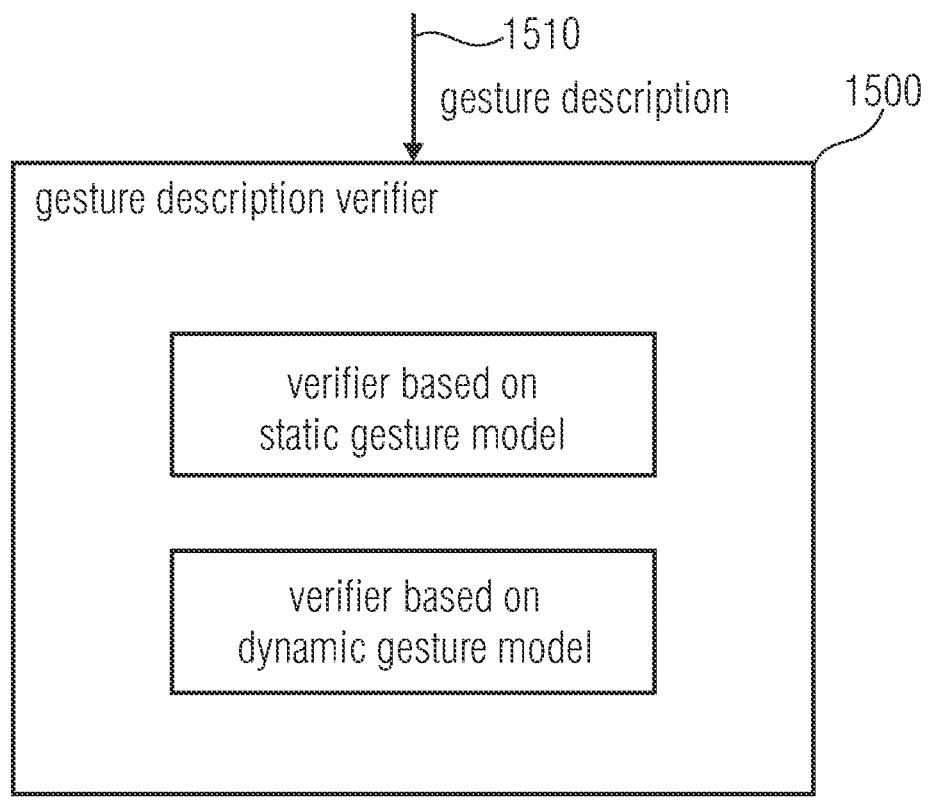
FIG. 15 shows a block diagram of a gesture description verifier in accordance with an embodiment of the invention.

FIG. 15 shows a block diagram of a gesture description verifier in accordance with an embodiment of the invention. The gesture description verifier in accordance with FIG. 15 is designated by 1500 in its entirety. The gesture description verifier 1500 is configured to receive a gesture description 1510 and to verify whether the gesture description 1510 represents an admissible combination of gesture elements described by parameters. In this context, the gesture description verifier 1500 may be employed in the apparatuses 100 in accordance with FIG. 1 and 200 in accordance with FIG. 2, respectively.

If one recognizes that a gesture description describes an inadmissible combination of features of gesture elements, the gesture description verifier may output, for example, a corresponding signal, e.g., which prevents a gesture code from being output, or which signals an error, for example.

The gesture description verifier 1500 may verify the gesture description 1510 in various ways. For example, the gesture description verifier 1500 may be configured to evaluate a static gesture model. A static gesture model may define which different mutual relative locations of individual gesture elements are actually admissible. If one assumes, for example, that a gesture is performed by a human hand, it will be easy to appreciate that the individual joints of the human hand are able to perform movements only within a certain range in each case. For example, while the hinge joints of the fingers can be bent essentially along one axis only, the metacarpophalangeal joints of the fingers, which are formed as ball-and-socket joints, offer more degrees of freedom. In addition, e.g., joints of the thumb offer a particularly large amount of mobility. However, one may generally state that the physical model of a gesture, said model taking into account the degrees of mobility, for example, defines certain limitations with regard to the possible gestures. For example, a physical model of a body part used for creating a gesture (for example of a hand) provides information about which gestures are actually possible on the basis of the degrees of freedom of movement, and which gestures are not achievable.

If the gesture description 1510 defines an arrangement of gesture elements that are not achievable on the basis of the physical movement model, the gesture description verifier may provide an error signal, for example.

Alternatively, or additionally, the gesture description verifier may be configured to verify the location of the gesture elements described by the gesture description 1510 while using a dynamic gesture model. The dynamic gesture model may be a physical model of gestures (or of the part of the body that generates the gestures), for example. The dynamic physical model may define, e.g., which sequences of movements are possible, i.e. which transitions are possible between two successive gestures (or successive gesture descriptions 1510). For example, the dynamic model may describe which locations of the individual gesture elements may be achieved, within a specific time period, starting from initial locations of the gesture elements (or starting from an initial gesture). For this purpose, the gesture description verifier may obtain, e.g., information about previous locations of the gesture elements or information about a previously recognized gesture. The gesture description verifier may further make a decision, on the basis of the physical model (for example of the body part creating the gesture), as to whether or not the current locations of the gesture elements that are described by the gesture description 1510 are actually achievable. If the current locations of the gesture elements that are described by the gesture description 1510 are not achievable starting from the initial locations or initial gesture, the gesture description verifier may provide corresponding signaling (e.g. in the form of an error signal).

Gesture Classification by Database Comparison

Figure 16:
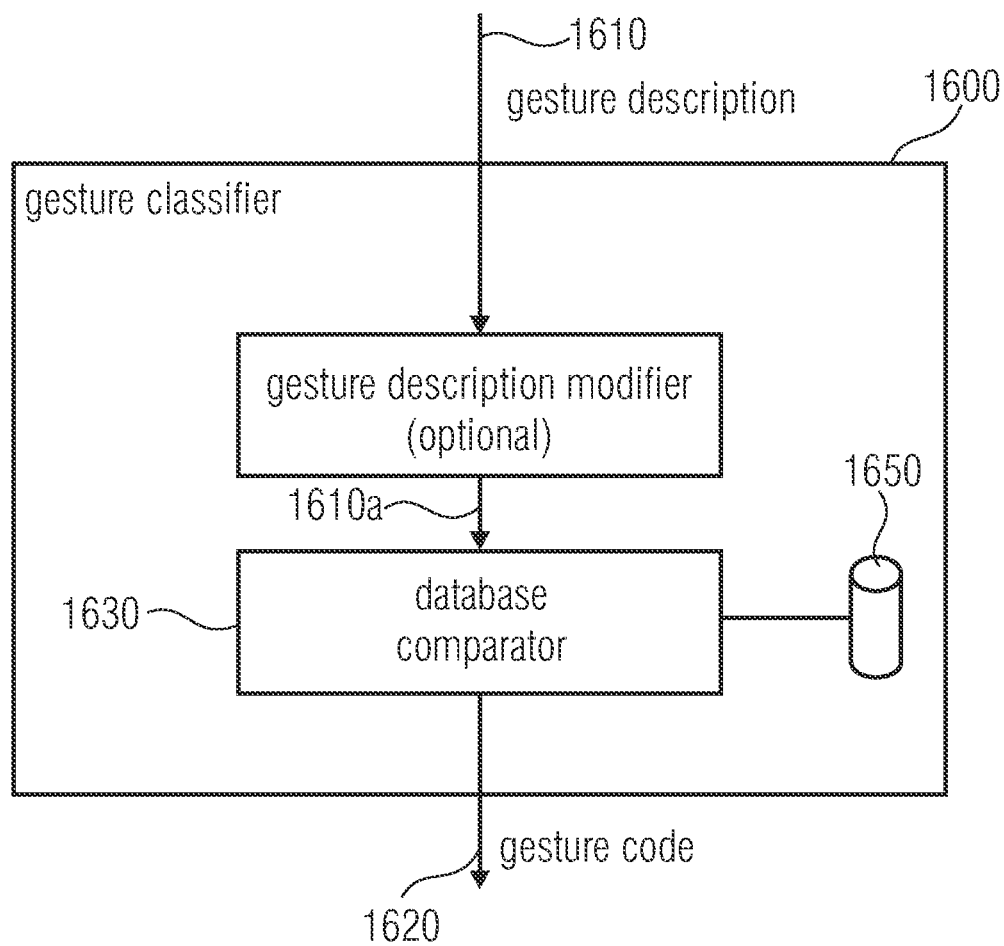
FIG. 16 shows a block diagram of a gesture classifier in accordance with an embodiment of the invention.

A brief description will be given below of how a gesture code may be obtained on the basis of a gesture description. To this end, FIG. 16 shows a block diagram of a gesture classifier in accordance with an embodiment of the invention. The gesture classifier in accordance with FIG. 16 is designated by 1600 in its entirety. The gesture classifier 1600 is configured to receive a gesture description 1610 and to provide a gesture code 1620 on the basis thereof. The gesture classifier 1600 includes a database comparator 1630 configured to receive the gesture description 1610 or, optionally, a modified gesture description 1610a. The database comparator is further configured to compare the received gesture description 1610, or the modified gesture description 1610a, to a plurality of comparative gesture descriptions contained in a database 1650. If the comparative gesture descriptions in the database 1650 have gesture codes associated with them, for example, the database comparator 1630 may provide, e.g. as the identified gesture code 1620, the gesture code of that comparative gesture from the database 1650 whose comparative gesture description matches or exhibits a maximum similarity with the currently processed gesture description 1610 or modified gesture description 1610a.

Thus, the gesture classifier 1600 is capable, all in all, of providing—by means of a database comparison—a gesture code associated with a currently processed gesture described by the gesture description 1610.

Considering Movements

In some embodiments in accordance with the invention, the gesture description creator may be configured to provide a gesture description including information about a movement of the gesture. Alternatively, the gesture classifier may be configured to extract information about a movement of the gesture from the gesture description provided by the gesture description creator.

In both cases, the gesture classifier may be configured to take into account a movement of a gesture area when determining the gesture code. The gesture classifier may thus be configured to distinguish between various states of motion of a gesture.

Determination of the states of motion may be effected in various ways and may be effected, e.g., by means of a dedicated motion determination means or by the gesture description creator or by the gesture classifier.

In one embodiment, a state of motion of the gesture may be effected, e.g., on the basis of a comparison of location parameters of mutually corresponding gesture elements at different points in time. For example, the location parameters of mutually corresponding gesture elements may initially be determined at least two different points in time. Thus, a gesture element may be identified at the second point in time for a selected gesture element—identified at the first point in time—with which it is associated. In this context, a gesture element is identified, for the second point in time, whose location comes sufficiently close to the location of the selected gesture element. Thus it will be assumed that the selected gesture element and the gesture element identified for the second point in time correspond to each other. Consequently, a location difference between the location of the selected gesture element and the location of the corresponding gesture element identified for the second point in time may be regarded as information about a change in location and, thus, as information about a movement.

Information about the movement between two points in time may be determined for different gesture elements. Thus, information about movements of different gesture elements is available. On the basis thereof, an average movement of the different gesture elements may be determined, for example. This average movement of the gesture elements may be interpreted as information about a movement of the overall gesture.

Alternatively or additionally, one may determine whether different gesture elements move in different directions. If this is the case, one may infer therefrom a rotary motion, for example.

All in all, it may therefore be stated that the information, provided by the Hough transformer, about the locations of gesture elements may be evaluated in order to obtain information about a movement of the gesture.

Alternatively or additionally, area information may be evaluated to obtain information about a movement of the gesture. E.g., a temporal development of a location of an area centroid of the gesture area may be evaluated to obtain movement information.

Alternatively or additionally, the momentum of the gesture area in various directions (or along various directions) may be determined, as was explained by means of FIGS. 6a-6c, for example. The momentum of the gesture area in a first direction (e.g. in the x direction and/or along the picture rows) and in a second direction (e.g. y direction and/or along the picture columns) may be determined. Thus, e.g. momenta $m_x$ and $m_y$ in accordance with FIGS. 6a-6c may be determined. If the gesture area deviates from a round shape, $m_x$ and $m_y$ will typically differ. Also, the ratio of $m_x$ and $m_y$ will typically change upon rotation of the gesture area. The change in the ratio of $m_x$ and $m_y$ over time (or a change in a difference of $m_x$ and $m_y$ over time, or a change in any other quantity derived from $m_x$ and $m_y$ over time) may be used, e.g., for obtaining movement information.

The movement information (which may include, e.g., information about a linear speed of the gesture area or of a centroid-of-area of same and/or information about a rotational speed and/or information about a temporal change in the gesture area) may optionally be evaluated to differentiate various gestures in gesture classification. For example, the movement information may also be included into the gesture description vector, for example, and may be taken into account in a database comparison.

Optionally, even a temporal course of the movement information may be included into the gesture description vector (e.g. in the form of movement information determined at different points in time). Consequently, the temporal course of the movement may be taken into account in the gesture classification.

Hough Transform

An approach in performing a Hough transform for identifying arcs, e.g. circular arcs or elliptical arcs, will be described in the following. It shall be noted in this respect that various types of Hough transform may be employed.

For example, parameterized curve shapes may quite generally be identified in a picture by means of the Hough transform, and, in addition, parameters of the parameterized curve may be determined. If, for example, a detail of a circular arc or elliptical arc having specific parameters is contemplated, there are various possibilities of where, e.g., a center of such a circular arc having a specific radius, said center running through a predefined point, may be located. Conversely, one may state that a specific point may be located on different circular arcs (of different radii and different centers).

By performing a Hough transform, one may identify both full circles and ellipses and details of circular arcs or elliptical arcs in a picture in the known manner. In this context, e.g. a detail of a circular arc (e.g. a circular-arc detail that is open toward the left, or a circular-arc detail that is open toward the right, or a circular-arc detail that is open upward, or a circular-arc detail that is open downward) may be regarded as a parameterized curve.

When performing the Hough transform, each pixel will have information associated with it about whether this pixel is located on a detail of a circular arc comprising corresponding parameters, said detail being open toward the right (or open toward the left, or open upward, or open downward). Accordingly, the gesture elements, e.g. in the form of circular arcs (e.g. details of full circles) or elliptical arcs (e.g. details of full ellipses) of different orientations, may be recognized, distinguished and described by parameters.

When performing a conventional Hough transform, a pixel may have a plurality of sets of parameters associated with it, for example. When performing a Hough transform for identifying a semicircle, one will ask the following question for each pixel, for example: on which semicircles (e.g. of a predefined orientation) is the point located? In other words, the question is to be solved as to where centers of semicircles (e.g. of the predefined orientation) extending through the given pixel may be located. If a first semicircle radius is predefined, centers of semicircles (of the given orientation) extending through the given point may also be located on a semicircle (said semicircle comprising the first radius). If one specifies a further semicircle radius, centers of semicircles (of the predefined orientation) may be located on a further semicircle (said further semicircle comprising the further radius).

The different parameter combinations that are possible (semicircle radius and center coordinates) may be accumulated, as is known from the Hough transform. Processing may be effected for all of the pixels, as is well-known from the Hough transform. Thus, semicircles (or other details of circular or elliptical curves) may also be readily identified while using the Hough transform.

Hough Transform—Parallel Hough Transform

An approach for performing a so-called "parallel Hough transform" as may be employed, for example, for recognizing details of circular arcs and elliptical arcs, will be described in the following.

Figure 17A:
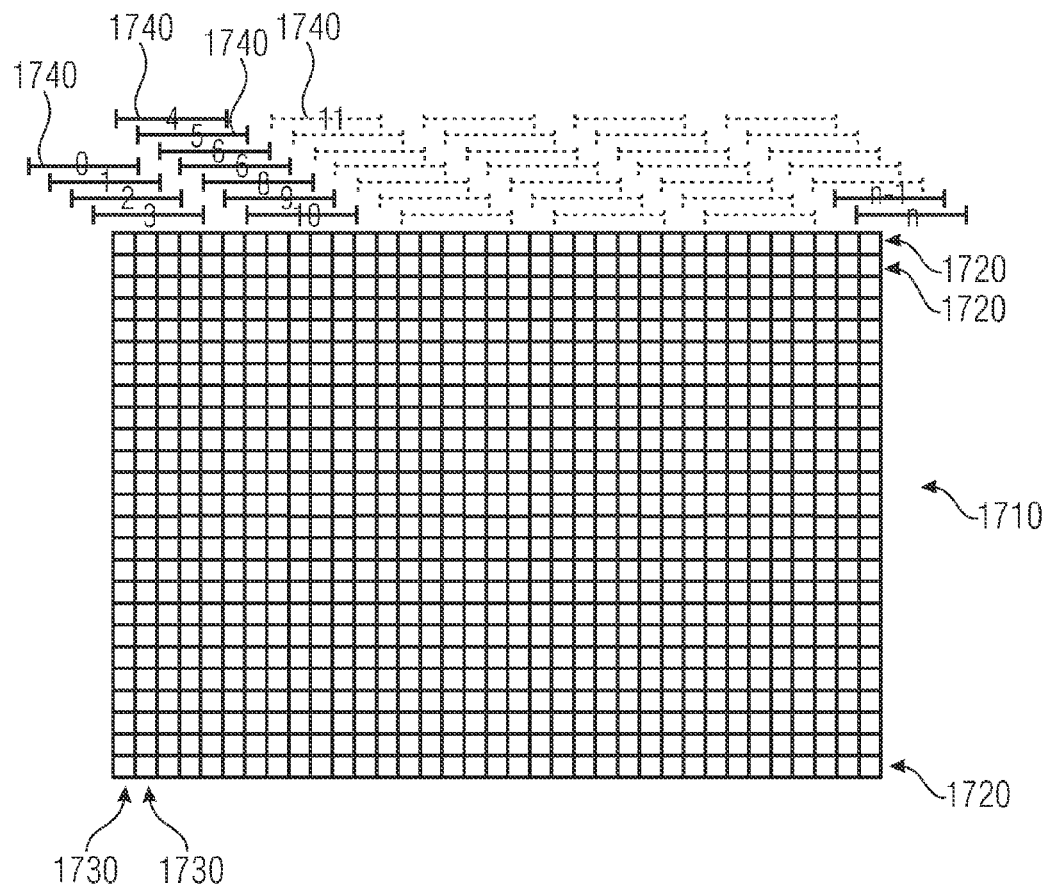
FIG. 17a shows a graphic representation of an approach of pushing a graphic picture through a pattern recognition means.

For this purpose, FIG. 17a shows a graphic representation of an approach for pushing a graphic picture through a pattern recognition means. Specifically, FIG. 17a shows a picture or raster picture being pushed, column by column, through the Hough transform means 1800 (also referred to as a Hough field or Hough array), which will be shown later on by means of FIG. 18.

In this context, FIG. 17a shows a raster picture 1710 consisting of a plurality of raster rows 1720 and a plurality of raster columns 1730. The picture 1710 may be the picture 110, the picture 210, a pre-processed version 232 of the picture 110, or a classified version 242 of the picture, for example.

In addition, groups 1740 of, e.g., five raster columns 1730 in each case are shown, it being assumed that five raster columns in each case are simultaneously supplied to the Hough transform means 1800 in parallel in the form of signals 1812, 1814, 1816 (as will be explained below).

Figure 17B:
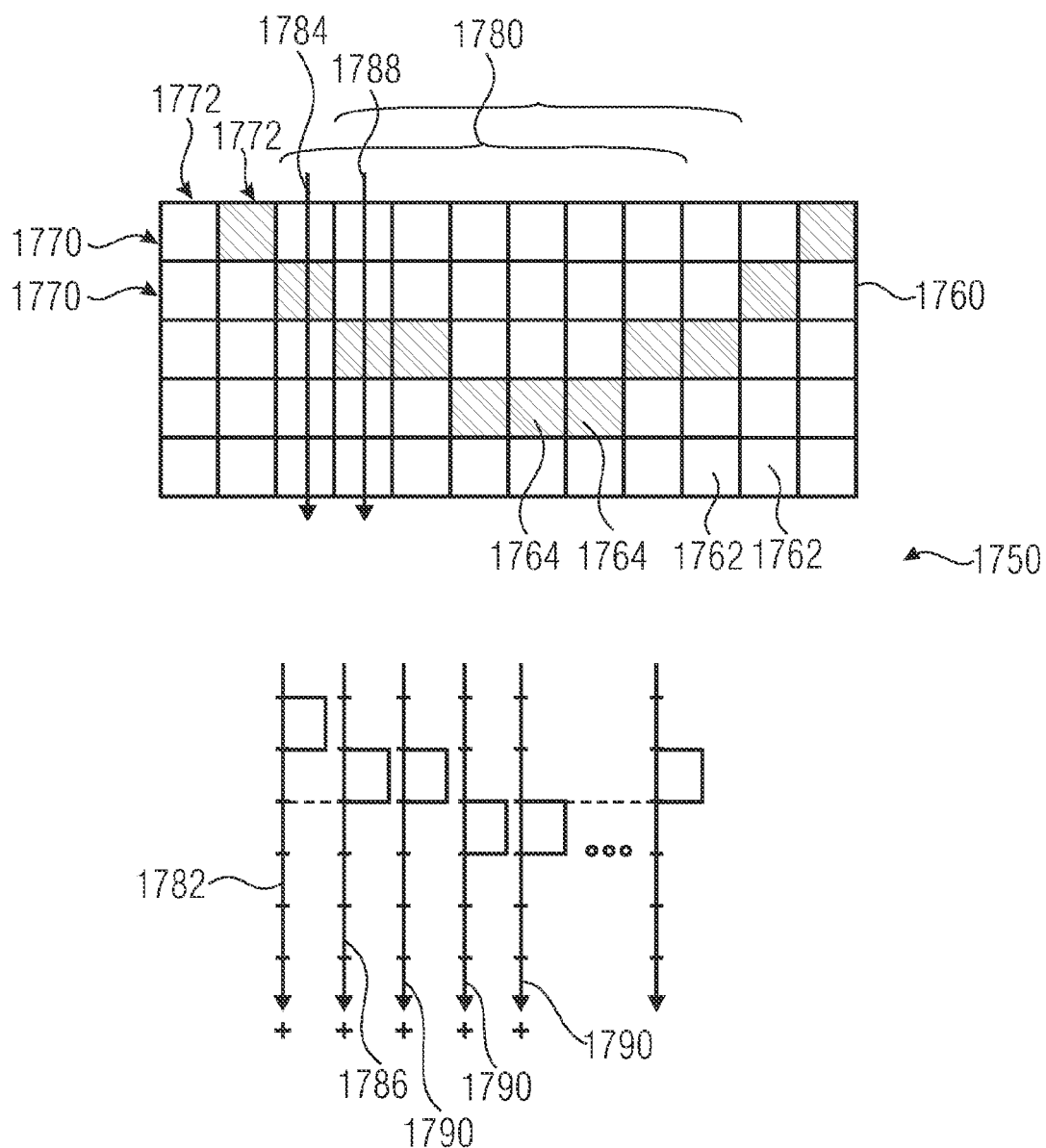
FIG. 17b shows a graphic representation of time signals resulting during conversion of a raster picture to parallel time signals.

FIG. 17b shows a graphic representation of time signals developing during conversion of a raster picture to parallel partial signals. The graphic representation of FIG. 17b is designated by 1750 in its entirety. The graphic representation 1750 shows a raster picture 1760 comprising a plurality of inactive raster points or pixels 1762 and a plurality of active raster points or pixels 1764 marked by hatching. The active raster points or pixels 1764 describe, e.g., a curve shape, for example a detail of a circular arc or elliptical arc, said detail being "open upward". As was already described above, the raster picture 1760 in this context includes a plurality of raster rows 1770 and a plurality of raster columns 1772. It shall also be assumed that time signals are formed on the basis of the picture detail 1780 including a group of, e.g., seven raster columns. For example, a first time signal 1782 is associated with a first raster column 1784 contained in the group 1780 of raster columns. In this context, the time signal 1782 develops in that the raster picture 1760 is scanned row by row along an associated raster column 1784. Similarly, a second time signal 1786 develops in that the second raster column 1788 from the group 1780 of raster columns is scanned row by row. Contemplation of the time curves clearly reveals that, with the scanning direction described, active raster points located in the same raster row of the raster picture 1760 result in simultaneous activity pulses on the time signals 1782, 1786, 1790. A horizontal line, i.e. a line extending within a raster row, thus makes itself felt in the time signals 1782, 1786, 1790 by simultaneous pulses on the time signals 1782, 1786, 1790. A curved course of a line, however, makes itself felt in temporally offset pulses on the time signals 1782, 1786, 1790.

Figure 18:
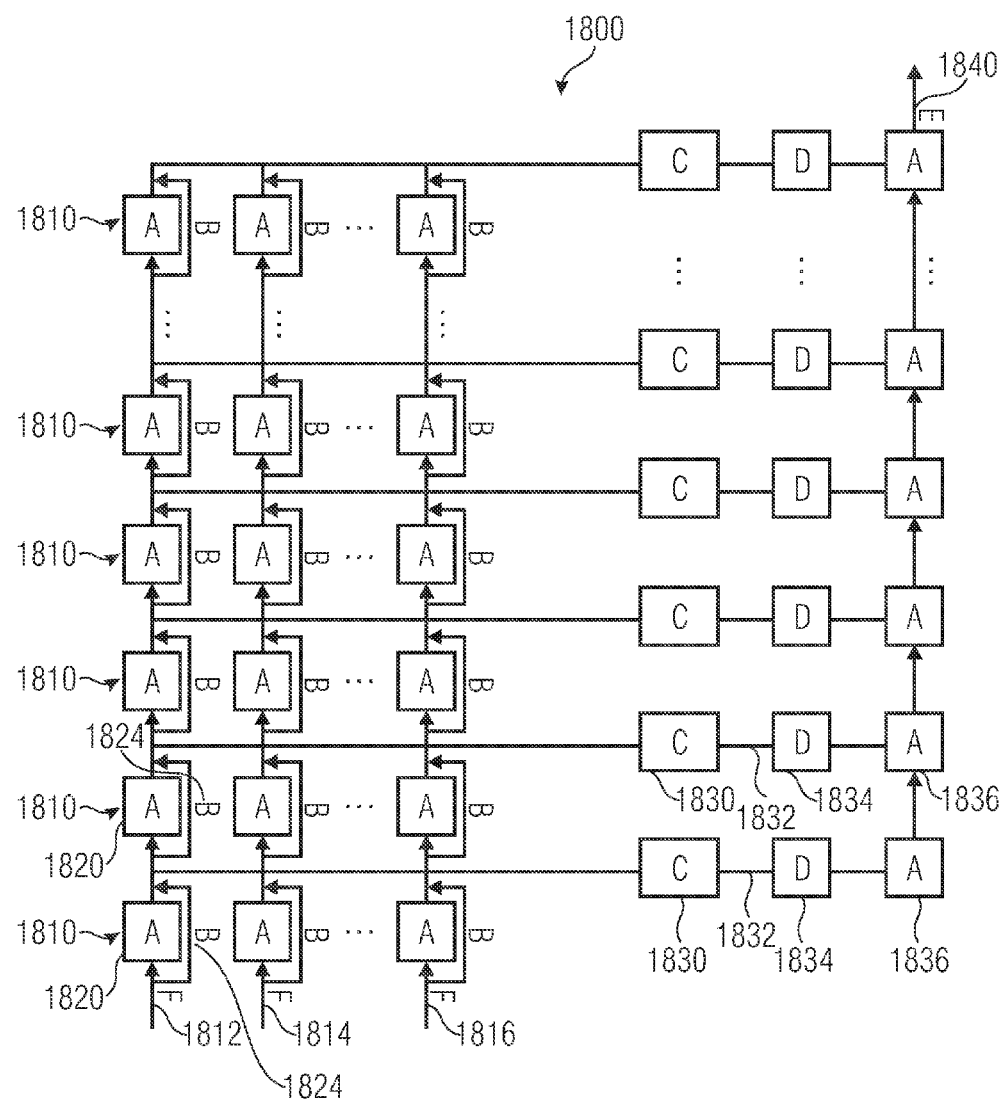
FIG. 18 shows a block diagram of a pattern recognition means for utilization in an inventive apparatus for recognizing a gesture, in accordance with an embodiment.

FIG. 18 shows a particularly advantageous means for performing a Hough transform. The means 1800 for performing a Hough transform in this context includes a plurality of cascaded stages 1810, through which several signals 1812, 1814, 1816 are forwarded in parallel. A stage contains, for each signal, either a delay element 1820, also referred to as A, or a bypass 1824, also referred to as B. In addition, the signals are supplied to a summing element 1830 at the output of a stage, said summing element also being referred to as C. The summing element here is advantageously configured to establish how many signals are active at the same time at the output of the stage in question. Thus, a so-called row sum is present at an output 1832 of a summing element 1830, said row sum indicating how many signals are active at the same time at the output of the stage in question. The row sum 1832 may then be supplied to a comparator 1834 comparing the row sum 1832 to a predefined threshold value. If the row sum 1832 exceeds the predefined threshold value, this will mean that at least a predetermined number of signals are active in the respective stage. In other words, in the respective stage there is, at least approximately, a "straight line" characterized in that at least a predefined number of signals of the respective stage are active at the same time. An output signal of the comparator 1834 is thereupon supplied to a delay element 1836. Several delay elements 1836, each of which is connected to an output of a comparator 1834 of a stage 1810, are cascaded in such a manner that the output signal of a delay element 1836 is supplied to the input of a subsequent delay element 1836.

It shall further be pointed out that the delay elements 1820, 1836 operate in a clocked manner, so that both the signals 1812, 1814, 1816 and the output signals of the comparators 1834 are forwarded in a clocked manner. The signals 1812, 1814, 1816 and the output signals of the comparators 1834 are forwarded, in terms of structure, in a parallel manner and in the same direction, but the signals 1812, 1814, 1816 in the individual stages are delayed to different degrees, depending on whether a delay element 1820 or a bypass 1824 is used for forwarding the signal 1812, 1814, 1816 in a stage 1810. However, it is advantageous for a central signal of the plurality of signals 1812, 1814, 1816 to be forwarded through the plurality of stages equally fast as the signals from the outputs of the comparators 1834. The central signal is advantageously equally delayed in each of the stages, and the output signals of the comparators 1834 are also advantageously forwarded through the stages with a constant delay. The central signal is advantageously located approximately halfway between the first signal 1812 and the last signal 1814, i.e. it describes a raster row in the center of the picture detail supplied to the Hough transform means 1800, or is spaced apart from the center of the picture detail by a maximum of 25% of a width of the picture detail. The width of the picture detail here is defined by the number of raster rows or raster columns that are simultaneously supplied to the Hough transform means 1800.

On the basis of the structural description, the mode of operation of the pattern recognition means 1800 will be described in more detail in the following. In this context, it is assumed that a picture detail is supplied to the Hough transform means 1800 in the form of parallel time signals 1812, 1814, 1816. The delay elements 1820 or the bypasses 1824 are configured such that different time signals 1812, 1814, 1816 are delayed to different degrees when they pass through the individual stages. The delays are set, by switching on delay elements 1820 or bypasses 1824, such that a bent curve shape (advantageously a circularly bent curve shape or a curve shape bent in the form of an ellipse) is straightened after passing one or more stages 1810. In other words, a bent curve shape in the picture detail processed by the Hough transform means results in that the individual signals 1812, 1814, 1816 are active at different points in time. By suitably setting the delay elements 1820 and/or the bypasses 1824, however, one may achieve that signals 1812, 1814, 1816 pass through the individual stages at different speeds, so that after passing through a specific number of stages 1810 ideally all of the forwarded signals that are based on the signals 1812, 1814, 1816 are active at the same time at the output of a stage. In this case, a particularly large row sum will occur in the specific stage, said particularly large row sum being calculated by the corresponding summing means 1830. An occurrence of such a large row sum may result in that the comparator 1834 of the stage in question outputs an active signal, which again will be forwarded to the output 1840 of the Hough transform means via the cascade of delay elements 1836. Thus, a location of a curve shape in the picture detail that is input to the Hough transform means 1800 in the form of time signals 1812, 1814, 1816 may be inferred from a temporal location of an activity on the output signal at the output 1840 of the Hough transform means 1800.

It shall further be noted that it is advantageous for a predetermined signal (also referred to as a central signal) from the signals 1812, 1814, 1816 to pass through the stages 1810 of the Hough transform means 1800 equally fast as an output signal from the outputs of the comparators 1834 that is forwarded by the cascade of delay elements 1836. In other words, at least one of the input signals 1812, 1814, 1816 propagates in parallel and at the same speed as the output signals of the comparators 1834. Thus, one may achieve that the output signal that is present at the output 1840 of the Hough transform means 1800 and that is based on those signals of the comparators 1834 that are passed on in the cascade of delay elements 1836 carries a direct indication of the point in time and/or location of the occurrence of a bent line segment in the input signals 1812, 1814, 1816. Here, the point in time of the occurrence of an activity on the output signal at the output 1840 of the Hough transform means 1800 provides an indication about the point in time when, and/or the location where, a bent line shape was input into the Hough transform means in the form of input signals 1812, 1814, 1816. The point in time of the occurrence of a straightened curve shape in the signals 1812, 1814, 1816 obviously allows direct inference of a spatial location of the bent curve shape in the raster picture underlying the signals 1812, 1814, 1816.

In addition, it shall be noted that in the configuration indicated, wherein at least one of the signals 1812, 1814, 1816 propagates equally fast through the stages 1810 as do the output signals of the comparators 1834, the precise shape of the curvature, i.e., for example, the radius of curvature, in a bent curve, only has an influence on which of the stages 1810 a comparator 1834 becomes active in. However, the precise form of the bent curve shape in the shown configuration has no influence on the point in time when an activity occurs at the output 1840 of the Hough transform means 1800.

It may thus be stated that the Hough transform means 1800 shown in FIG. 18 is suitable for establishing, in a very efficient manner, the location of a bent curve shape in a raster picture in that the raster picture (or a detail thereof) is converted to a plurality of parallel signals which will then pass through several stages of the Hough transform means 1800 at different speeds. By forming a column sum at the outputs of the stages 1810, one may recognize when at least a predefined number of signals are active at the same time at the outputs of the stages, which in turn indicates that the curve shape that was originally bent (e.g. approximately circular or approximately ellipsoid) has been "straightened".

Advantageously, the Hough transform means 1800 is configured, by a suitable selection of delay elements 1820 or bypasses 1824, to straighten such curve shapes described by signals 1812, 1814, 1816 which may approximate an ellipse at a first ellipse point (e.g. extreme point in a first direction), a second ellipse point (e.g. extreme point in a direction counter to the first direction), a third ellipse point (e.g. extreme point in a second direction), or a fourth ellipse point (e.g. extreme point in a direction counter to the second direction). In addition, only such curve shapes which may approximate an ellipse at the first ellipse point, the second ellipse point, the third ellipse point, or the fourth ellipse point are advantageously straightened. Thus, the Hough transform means 1800 in accordance with FIG. 18 is suitable for identifying a bent line segment (referred to as an "arc" for short) having a first orientation (for example "open toward the left"), a bent line segment having a second orientation (e.g. "open toward the right"), a bent line segment having a third orientation (e.g. "open downward"), or a bent line segment having a fourth orientation (e.g. "open upward"). The point in time when an output signal is present at the output 1840 of the Hough transform means 1800 describes a location of the identified curve shape (or line segment, or arc) in the raster picture on which the signals 1812, 1814, 1816 are based, i.e. a parameter of the bent line segments having different orientations.

If it is assumed that the time signals 1782, 1786, 1790 of a Hough transform means 1800 are supplied as input signals 1812, 1814, 1816, and that the signals 1812, 1814, 1816 are delayed to different degrees in individual stages 1810 of the Hough transform means 1800, it will become clear that the different degrees of delay of the time signals 1782, 1786, 1790 correspond to a distortion of the raster picture 1760, whereby a bent curve shape ("arc") may be bent into a straight line. However, a straight line corresponding to a simultaneous activity of several of the time signals 1782, 1786, 1790 may be recognized in the Hough transform means 1800, as was described above.

Hough Transform—Reference Curves

Figure 19:
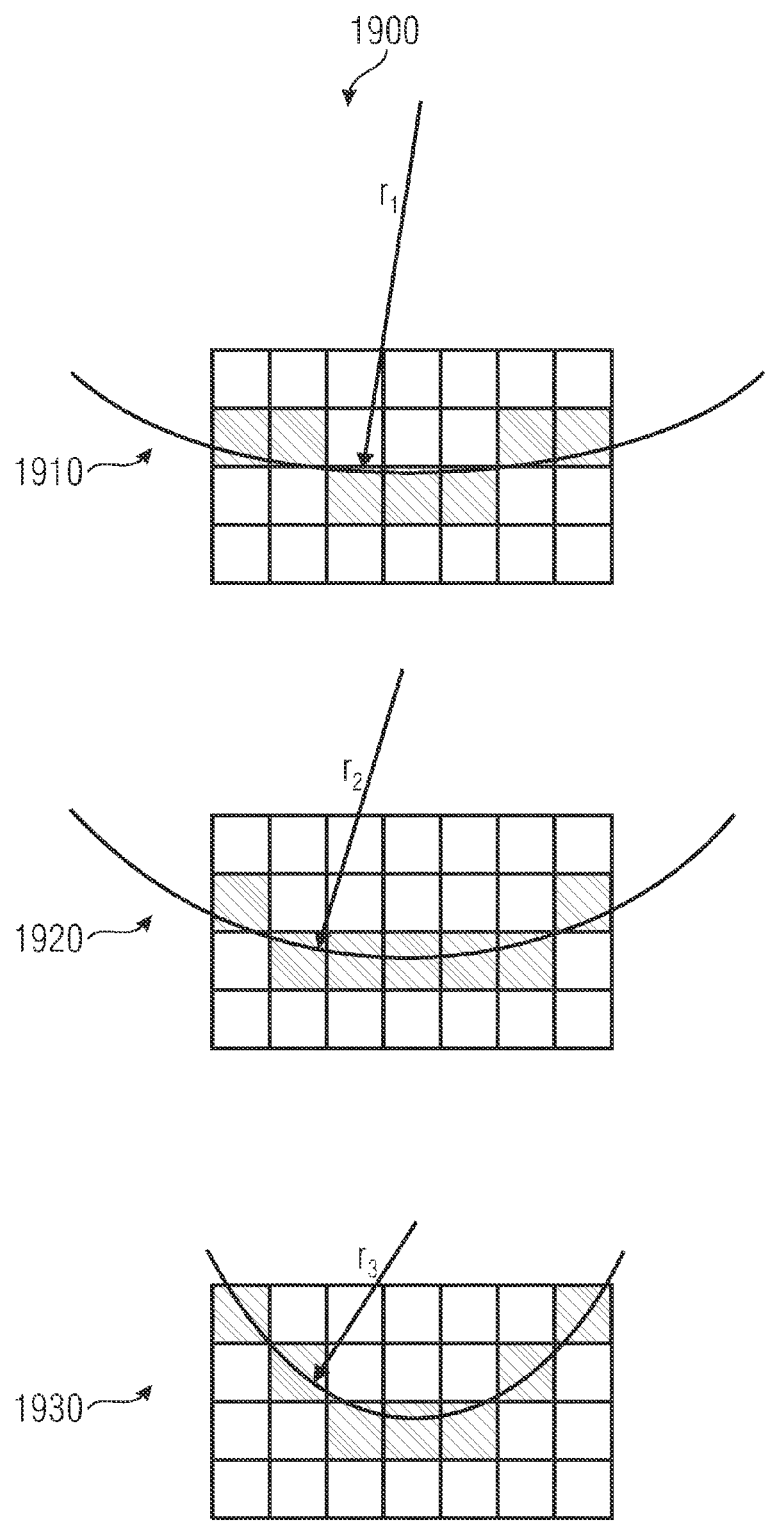
FIG. 19 shows a graphic representation of three exemplary reference curves for utilization in a pattern recognition means in accordance with an embodiment of the invention.

FIG. 19 shows a graphic representation of exemplary reference curves for utilization in a pattern recognition means in accordance with an embodiment of the invention. In other words, FIG. 19 shows a graphic representation of two examples of reference curve shapes for utilization in an inventive pattern recognition means. The graphic representation of FIG. 19 is designated by 1900 in its entirety.

A first graphic representation 1910 describes, in the form of a raster picture, a first reference curve shape approximating a section (or detail) of a circular (or ellipsoid) curve having a first radius of curvature $r_1$. A second graphic representation 1920 describes, in the form of a raster picture, a second reference curve shape approximating a section (or detail) of a circular (or ellipsoid) line having a second radius of curvature $r_2$, the second radius of curvature $r_2$ being larger than the first radius of curvature $r_1$. In addition, a third graphic representation 1930 shows, in the form of a raster picture, the third reference curve shape, which also describes a section or detail of a circular (or ellipsoid) line having a third radius of curvature $r_3$. The third radius of curvature $r_3$ is smaller than the first radius of curvature $r_1$. Thus, the three graphic representations 1910, 1920, 1930 of FIG. 19 describe three possible reference curve shapes for utilization in the pattern recognition means, for example in the Hough transformer 130 or in the contour line determiner 250. In other words, the Hough transformer 130 and/or the contour line determiner 250 may be configured, for example, to recognize one or more of the three reference curve shapes—shown in the graphic representations 1910, 1920, 1930 of FIG. 19—in the rastered picture or in the pre-processed version of the rastered picture (e.g. in the picture 110 or in the picture or picture detail 142) and to identify it/them e.g. as a gesture element (arc or bent line segment). In addition, the pattern recognition means, or the Hough transformer, may be configured to describe the location of a reference curve shape recognized in the rastered picture or picture detail by means of location parameters, and to make said location parameters available for further processing, for example while using the information 132 about the identified gesture elements, or in the form of the contour parameters 252.

The reference curves described by means of FIG. 19 may serve both as a foundation of a conventional Hough transform using parameter accumulation, and may be employed in a parallel Hough transform.

Hough Transform—Example 1 of a Fingertip

Figure 20A:
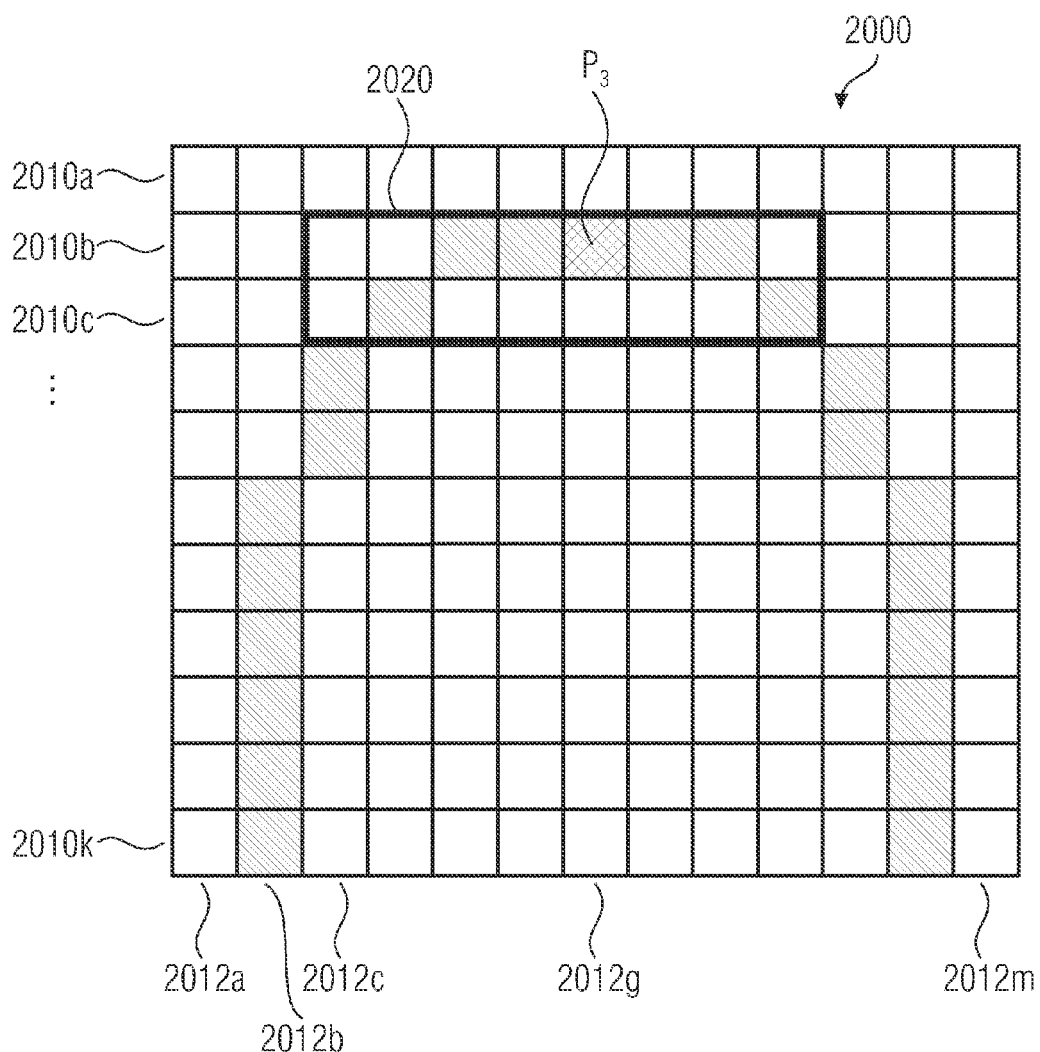
FIG. 20a shows a schematic representation of a picture detail including an upwardly oriented fingertip.

FIG. 20*a* shows a schematic representation of an exemplary picture detail including a contour line of a fingertip oriented upward. The picture detail in accordance with FIG. 20*a* is designated by 2000 in its entirety.

The rastered picture 2000 includes a plurality of raster rows 2010*a* to 2010*k* and a plurality of raster columns 2012*a* to 2012*m*. Pixels belonging to the contour line of the fingertip are depicted in hatching, and other pixels are depicted without any hatching. The picture 2000 may be regarded as a detail of the picture 110 and/or of the picture 210, or may be a detail of a pre-processed version of such a picture. The Hough transformer (for example the Hough transformer 130 or the contour line determiner 250) may process the picture 2000 so as to identify therein, e.g., an arc opened upward (e.g. a corresponding detail of a full circular arc or elliptical arc), an arc opened downward, an arc opened toward the left, and/or an arc opened toward the right.

Identification of such a detail of an arc may be effected, for example, by using the parallel Hough transformer, whose mode of operation and structure was explained by means of FIGS. 17*a*, 17*b*, 18, and 19. Alternatively, the corresponding arcs may also be identified using other concepts of the Hough transform.

In other words, the Hough transformer may be configured, for example, to establish whether one of the comparative curves 1910, 1920, 1930 is present in the picture 2000. In this context, the Hough transformer may process the picture in various orientations or may use comparative curves of different orientations so as to distinguish arcs of different orientations, for example.

In the present example, the Hough transformer may recognize that in the picture 2000 there is an arc opened downward which corresponds—except for the direction of the opening—to the reference arc 1920. Thus, the Hough transformer may identify the arc present in the picture region 2020 and describe it by means of one or more location parameters. For example, the Hough transformer may provide information about the fact that an extreme point P3 of the arc present in the picture region 2020 is located in the second row 2010*b* and the seventh column 2012*g*.

Thus, the Hough transformer may overall provide information about the identified gesture element—the arc that is open downward and is present in the picture region 2020—namely, e.g., information about the orientation (open downward) and about the location of the extreme point (e.g. expressed by a picture row and/or the picture column) or of the center.

Thus, the Hough transformer may all in all provide information about the location of the fingertip depicted in the picture 2000.

Hough Transform—Example 2 of a Fingertip

Figure 20B:
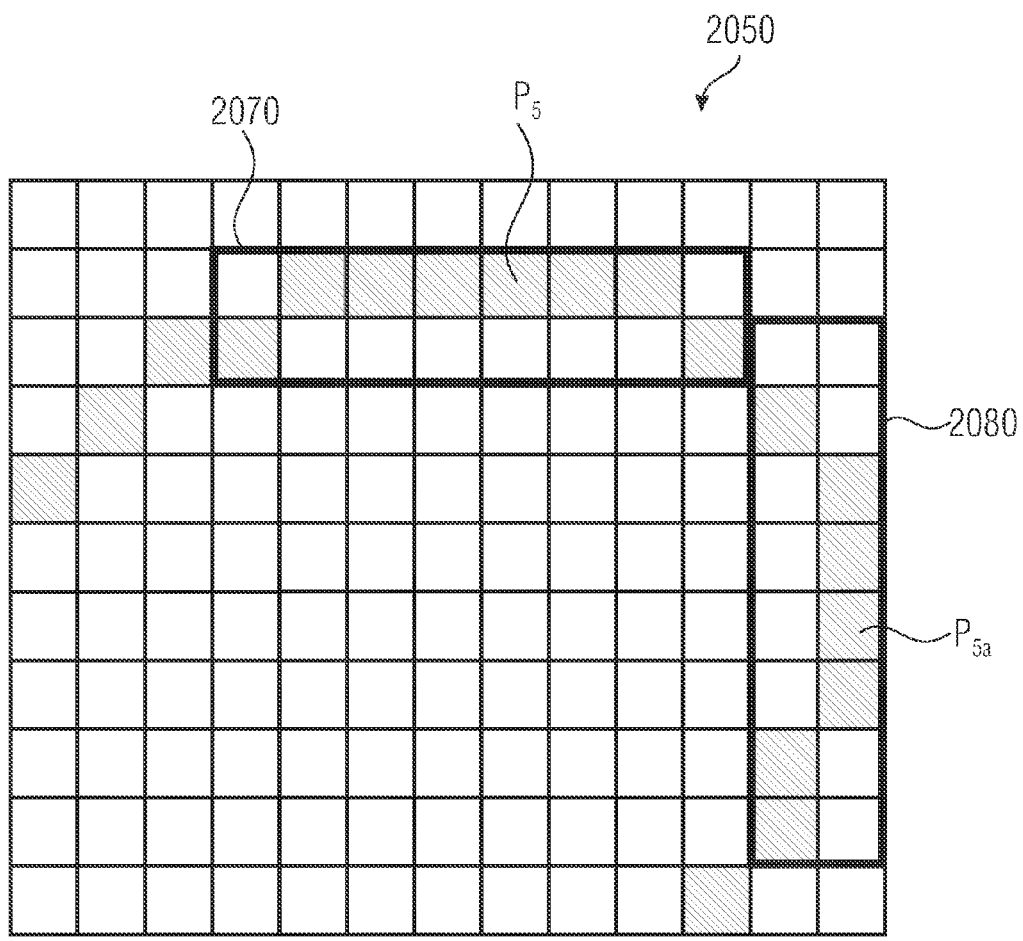
FIG. 20b shows a schematic representation of a picture detail which shows a fingertip directed to the top right.

FIG. 20*b* shows a schematic representation of a picture detail showing a finger pointing to the top right. The picture detail in accordance with FIG. 20*b* is designated by 2050 in its entirety. A picture region 2070 contains, e.g., an arc opened downward and containing an extreme point P5, and an arc opened toward the left is present in a picture region 2080. The arcs may be recognized, again, by the Hough transformer. Accordingly, the Hough transformer may provide information about the location of the extreme point P5*a* of the arc present in the picture region 2080.

Thus, it may be seen from FIGS. 20a and 20b how the Hough transformer may recognize, in the picture and/or in the picture detail and/or in the pre-processed version of the picture, arcs (e.g. details of full arcs), and may describe them by corresponding parameters indicating, e.g., the orientation and the location of an extreme point. Thus, the Hough transformer may provide the information 132 about the identified gesture elements or the contour parameters 252.

Symbolic Affine Mappings

In the following, a description will be given of how a symbolic affine mapping may be performed by the gesture description creator 140 or by the gesture classifier 150 (and/or by the gesture description creator 270 or by the gesture classifier 280).

Essentially, three different types of symbolic affine mappings are feasible:
shift;
rotation;
scaling.

The gesture description creator 140 or the gesture classifier 150 may create, e.g., several gesture descriptions (for example for comparison with the comparative gesture descriptions 162 from the database 160), which describe mutually similar—in a geometric sense—contour lines and are changed in relation to one another by an affine mapping.

Symbolic Affine Mappings—Shift

A shift will be initially described below. Starting from an initial gesture description, a shifted gesture description may be created, e.g., in that all of the location parameters, e.g. an x coordinate and a y coordinate, for individual gesture elements are changed in the same manner in each case. In other words, for example, a specific predefined value will be added to or subtracted from the location parameters of all of the gesture elements (that are taken into account in the creation of the gesture description since they belong to a contour line). For example, a specific value may be added to the location parameters in the x direction. Alternatively or additionally, a (further) specific value may be added to or subtracted from the location parameters in the y direction. Thus, a shift may be effected by a simple change in the location parameters of the gesture elements.

In some embodiments, the position may be normalized. In this context, one or more of the optional area parameters may be evaluated.

Symbolic Affine Mappings—Rotation

Figure 21:
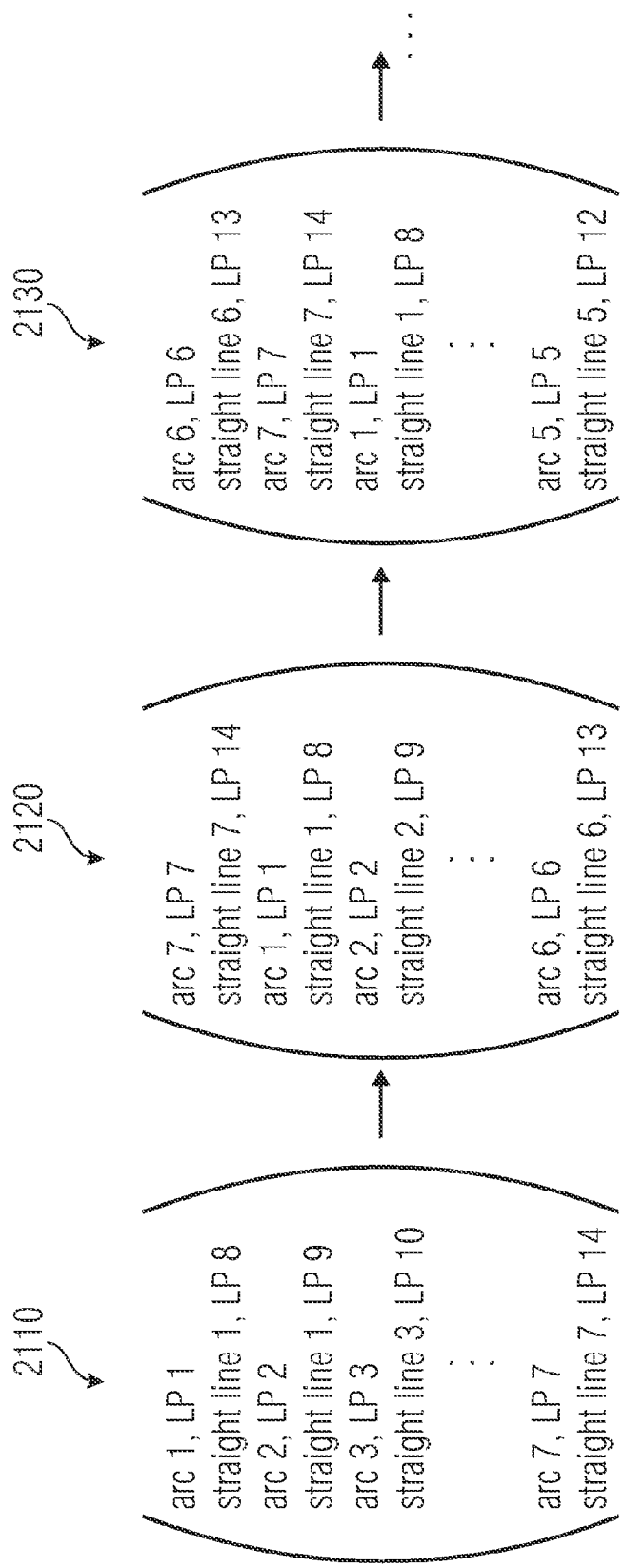
FIG. 21 shows a schematic representation of an approach in a cyclic through-rotation of a gesture description.

Performance of a rotation will be described in the following. In this context, reference is made to FIG. 21. FIG. 21 shows a schematic representation of an approach in cyclically through-rotating a gesture description. An initial gesture description is designated by 2110 in FIG. 21. Starting from this, a gesture description 2120 rotated once is obtained in the first cyclic through-rotation. By a further cyclic rotation, a gesture description 2130 rotated twice is obtained. The individual gesture elements are cyclically rotated through, as may be seen from FIG. 21. The direction of the cyclic through-rotation may be selected to be different. Basically, one may also randomly select the number of gesture elements by which the gesture description is to be rotated further in each case. The cyclically through-rotated gesture descriptions 2120, 2130 describe gestures that are rotated relative to the gesture described by the original gesture description 2110. In one embodiment, both the original gesture description 2110 and the (one or more) cyclically through-rotated gesture descriptions 2120, 2130 may be compared to the comparative gesture descriptions stored in the database.

For specifying a suitable rotation, one or more of the area parameters may optionally be used. For example, an area parameter may describe in which direction a gesture area has a maximum expansion. This information may be used for specifying the angle by which the initial gesture description is to be rotated (said angle being described, for example, by a number of gesture elements).

Symbolic Affine Mappings—Scaling

Scaling of the gesture description will be described below. Scaling of the gesture description comprises, e.g., scaling the size-determining parameters starting from the initial gesture description, whereas the shape-determining parameters remain unchanged.

With straight lines, for example, the length parameters are scaled, whereas direction parameters may remain unchanged. For a description of a circle or circle detail, however, only the radius parameter is varied, whereas the angle parameter or the orientation parameter remains unchanged.

It is also possible to scale the position parameters (initial point of a straight line, end point of a straight line, center of a circle, or extreme point of a circle) accordingly, for example in the sense of a dilation away from the dilation center or toward a dilation center.

Figure 22:
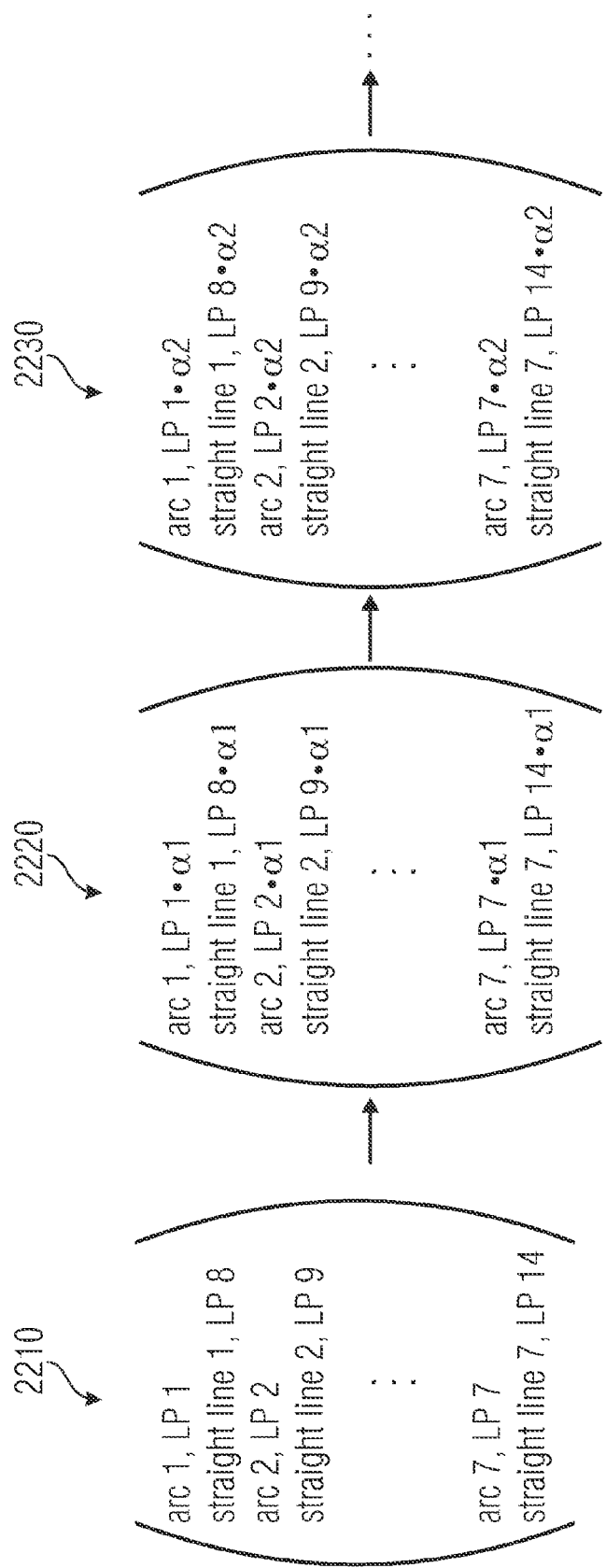
FIG. 22 shows a schematic representation of an approach in the scaling of a gesture description.

FIG. 22 shows a schematic representation of an approach for scaling of a gesture description. An original gesture description is designated by 2210. A gesture description that has been scaled once is designated by 2220. A gesture description that has been scaled twice (or a differently scaled gesture description) is designated by 2230. The scaled gesture descriptions 2220, 2230 differ from the original gesture description 2210, for example, in that, as was described above, the radius parameters of circles and the length parameters of straight-line segments are scaled using a scaling factor (e.g. $\alpha 1$, $\alpha 2$). Both the original gesture description 2210 and the scaled gesture description 2220, 2230 may be compared by the gesture classifier to the comparative gesture descriptions from the database.

Application 1

Figure 23:
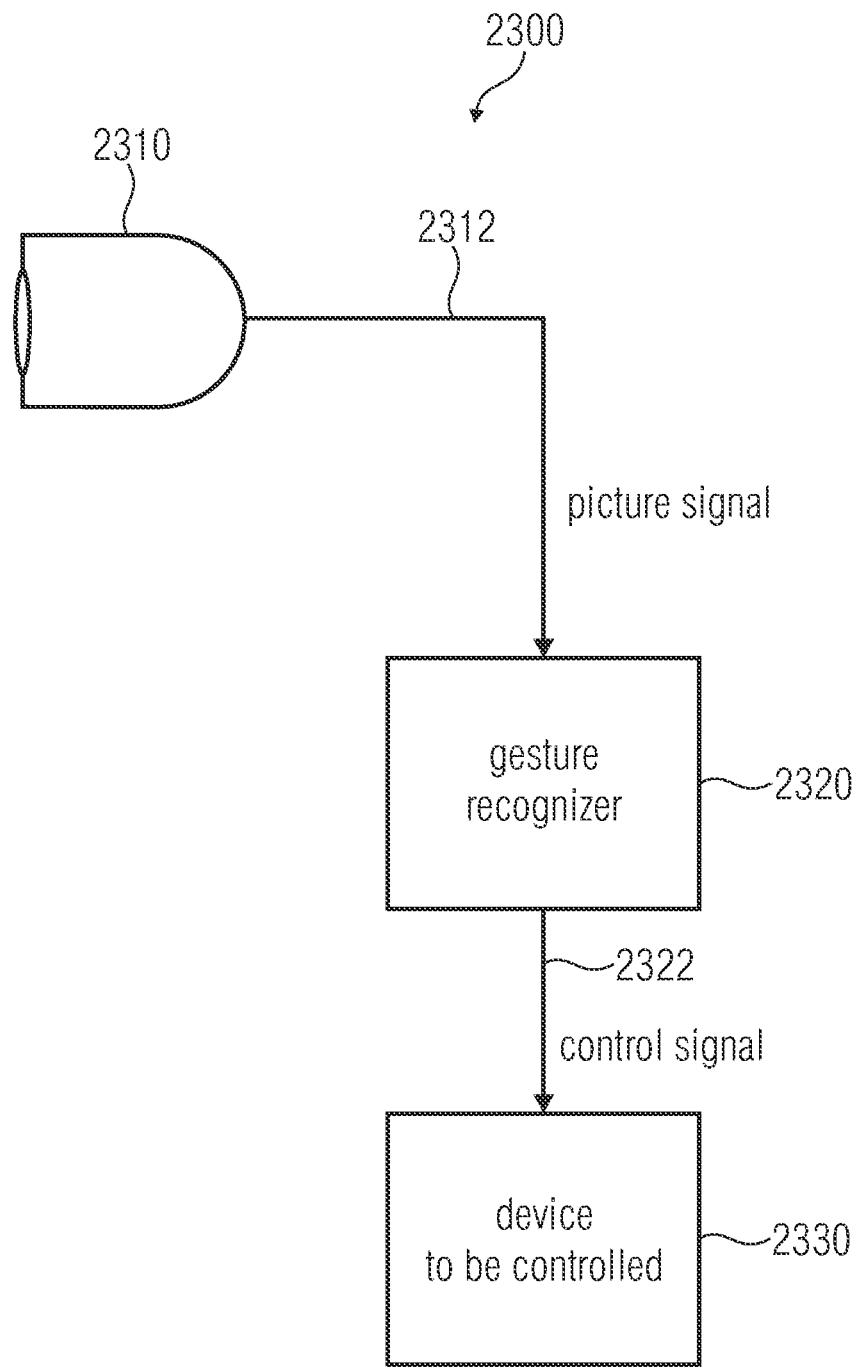
FIG. 23 shows a block diagram of an apparatus for controlling a device, in accordance with an embodiment of the invention.

One possible application of the inventive apparatus for gesture recognition will be described below with reference to FIG. 23. The arrangement in accordance with FIG. 23 is designated by 2300 in its entirety.

The arrangement 2300 includes a picture taking means, e.g. in the form of a camera, designated by 2310. The picture taking means 2310 provides a picture signal 2312 describing the picture taken by the picture taking means. The arrangement 2300 further comprises a gesture recognizer 2310 which may be one of the gesture recognizers described herein, for example. The gesture recognizer 2310 is configured to provide, on the basis of the picture signal 2312 describing the picture, information 2322 describing a gesture recognized in the picture, for example in the form of a gesture code. The information 2320 may be provided to a device 2330 to be controlled so as to serve as control information for the device 2330 to be controlled.

Thus, the device 2330 to be controlled may be placed in different states, e.g. on the basis of the gesture recognized by the gesture recognizer 2320. If a first gesture is recognized, this may understood—on the basis of the control signal 2322—as a first command by the device 2330 to be controlled. However, if a second gesture is recognized that is different from the first gesture, this may be understood as a second command by the device 2330 to be controlled. Thus, it is to be stated overall that the functions of the device 2330 to be controlled are controlled on the basis of the gesture recognized by the gesture recognizer 2320, different gestures representing different commands for the device 2330 to be controlled.

Application 2

Figure 24:
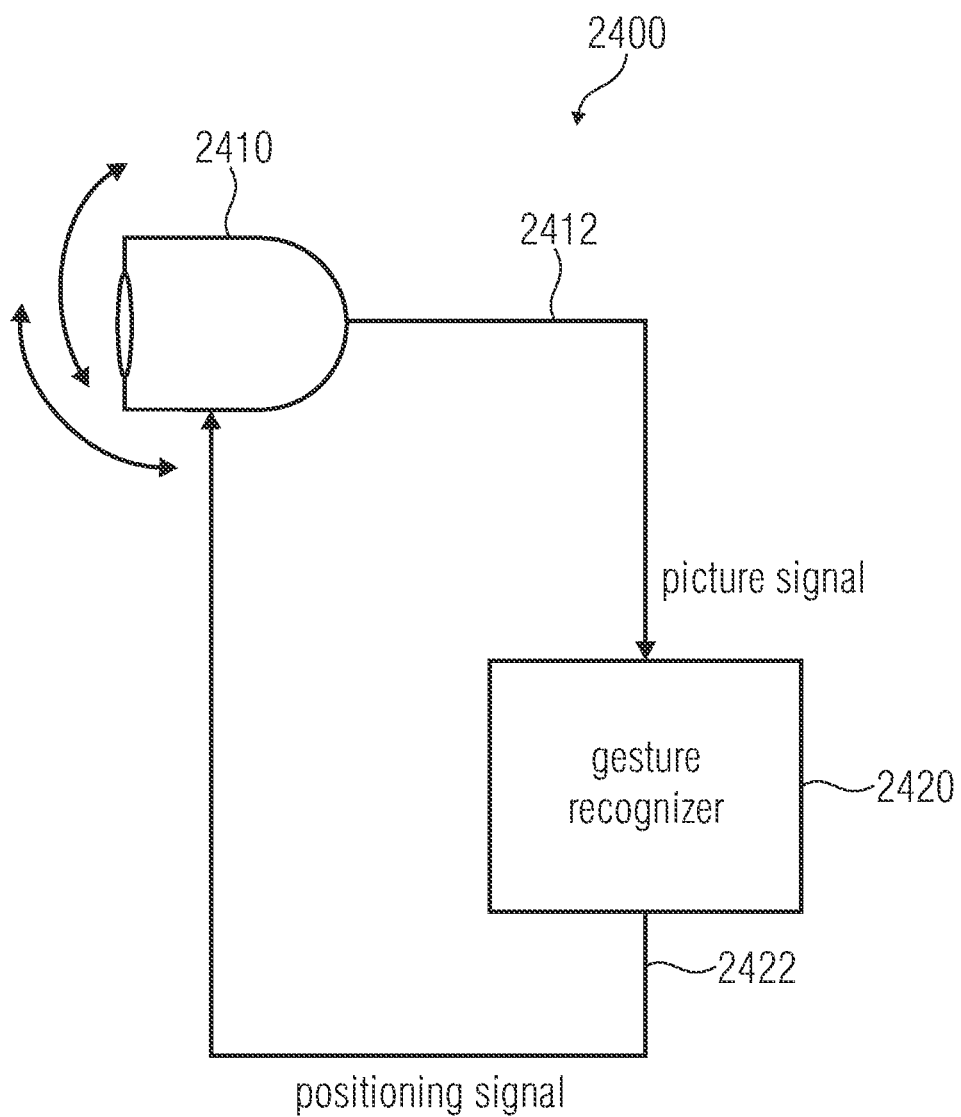
FIG. 24 shows a block diagram of an apparatus for controlling a camera, in accordance with an embodiment of the invention.

A further embodiment in accordance with the invention will be described in the following with reference to FIG. 24. FIG. 24 shows a block diagram of an apparatus for controlling a camera in accordance with an embodiment of the invention. The apparatus in accordance with FIG. 24 is designated by 2400 in its entirety. The apparatus 2400 includes a camera 2410 configured to provide a picture signal 2412. The apparatus 2400 further includes a gesture recognizer 2420, which corresponds to the gesture recognizer described herein. The gesture recognizer 2420 is configured, for example, to provide, on the basis of the picture signal 2412, a gesture code that may serve, e.g., as a positioning signal 2422. The positioning signal 2422 may be utilized, for example, to effect a tilt and/or a pan of the camera 2410. Thus, for example, depending on the gesture that is recognized in the picture described by the picture signal 2412, a tilt and/or pan of the camera 2410 may be effected. Thus, all in all, gestures may be used for controlling the alignment of the camera 2410. Alternatively or additionally, further functions of the camera may be controlled, for example taking a snapshot, zoom functions, settings of exposure parameters, and the like.

Method 1

Figure 25:
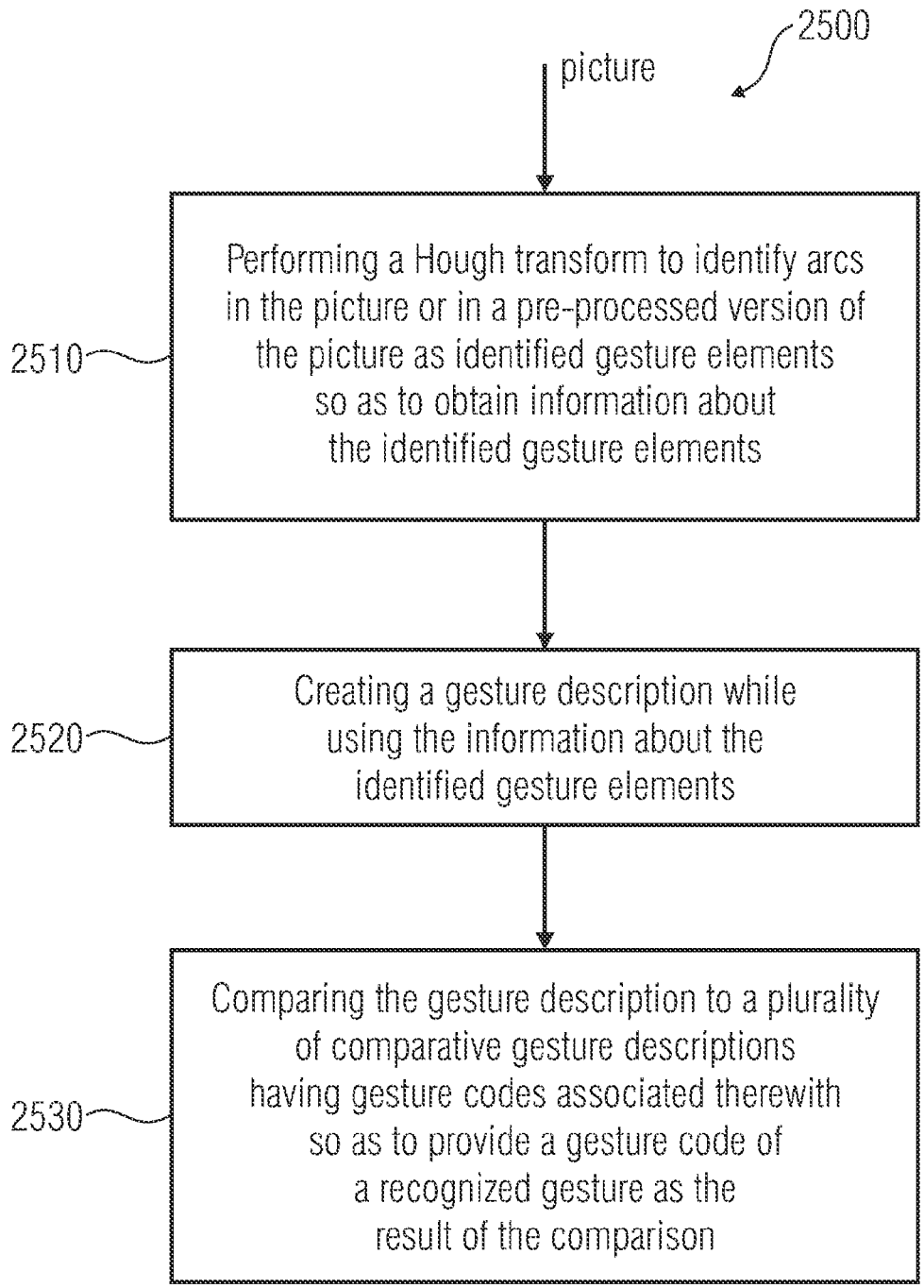
FIG. 25 shows a flowchart of a method of identifying a gesture in a picture, in accordance with an embodiment of the invention.

A description of a method will be provided in the following. FIG. 25 shows a flowchart of a method of identifying a gesture in a picture, in accordance with an embodiment of the invention. The method in accordance with FIG. 25 is designated by 2500 in its entirety.

The method 2500 includes performing 2510 a Hough transform to identify arcs in the picture or in a pre-processed version of the picture as identified gesture elements so as to obtain information about the identified gesture elements.

The method additionally includes creating 2520 a gesture description while using the information about the identified gesture elements.

The method 2500 further includes comparing 2530 the gesture description to a plurality of comparative gesture descriptions having gesture codes associated with them so as to provide, as the result of the comparison, a gesture code of a recognized gesture.

The method 2500 may optionally be supplemented by all of the features and functionalities that have been described herein with regard to the inventive apparatuses.

Method 2

Figure 26:
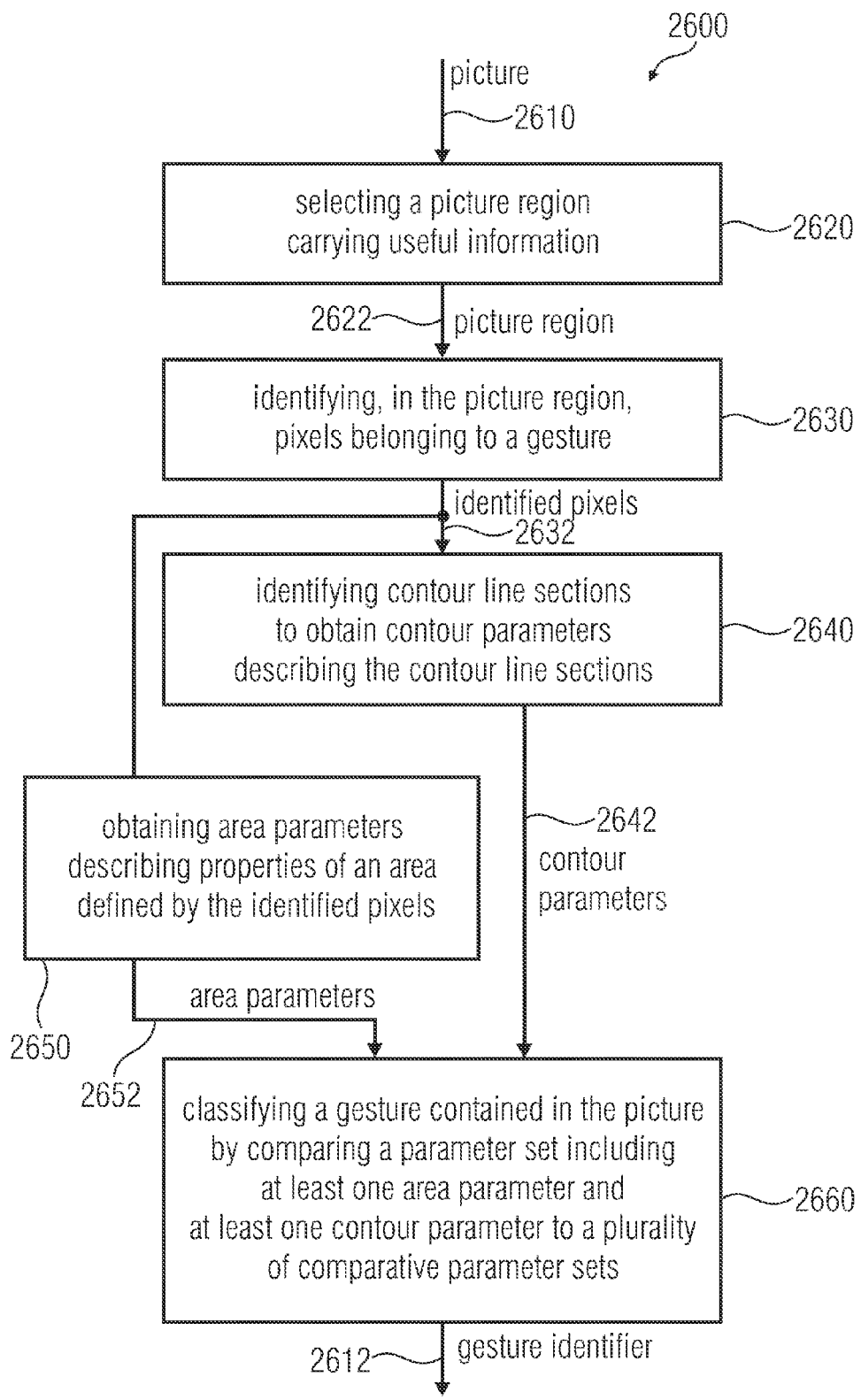
FIG. 26 shows a flowchart of a method of identifying a gesture in a picture, in accordance with a further embodiment of the invention.

A further method of identifying a gesture will be briefly described in the following with reference to FIG. 26. The method in accordance with FIG. 26 is designated by 2600 in its entirety. The method 2600 is configured, all in all, to provide a gesture identifier 2612 on the basis of a picture 2610. In a first (optional) step 2620, the method 2600 comprises selecting a picture area carrying useful information. Thus, a picture area 2622 may be identified, for example. In a further step 2630, the method 2600 further includes identifying pixels in the picture region 2622 (or in the picture 2610), said pixels belonging to a gesture. Thus, the information 2632 is available which describes identified pixels. On the basis of the information 2632 about identified pixels, contour line sections of a predefined shape (for example arcs of different opening directions) may be identified in a further step 2640 so as to obtain contour parameters that describe the contour line sections. Thus, contour parameters 2642 are obtained, for example, that describe the contour line sections. In addition, in a further step 2650, one or more area parameters may be obtained which describe properties of an area defined by the identified pixels. Thus, area parameters 2652 are available. In a further step 2660, for example, a gesture contained in the picture may be identified. The classification may be effected, for example, by comparing a parameter set including at least one area parameter and at least one contour parameter to a plurality of comparative parameter sets. In this context, one of the comparative parameter sets may be identified with which there exists a best possible match, or at least a sufficient match. The gesture identifier 2612 may thus be provided depending on which of the comparative parameter sets best corresponds to the current parameter set.

In addition, the method 2600 may be supplemented by all of the functionalities described herein.

Implementation Alternatives

The inventive apparatus and the inventive method may be implemented in hardware or in software. Implementation may be on a digital storage medium, for example a disc, a CD, DVD, a ROM, a PROM, an EPROM, an EEPROM, or a flash memory having electronically readable control signals that may cooperate with a programmable computer system such that the corresponding method is performed.

Generally, the present invention thus also consists in a computer program product having a program code, stored on a machine-readable carrier, for performing the inventive method, when the computer program product runs on a computer.

In other words, the invention may be realized as a computer program having a program code for performing the inventive method, when the computer program runs on a computer.

Several further embodiments in accordance with the invention will be described below.

Further Embodiment 1

In one embodiment, the inventive idea is a method and an apparatus for recording pictures or videos, of extracting information from the data stream, and of interpreting the patterns found. For example, the method and the apparatus serve to recognize characters. In a particular case of application, the characters may be gestures created by different hand positions. A posture of the hand (or the hands) is recorded by a camera, for example. In a multi-stage processing method, the method and the apparatus process the existing video sequences (frames) or individual pictures and extract gestures therefrom. A pre-processing stage is, e.g., segmentation of the picture and classification of pixels, which are associated with a skin color. The picture is separated, e.g., into skin-colored pixels and non-skin-colored pixels.

The method is combined with contour line extraction algorithms, for example, in a next step. Thus, the information exists both as area information and as contour parameters. E.g. area parameters, such as centroid, elongation and/or expansion in the horizontal and vertical directions, angular momentum and/or eccentricity are determined from the area. A classification algorithm is applied, e.g., to said parameters, by means of which classification algorithm the gestures are associated with specific gesture classes (this is also referred to as match-finding or matching).

For example, shape extractors such as an apparatus or computer program referred to as "WinDelayLine", or run length coding methods are employed as contour line extractors. The run length codes found and/or the set of tuples of the line segments found, which are defined in each case by the spatial position x_i, y_i, and of the local slope and/or curvature are matched with the stored pattern data sets by means of classification algorithms, for example.

Possibilities of Application

Some embodiments in accordance with the invention may be employed, e.g., for remote control of various devices, e.g. of radios or TV sets. Embodiments in accordance with the invention may be employed, for example, for assisting handicapped or elderly people ("senior generation"). All of the embodiments in accordance with the invention may be employed for controlling industrial equipment. Quite generally, embodiments in accordance with the invention may be employed for improving human-machine interaction.

Some embodiments in accordance with the invention thus provide a universally applicable method and apparatus for character and/or gesture recognition.

Further Thoughts Regarding the Invention

In some embodiments in accordance with the invention, application of the edge detection methods, described herein, for gesture recognition is particularly important.

In other embodiments, however, slightly modified edge detection methods may be employed.

In some embodiments in accordance with the invention, graphic models (e.g. a graphic model describing a contour line of a hand) may be employed. The graphic models may describe, e.g., a picture object by enumerating individual objects and/or their parameters. For details regarding the possibilities of employing graphical models, please refer to the publications "Object Detection by Contour Segment Networks" by V. Ferrari and others and "Robust Object Recognition with Cortex-Like Mechanisms" by L. Wolf and others (published in: IEEE Transactions on Pattern Analysis and Machine Intelligence. Vol. 29, No. 3 Mar. 2007), wherein said subject-matters are described.

In some embodiments, a skin-color recognizer and, subsequently, a Hough transform is employed within the context of gesture recognition. Details regarding a possible implementation of a Hough transformer are described, e.g., in US 2005/117781 AA and US 2006/210116 AA. The documents mentioned describe examples with regard to performing the Hough transform as is nowadays employed in vehicles and in ASIMO. Utilization of the concepts described in the documents mentioned is possible within the context of the inventive apparatus and method.

In some embodiments in accordance with the invention, concepts may be used for determining a gesture and/or a hand posture which are described, for example, in the publication "Visual Hand Tracking using Nonparametric Belief Propagation" by E. B. Sudderth and others (published in: MIT Laboratory for Information & Decision Systems Technical Report P-2603, May 2004, presented at the 2004 IEEE CVPR Workshop on Generative Model based Vision"). Alternatively or additionally, concepts may be employed, in the context of gesture recognition, as are described, e.g., in the publication "Hand Gesture Extraction by Active Shape Models" by N. Liu and V. C. Lovell (published in: Proceedings of the Digital Imaging Computing: Techniques and Applications (DICTA 2005)). In addition, concepts may be employed as are described, e.g., in the publication "Graphical Knowledge Representation for Human Detection" by C. Schnörr and others (published in: International Workshop on The Representation and Use of Prior Knowledge in Vision, May 2006). Alternatively or additionally, concepts may be used, in gesture recognition, as are described in the publication "Learning of Graphical Models and Efficient Inference for Object Class Recognition" by C. Schnörr and others (published: 28$^{th}$ Annual Symposium of the German Association for Pattern Recognition, September 2006).

Alternatively or additionally, concepts may be used in gesture recognition as are described, for example, in the publication "Spine Detection and Labeling Using a Parts-Based Graphical Model" by C. Schnörr and others (published in: Information Processing in Medical Imaging 2007, Springer, 2007 pages 122-133).

Alternatively or additionally, concepts may be employed for gesture recognition as are described in the publication "MAP-Interference for Highly-Connected Graphs with DC-Programming" by C. Schnörr and others (published: 30$^{th}$ Annual Symposium of the German Association for Pattern Recognition, June 2008).

In some embodiments in accordance with the invention, the concepts described in the publication "Representing Directions for Hough-Transforms" by F. Wenzel and others (published in VISAPP 2006; 1$^{st}$ International Conference on Computer Vision Theory and Applications, Proceedings) may also be used for gesture recognition.

In some embodiments in accordance with the invention, the concepts as are described in the publication "Using Deficits of Convexity to Recognized Hand Gestures from Silhouettes" by Ed Lawson and Z. Duric (published in: VIASPP 2006; 1$^{st}$ International Conference on Computer Vision Theory and Applications, Proceedings) may also be used for gesture recognition.

Gesture recognition may be performed, for example, while using a hardware or software referred to as "WinDelayLine". For example, in the embodiment in accordance with the invention, all of the contour elements may be detected 800 times per second. Corresponding further processing may be effected on the basis thereof.

In some embodiments in accordance with the invention, graphic models may be used. In this context, concepts as are described, e.g., in the publication "MAP-Inference for Highly-Connected Graphs with DC-Programming" by C. Schnörr may be employed for gesture recognition. Corresponding concepts may be adapted, e.g., to gesture recognition, it being possible to employ recognition of gesture elements while using a Hough transform. In other words, the concept "WinDelayLine" may be employed.

In some embodiments in accordance with the invention, it is also possible to employ the concepts as are described, for example, in the publications "Real-Time Object Detection for "Smart" Vehicles" by D. M. Gavrila and "CASSANDRA: Audio-Video Sensor Fusion for Aggression Detection" by W. Zajdel and others (published: IEEE International Conference on Advanced Video and Signal based Surveillance (AVSS), London, (UK) 2007).

In some embodiments, the concept as is described in the publication "Schürmann-Polynomials—Roots and Offsprings" by U. Miletzki (published in: Proceedings of The Eighth International Workshop on Frontiers in Handwriting Recognition (IWFHR'02) may be employed. In other words, a Schürmann theory for character recognition may be adapted, e.g., to the gesture recognition while using a Hough transform (also referred to as "WinDelayLine" gesture recognition).

Taking into Account a Hand Model

In some embodiments in accordance with the invention, a hand model may be used. A hand has, e.g., five fingers (thumb, forefinger, middle finger, ring finger and little finger). Therefore, a 3D wire frame model of the hand may be used (as is employed, for example, by "Adope Maya").

The kinematic model is known from robotics. In this respect, reference shall be made to the book "Einführung in die Robotertechnik" (Introduction into Robotics) (VCH publishing house). Said book describes that kinematics may be translated back to inverse kinematics. The model is a model of the inherent coordinates (elbow joint, wrist, bones of the middle finger, degrees of freedom of the rotation of each finger, and combined translation, or shifting, of the hand).

"WinDelayLine" (or any other apparatus for performing a Hough transform and for identifying gesture elements) individually tracks each finger and the contours of the hand with 800 frames per second, for example. In this manner, the motion of the hand is continuously converted to a singular instantaneous actual state in a state space consisting of all of the possible hand postures; in this context, there is only a sub-range of the state transitions that are physically possible. Thus, re-evaluation is effected by evaluating a series of picture sequences. In this context, the hand is determined by "red points" provided by WinDelayLine. In other words, the hand is determined by points that have been recognized, e.g., as extreme points of circular arcs or elliptical arcs. In this context, for example the Schnörr-Gavrila, Schürmann HMM, Poggio, Ferrari algorithms come into action.

A downgraded version is the Apple iphone model or an agitation mouse pad. Instead of a touch-sensitive monitor area (touchscreen area), the same movements are performed as on the touch-sensitive monitor area (touchscreen area), with the exception that the movement is recorded by a video camera in a contactless manner. This is interesting because, in this manner, the hand is able to control. A slow upward movement may linearly increase a reference quantity (slide control function). A rotary movement as with a safe or a volume control of a stereo system or a rotating hub of the VHS receiver stations may be optically recorded and be converted to a rotary movement of a switch as that of a washing machine.

In some embodiments, histogramming may be employed in addition to the recognition of circular arcs or elliptical arcs (for example while using the concept of "WinDelayLine").

In some embodiments in accordance with the invention, concepts may optionally be used as are described, e.g., in chapters 8 and 9 of the book "Handbook of Mathematical Models in Computer Vision" by N. Paragios (Springer, 2005). Variation segmenting comprising preferential shapes and/or shape defaults may be employed for gesture recognition, among others. In addition, the concept of curve propagation as well as level set methods and grouping may be employed for gesture recognition.

Thus, some embodiments may be employed for manual control. For example, by means of the inventive method, the fingertips (or their positions) may be recognized by means of a video camera, it being possible for the fingertips to be regarded as gesture elements. By using a Hough transformer, for example the so-called "WinDelayLine", not only fingertips, but all local extremes may be determined. However, it is sufficient to determine some further local extremes, for example in addition to some fingertips.

Thus, an apparatus may be implemented, all in all, that is suitable for gesture recognition and/or for controlling devices.

Variation Segmentation with Preferential Shapes and/or Shape Defaults

The concept of variation segmentation with preferential shapes, as may be employed in some embodiments in accordance with the invention, will be briefly explained below. For further details, please see chapter 8 of the book "Handbook of Mathematical Models in Computer Vision".

Variational calculus of Hamilton is a minimization of the variational integral. In a numerical digital implementation, variational calculus may be realized as a minimization of the product sums. In accordance with the above-mentioned publications of C. Schnörr, contours may be indicated as shape vectors, for example. On the basis of a Hough transform, for example while using the concept of "WinDelayLine", this is simple. Each contour is a set of extrema tuples with the location x_i, y_i and the curvature. In accordance with a cost function, for example, each set in the database is matched with the reference patterns.

This is a balancing calculation that may be realized in various ways. Among other things, for example, a realization using a program in the programming language "Fortran" is possible.

Curve Propagation, Level Set Methods and Grouping

The concepts of "curve propagation", "level set methods" and "grouping" will be briefly explained below. Details on this are described in chapter 9 of the above-mentioned "Handbook of Mathematical Models in Computer Vision". Curve propagation is a cord that places itself around objects until it snugly clings to the objects.

WinDelayLine, by contrast, takes all of the extremes and forms tuple subsets from the full tuple set, and looks (or checks) whether there is something in the database that matches this.

Stochastic Model of Geometric Snakes

In some embodiments, a concept may be employed wherein stochastic models of geometric snakes are used. In this concept, one may execute the DNA sequencing algorithm described, for example, since said algorithm also recognizes tuple subsequences and insertions and omissions.

Utilization of Affine Mappings of the Shift, or Translation, Rotation and Dilation In some embodiments in accordance with the invention, an affine symbolic mapping of the "WinDelayLine" tuples and/or of the parameters describing the recognized gesture elements may be used.

For example, a rotation may be implemented in a simple manner. For example, the tuple string (which describes different gesture elements) may be passed through in such a manner that it is cyclically shifted through relative to the database string, and one may further check where there is a maximum match. In simple words:

"I am passing through the tuple string in such a manner that I am cyclically shifted through relative to the database string, and I am looking to see where it there is the most activity".

A translation may also be realized in a simple manner. For example, all of the tuple lists may be passed through. Where there is a match, one will also know the location (e.g. of a gesture).

What follows is a description of how dilation may be achieved.

As an example, a circle is initially contemplated. Both the four spatial positions (e.g. of the left extreme point, the right extreme point, the bottom extreme point, and the top extreme point) will shift, as will the radii of curvature. However, the change in the location and in the radius of curvature are coupled to each other, so that in some embodiments it will be sufficient to computationally apply, or apply, a scaling parameter.

Some embodiments in accordance with the invention employ the "symbolic affine geometry" described here for identifying gestures.

The affine mappings, i.e. the conversion of "identical" objects by means of translation (shift), rotation and dilation, one can see that the translation (shift) is easily realizable ("is not an issue") in symbolic affine mapping, and that rotation is readily possible by cyclically passing through the tuple list.

In the following, details will be described with regard to symbolic affine dilation, which is slightly more difficult.

In accordance with the theorem on intersecting lines, a small circle may be converted to a large one in that a concentric wave runs toward the outside at the origin (=affine mapping). In the following, an explanation shall be given of what the "equality of an arc element" means. Two arc elements for an identical angle element Δ(φ) are referred to as "identical". The arc lengths are different, but it is possible, using both arc elements, to form a circle composed only by the different radius of curvature. Thus, the contour of each object may be formed in different sizes, since the contour is maintained invariant since it may be steadily continued.

In other words, we refer to two arc elements as being identical to an identical angle element Δ(φ), the arc lengths are different, but with both arc elements we may form a circle which is composed only by the different radius of curvature, and thus the contour of each object in different sizes, since the contour is maintained invariantly, since it may be steadily continued.

Symbolic affine dilation will be graphically explained in the following.

Let's take the case of a wholesaler in sanitary equipment. For installing a water pipe, shaped pieces (T-pieces, 15° pieces, yard goods, 90 degrees angles, curved pieces) are provided. With these, the water pipe may be installed (just like a sewage pipe).

In our case, the "water pipe", the contour of the object, is composed of n shaped pieces. We therefore describe the object by means of the list of the shaped pieces contained therein.

A further example will be described in the following.

Let's take a square as an example in accordance with the theorem on intersecting lines. In the corner points, we project the external surfaces from the center onto a stop surface. The straight lines as well as the 90° corners are maintained. As regards the shaped components, only the lengths of the four straight segments will change. It is possible to use the same 90° elbow fittings.

A further example will be described in the following. Let's take a circle, in accordance with the theorem on intersecting lines. Starting from the origin, we project the circle in polar coordinates toward the outside in segments of the circle. The shaped pieces now have different arc lengths and radii of curvature. Thus, we provide n shaped parts for a specific radius of curvature i.

A further example will be described in the following. Therefore, what is the symbolic affine dilation, e.g. for a bottle? We apply the theorem on intersecting lines at the center of the bottle and project the straight lines in the initial and end points toward the outside (bottom, lid, walls of the neck of the bottle, and body of the bottle). (This means, we multiply each shaped element by a scaling factor α. In the search for shaped pieces, we multiply from α=0 to α=max) and compare with the database. For the curved line elements, we take the shaped pieces having larger radii of curvature.

Graphically, one may try this with a drawing of a bottle, for example. We draw a second bottle, that is identical in shape, broadened by exactly one box, and extended around the outside. The method is tricky only in one place, at the two bottom points of the neck of the bottle. We make the rays through the break points; in order to maintain the straight-line segments, we push through perpendicularly from the new bottle lid to the ray sector.

Some embodiments in accordance with the invention may thus use symbolic affine mapping for identifying a gesture. In this context, the gesture elements are shifted and/or rotated and/or scaled in various manners. The shifting, rotation, and scaling may be effected, for example, by applying corresponding operators to a list of gesture elements so as to obtain a modified list of gesture elements (that are described by parameters). Various modified lists of gesture elements described by parameters are then compared, e.g., to comparative lists stored in a database.

Gestures of Movement

In some embodiments, it is possible to take into account not only static gestures, but gestures of movement. A gesture may be recognized, for example, when a specific change in the positions of the gesture elements has occurred between two successive pictures (or between several successive pictures).

For example, in some embodiments, a control (e.g. of a device) may be effected by means of an upward, downward, leftward or rightward movement of a finger. For example, a speed of the movement or an acceleration (second derivative of the distance with respect to time) may be taken into account. The speed may be described, e.g., by several components v_i, v_y. The acceleration may be described by two components $\ddot{x}_x$ and $\ddot{x}_y$, for example. In addition, a forward/backward dimensional change may be taken into account.

For example, cooking stoves and washing machines may be operated in the manner shown.

In some embodiments it may be sufficient, in a low-price implementation, to use two mutually vertically located line scan cameras.

It may be stated in summary that, in some embodiments, control is effected, all in all, by an upward, downward, leftward, rightward movement of a finger, v_x, v_y and $\ddot{x}_x$ and $\ddot{x}_y$ and forward/backward dimensional change.

Additions

Further additions that may be employed in some embodiments will be described in the following.

In some embodiments, the following additional features may optionally be used:

a) 3D kinematics of a coupled hinge model—centroid and ellipse of inertia of the angular momenta; and/or b) complete back-reconstruction using orthogonal radon transformation.

In some embodiments in accordance with the invention, a 3D kinematics model of a coupled hinge model may thus be employed.

A hand consists of many joints and degrees of freedom. The book: "Robotertechnik—eine Einführung" (Robotics—an introduction) by Don McCloy, VCH publishing house, contains an introduction to kinematics and inverse kinematics of coupled articulation systems.

A 3D movement of a coupled articulation model is described into the translational movement of the centroid (centroid trajectory) and into the inherent rotation of the coupled articulation model and of the movement of the individual members. The inherent rotation is determined following the main-axis transformation by the intrinsic angular momenta of the easy axes of the ellipse of inertia (intrinsic matrix of the angular momenta).

In the 2D camera projection recorded, the picture is broken down using two orthogonal radon transformations along two orthogonal axes. In the binarized picture, this corresponds to 2D histogramming along the x axis and the y axis. It is possible to numerically show, using a simple "battleships" algorithm, that the original picture may be reconstructed from the x histogram and the y histogram. The x and the y centroids of the histogram are calculated. Thus, the (x, y) centroid in the picture of an object is known, and the centroid movement trajectory may be recorded picture by picture. The angular momentum as a measure of eccentricity (unbalance) is determined in the x and y directions. Thus, irregularly shaped bodies may be separated in accordance with this measure (epsilon environment measure).

For further details, please refer to the presentation "Model-Based Hand Tracking with Texture, Shading and Self-Occlusions" by Martin de La Gorce and others, and to the article "Model-Based Hand Tracking with Texture, Shading and Self-Occlusion" by Martin de La Gorce and others. The two publications mentioned were introduced at the CVPR 2008 (IEEE Computer Science Conference on Computer Vision and Pattern Recognition).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for recognizing gestures in a picture, using hardware, a computer system, or a combination of hardware and a computer system, comprising:
   a Hough transformer configured to identify arcs in the picture or in a pre-processed version of the picture as identified gesture elements so as to acquire information about the identified gesture elements;
   a gesture description creator configured to acquire a gesture description while using the information about the identified gesture elements; and
   a gesture classifier configured to compare the gesture description to a plurality of comparative gesture descriptions having gesture codes associated with them so as to provide, as the result of the comparison, a gesture code of a recognized gesture;
   wherein the Hough transformer is configured to identify a plurality of straight-line segments extending through the picture in various directions as identified gesture elements;
   wherein the Hough transformer is configured to provide information about a location, a length or a direction of an identified straight-line segment, and
   wherein the gesture description creator is configured to use the information, provided by the Hough transformer, about the identified straight-line segments for creating the gesture description;
   wherein the gesture description creator is configured to acquire as the gesture description a description of a gesture describing the gesture as an ordered listing of parameters of identified gesture elements.

2. The apparatus as claimed in claim 1, the apparatus comprising an area parameter determiner configured to determine an area parameter of a gesture area, and
   the gesture description creator being configured to acquire the gesture description while using the area parameter.

3. The apparatus as claimed in claim 2, wherein the area parameter describes a property of the area independently of an area contour.

4. The apparatus as claimed in claim 2, wherein the area parameter determiner is configured to acquire, as the area parameter, information about an area centroid of the gesture area, or
   information about an expansion of the gesture area,
   or information about a momentum of the gesture area
   or information about an eccentricity of the gesture area.

5. The apparatus as claimed in claim 2, wherein the gesture description creator is configured to provide as the gesture description a set of parameters describing contour sections of the gesture area, and
   wherein the gesture description creator is configured to normalize the gesture description while using the area parameter.

6. The apparatus as claimed in claim 2, wherein the area parameter determiner is configured to acquire as the area parameter information about a location of an area centroid of the gesture area, and
   wherein the gesture description creator is configured to provide the gesture description such that location parameters of the contour sections of the gesture area are related to the location of the area centroid of the gesture area.

7. The apparatus as claimed in claim 2, wherein the area parameter determiner is configured to acquire as the area parameter information about a dimension of the gesture area, and
   wherein the gesture description creator is configured to provide the gesture description such that location parameters or dimension parameters of the contour sections are normalized, in terms of size, on the basis of the information about the dimensions of the gesture area.

8. The apparatus as claimed in claim 1, wherein the gesture description creator is configured to order the gesture description in such a manner
   that the ordered identified gesture elements are ordered in accordance with their sequence along a continuous contour line of a gesture area, or
   that the ordered identified gesture elements describe a continuous contour line of the gesture area.

9. The apparatus as claimed in claim 1, wherein the Hough transformer is configured to provide information about a location, an orientation, an arc length, a radius of curvature, or an angle of curvature of the identified arcs; and
   wherein the gesture description creator is configured to use the information, provided by the Hough transformer, about the location, the orientation, the arc length, the radius of curvature, or the angle of curvature of the identified arcs for creating the gesture description.

10. The apparatus as claimed in claim 1, wherein the gesture description creator is configured to create the gesture description such that the gesture description comprises a description of a relative location of circular arcs or elliptical arcs that belong to a contour line of a gesture area.

11. The apparatus as claimed in claim 1, wherein the gesture description creator is configured to comprise information, provided by the Hough transformer, about an orientation of the respective circular arc or elliptical arc into the gesture description for identified circular arcs or elliptical arcs.

12. The apparatus as claimed in claim 1, wherein the gesture description creator is configured to comprise information, provided by the Hough transformer, about a position of an extreme point of the identified circular arc or of the identified elliptical arc into the gesture description for identified circular arcs or elliptical arcs.

13. The apparatus as claimed in claim 1, wherein the Hough transformer is configured to identify only such circular arcs or elliptical arcs whose radii of curvature are smaller, in magnitude, than a predefined maximally admissible radius of curvature.

14. The apparatus as claimed in claim 1, wherein the gesture description creator is configured to create a description of the gesture by stitching together selected adjacent identified gesture elements, and
   wherein the gesture description creator is configured to select the selected gesture elements used for the description of the gesture from a totality of identified gesture elements, so that the selected gesture elements describe a continuous line shape from an initial point to an end point.

15. The apparatus as claimed in claim 1, wherein the gesture description creator is configured to create, on the basis of the identified gesture elements, a feature vector describing successive sections of a contour line of a gesture area.

16. The apparatus as claimed in claim 1, wherein the gesture classifier comprises a database comparator configured to compare a feature vector comprising the information of the gesture description to a plurality of comparative feature vectors associated with comparative gestures so as to acquire a measure of differences between the feature vector and the comparative feature vectors and to determine, on the basis of the measure of the differences, a gesture code belonging to the feature vector.

17. The apparatus as claimed in claim 1, the apparatus comprising an edge recognizer configured to recognize edges in the picture and to create, on the basis of the picture, an edge picture as the pre-processed version of the picture.

18. The apparatus as claimed in claim 1, the apparatus being configured to identify pixels whose color values are in a predefined range as pixels belonging to a gesture area.

19. The apparatus as claimed in claim 1, the apparatus comprising a picture detail selector configured to identify, in the picture, a picture detail that comprises a contiguous gesture area, and
wherein the Hough transformer is configured to process a pre-processed version of the picture that corresponds to the picture detail.

20. The apparatus as claimed in claim 1, wherein the gesture description creator is configured to provide as the gesture description an ordered set of parameters describing contour sections of a gesture area, and
wherein the gesture classifier is configured to compare the ordered set of parameters to a plurality of comparative parameter sets associated with comparative gestures, so as to acquire information about differences between the ordered set of parameters and the comparative parameter sets, and
wherein the gesture classifier is configured to compare one or more cyclically rotated-through versions of the ordered set of parameters to the plurality of comparative parameter sets so as to acquire information about differences between one or more cyclically rotated-through versions of the ordered set of parameters and the comparative parameter sets, and
wherein the gesture classifier is configured to determine, on the basis of the information about the differences, a gesture code belonging to the ordered set of parameters or belonging to a rotated-through version of the ordered set of parameters.

21. The apparatus as claimed in claim 1, wherein the gesture description creator is configured to provide as the gesture description an ordered set of parameters describing contour sections of a gesture area, and
wherein the gesture classifier is configured to compare the ordered set of parameters to a plurality of comparative parameter sets that are associated with comparative gestures, so as to acquire information about differences between the ordered set of parameters and the comparative parameter sets, and
wherein the gesture classifier is configured to compare one or more scaled versions of the ordered set of parameters to the plurality of comparative parameter sets so as to acquire information about differences between the at least one scaled version of the ordered set of parameters and the comparative parameter sets, and
wherein the gesture classifier is configured to determine, on the basis of the information about the differences, a gesture code belonging to the ordered set of parameters or belonging to a scaled version of the ordered set of parameters.

22. The apparatus as claimed in claim 21, wherein the gesture classifier is configured to acquire the one or more scaled versions of the ordered set of parameters such that the one or more scaled versions describe a contour of a scaled gesture area that is enlarged or reduced in size as compared to a gesture area actually comprised by the picture.

23. The apparatus as claimed in claim 21, wherein the gesture classifier is configured to scale radius-of-curvature information that is provided by the Hough transformer and is part of the ordered set of parameters, so as to acquire the one or more scaled versions of the ordered set.

24. The apparatus as claimed in claim 21, wherein the gesture classifier is configured to scale length information of straight lines that are part of the ordered set of parameters so as to acquire the one or more scaled versions of the ordered set of parameters.

25. The apparatus as claimed in claim 1, wherein the gesture description creator is configured to provide as the gesture description a set of parameters describing contour sections of a gesture area, and
wherein the gesture classifier is configured to determine, by means of a physical model of a body part forming the gesture, a probability with which the posture, described by the set of parameters, of individual elements of the body part is assumed, and
wherein the gesture classifier is configured to take into account the probability when determining the gesture code.

26. The apparatus as claimed in claim 1, wherein the gesture description creator is configured to provide as the gesture description a set of parameters describing contour sections of a gesture area, and
wherein the gesture classifier is configured to detect whether the set of parameter values violates a predefined physical location condition, and
to suppress provision of the gesture code or to signal an error if the set of parameter values violates the predefined location condition.

27. The apparatus as claimed in claim 1, wherein the gesture description creator is configured to provide as the gesture description a set of parameters describing contour sections of a gesture area, and
wherein the gesture classifier is configured to determine a current gesture code describing a current gesture state in dependence on a previous gesture code that is determined on the basis of a previous picture and describes a previous gesture state.

28. The apparatus as claimed in claim 27, wherein the gesture classifier is configured to evaluate, when determining the current gesture code, state transition admissibility information describing which current gesture states may be assumed on the basis of a previous gesture state.

29. The apparatus as claimed in claim 28, wherein the gesture classifier is configured to suppress such transitions from a previous gesture state to a current gesture state that are described as inadmissible by the state transition admissibility information.

30. The apparatus as claimed in claim 1, wherein the gesture description creator is configured to acquire information about a rotation of the gesture area, and wherein the gesture classifier is configured to take into account the information about the rotation of the gesture area when determining the gesture code.

31. The apparatus as claimed in claim 30, wherein the gesture classifier is configured to distinguish gestures in dependence on the information about the rotation of the gesture area.

32. The apparatus as claimed in claim 30, wherein the gesture classifier is configured to determine the information about the rotation of the gesture area on the basis of a temporal development of location parameters of the identified gesture elements.

33. The apparatus as claimed in claim 30, wherein the gesture classifier is configured to acquire the information about the rotation of the gesture area while using area parameters describing momenta of the gesture area with regard to different directions.

34. The apparatus as claimed in claim 1, the apparatus being configured to recognize a hand gesture,
the gesture description creator being configured to create the gesture description such that the gesture description comprises a description of arcs of different orientations describing fingertips and interstices between fingers.

35. A method for recognizing gestures in a picture, comprising:
performing at least one Hough transform for identifying arcs in the picture or in a pre-processed version of the picture as identified gesture elements so as to acquire information about the identified gesture elements,
and to identify a plurality of straight-line segments extending through the picture in various directions as identified gesture elements to provide information about a location, a length or a direction of an identified straight-line segment;
creating a gesture description while using the information about the identified gesture elements, so that the gesture description describes the gesture as an ordered listing of parameters of identified gesture elements,
the information about the identified straight-line segments that is provided by the Hough transform being used for creating the gesture description; and
comparing the gesture description to a plurality of comparative gesture descriptions having gesture codes associated with them so as to provide a gesture code of a recognized gesture as the result of the comparison; and
the method for recognizing gestures in a picture is implemented using hardware, a computer system, or a combination of hardware and a computer system.

36. A non-transitory computer readable medium comprising a computer program for performing, when the computer program is run on a computer, a method for recognizing gestures in a picture, said method comprising:
performing at least one Hough transform for identifying arcs in the picture or in a pre-processed version of the picture as identified gesture elements so as to acquire information about the identified gesture elements,
and to identify a plurality of straight-line segments extending through the picture in various directions as identified gesture elements to provide information about a location, a length or a direction of an identified straight-line segment;
creating a gesture description while using the information about the identified gesture elements,
so that the gesture description describes the gesture as an ordered listing of parameters of identified gesture elements,
the information about the identified straight-line segments that is provided by the Hough transform being used for creating the gesture description; and
comparing the gesture description to a plurality of comparative gesture descriptions having gesture codes associated with them so as to provide a gesture code of a recognized gesture as the result of the comparison.

37. A camera system comprising:
a camera configured to provide a camera signal describing a camera picture taken by the camera;
an apparatus for recognizing gestures in a picture in accordance with claim 1, the apparatus for recognizing gestures being configured to receive the camera picture and to acquire the gesture code on the basis thereof; and
a camera controller configured to set an alignment, focussing or function of the camera in dependence on the gesture code of the gesture identified in the camera picture.

38. A device configuration, comprising:
a device comprising a device controller;
a camera configured to provide a camera signal describing a camera picture taken by the camera; and
an apparatus for recognizing gestures in a picture in accordance with claim 1, the apparatus for recognizing gestures being configured to receive the camera picture and to acquire the gesture code on the basis thereof;
the device controller being configured to control a function of the device in dependence on the gesture code.

39. An apparatus for recognizing gestures in a picture, using hardware, a computer system, or a combination of hardware and a computer system, comprising:
a Hough transformer configured to identify arcs in the picture or in a pre-processed version of the picture as identified gesture elements so as to acquire information about the identified gesture elements;
a gesture description creator configured to acquire a gesture description while using the information about the identified gesture elements; and
a gesture classifier configured to compare the gesture description to a plurality of comparative gesture descriptions having gesture codes associated with them so as to provide, as the result of the comparison, a gesture code of a recognized gesture;
wherein the gesture description creator is configured to describe as the gesture description an ordered set of parameters describing contour sections of a gesture area, and
wherein the gesture classifier is configured to compare the ordered set of parameters to a plurality of comparative parameter sets associated with comparative gestures, so as to acquire information about differences between the ordered set of parameters and the comparative parameter sets, and wherein the gesture classifier is configured to compare one or more cyclically rotated-through versions of the ordered set of parameters to the plurality of comparative parameter sets so as to acquire information about differences between one or more cyclically rotated-through versions of the ordered set of parameters and the comparative parameter sets, and
wherein the gesture classifier is configured to determine, on the basis of the information about the differences, a gesture code belonging to the ordered set of parameters or belonging to a rotated-through version of the ordered set of parameters.

40. An apparatus for recognizing gestures in a picture, using hardware, a computer system, or a combination of hardware and a computer system, comprising:

a Hough transformer configured to identify arcs in the picture or in a pre-processed version of the picture as identified gesture elements so as to acquire information about the identified gesture elements;

a gesture description creator configured to acquire a gesture description while using the information about the identified gesture elements; and a gesture classifier configured to compare the gesture description to a plurality of comparative gesture descriptions having gesture codes associated with them so as to provide, as the result of the comparison, a gesture code of a recognized gesture;

wherein the gesture description creator is configured to describe as the gesture description an ordered set of parameters describing contour sections of a gesture area, and wherein the gesture classifier is configured to compare the ordered set of parameters to a plurality of comparative parameter sets associated with comparative gestures, so as to acquire information about differences between the ordered set of parameters and the comparative parameter sets, and wherein the gesture classifier is configured to compare one or more scaled versions of the ordered set of parameters to the plurality of comparative parameter sets so as to acquire information about differences between the at least one scaled version of the ordered set of parameters and the comparative parameter sets, and wherein the gesture classifier is configured to determine, on the basis of the information about the differences, a gesture code belonging to the ordered set of parameters or belonging to a scaled version of the ordered set of parameters.

41. An apparatus for recognizing gestures in a picture, using hardware, a computer system, or a combination of hardware and a computer system, comprising:

a Hough transformer configured to identify arcs in the picture or in a pre-processed version of the picture as identified gesture elements so as to acquire information about the identified gesture elements;

a gesture description creator configured to acquire a gesture description while using the information about the identified gesture elements; and a gesture classifier configured to compare the gesture description to a plurality of comparative gesture descriptions having gesture codes associated with them so as to provide, as the result of the comparison, a gesture code of a recognized gesture;

wherein the gesture description creator is configured to describe as the gesture description a set of parameters describing contour sections of a gesture area, and wherein the gesture classifier is configured to detect whether the set of parameter values violates a predefined physical location condition, and to suppress provision of the gesture code or to signal an error if the set of parameter values violates the predefined location condition.

42. An apparatus for recognizing gestures in a picture, using hardware, a computer system, or a combination of hardware and a computer system, comprising:

a Hough transformer configured to identify arcs in the picture or in a pre-processed version of the picture as identified gesture elements so as to acquire information about the identified gesture elements;

a gesture description creator configured to acquire a gesture description while using the information about the identified gesture elements; and a gesture classifier configured to compare the gesture description to a plurality of comparative gesture descriptions having gesture codes associated with them so as to provide, as the result of the comparison, a gesture code of a recognized gesture;

wherein the gesture description creator is configured to provide as the gesture description a set of parameters describing contour sections of a gesture area, and wherein the gesture classifier is configured to determine a current gesture code describing a current gesture state in dependence on a previous gesture code that is determined on the basis of a previous picture and describes a previous gesture state.

* * * * *

UNITED STATES PATENT AND TRADEMARK OFFICE
CERTIFICATE OF CORRECTION

PATENT NO. : 8,570,383 B2  Page 1 of 1
APPLICATION NO. : 13/092184
DATED : October 29, 2013
INVENTOR(S) : Frank Klefenz et al.

It is certified that error appears in the above-identified patent and that said Letters Patent is hereby corrected as shown below:

On the title page item (73), correct the spelling to:

Fraunhofer-Gesellschaft zur Foerderung der angewandten Forschung e.V., Munich (DE)

Signed and Sealed this
Seventeenth Day of December, 2013

Margaret A. Focarino
*Commissioner for Patents of the United States Patent and Trademark Office*